US012609564B2

(12) United States Patent (10) Patent No.: US 12,609,564 B2
Tsuchiya et al. (45) Date of Patent: Apr. 21, 2026

(54) ROTARY ELECTRIC MACHINE

(71) Applicant: DENSO CORPORATION, Kariya-city (JP)

(72) Inventors: Hiroyuki Tsuchiya, Kariya-city (JP); Shinichi Okada, Kariya-city (JP); Shinji Koda, Kariya-city (JP); Akito Tamura, Kariya-city (JP); Yuki Mawatari, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 394 days.

(21) Appl. No.: 18/321,969

(22) Filed: May 23, 2023

(65) Prior Publication Data

US 2023/0299625 A1 Sep. 21, 2023

Related U.S. Application Data

(63) Continuation of application No. PCT/JP2021/042812, filed on Nov. 22, 2021.

(30) Foreign Application Priority Data

Nov. 27, 2020 (JP) ................................. 2020-197408

(51) Int. Cl.
H02K 1/20 (2006.01)
H02K 1/18 (2006.01)
(Continued)

(52) U.S. Cl.
CPC .............. H02K 1/20 (2013.01); H02K 1/187 (2013.01); H02K 1/2786 (2013.01); H02K 7/003 (2013.01)

(58) Field of Classification Search
CPC ........ H02K 1/20; H02K 1/187; H02K 1/2786; H02K 7/003; H02K 3/47; H02K 3/50;
(Continued)

(56) References Cited

U.S. PATENT DOCUMENTS

2008/0084139 A1* 4/2008 Schroer .................. H02K 3/522
310/67 R
2015/0381006 A1* 12/2015 Allen .................... F04D 29/023
417/423.7
(Continued)

FOREIGN PATENT DOCUMENTS

JP H02-168836 A 6/1990
JP H10-285842 A 10/1998
(Continued)

OTHER PUBLICATIONS

U.S. Appl. No. 18/458,629, filed Aug. 30, 2023, titled "Rotary Electric Machine and Method for Controlling Rotary Electric Machine"; 112 pages.

(Continued)

*Primary Examiner* — Christopher M Koehler
*Assistant Examiner* — Riley Owen Stout
(74) *Attorney, Agent, or Firm* — Precision Patents, P.C.

(57) ABSTRACT

A rotary electric machine includes a rotor including a plurality of magnetic poles, a stator including a multi-phase stator winding, a power line that supplies power to the stator winding, and a rotation sensor that detects a rotational position of the rotor. The stator and the rotor face each other on the inner side and the outer side in the radial direction. The power line and a signal line that extends from the rotation sensor are provided so as to extend in the axial direction. Blocking portions that block an electromagnetic field generated by the power line are each interposed between the power line and the signal line.

12 Claims, 70 Drawing Sheets

(51) Int. Cl.
    *H02K 1/2786*     (2022.01)
    *H02K 7/00*     (2006.01)

(58) Field of Classification Search
    CPC .... H02K 5/203; H02K 7/086; H02K 11/0141;
                       H02K 11/215; H02K 21/22
    See application file for complete search history.

(56)                       References Cited

U.S. PATENT DOCUMENTS

2017/0085140 A1 *   3/2017   Tang ..................... H02K 11/00
2021/0175780 A1     6/2021   Sano et al.

FOREIGN PATENT DOCUMENTS

JP         2001-169522 A     6/2001
JP         2012-197051 A    10/2012

OTHER PUBLICATIONS

U.S. Appl. No. 18/458,611, filed Aug. 30, 2023, titled "Rotary Electric Machine"; 148 pages.
U.S. Appl. No. 18/309,742, filed Apr. 28, 2023, Yuki Takahashi.

\* cited by examiner

COMPARATIVE EXAMPLE (a)

(b)

(a)

(b)

(a)

(b)

(a)                                    (b)

(a)

(b)

(a)                              (b)

(a)

(b)

(a)            (b)

( a )

( b )    $\theta = 0°$ ( c )    $\theta = 90°$ ( d )    $\theta = 180°$ ( e )    $\theta = 270°$ ( f )    $\theta = 45°$

ROTARY ELECTRIC MACHINE

CROSS REFERENCE TO RELATED APPLICATION

The present application is a continuation application of International Patent Application No. PCT/JP2021/042812 filed on Nov. 22, 2021, which designated the U.S. and claims the benefit of priority from Japanese Patent Application No. 2020-197408 filed on Nov. 27, 2020. The entire disclosures of all of the above applications are incorporated herein by reference.

TECHNICAL FIELD

The disclosure in this specification relates to a rotary electric machine.

BACKGROUND

Conventionally, a rotary electric machine has an electromagnetic structure including a stator winding and a rotor.

SUMMARY

According to a first aspect, a rotary electric machine includes: a rotor including a plurality of magnetic poles; a stator including a stator winding that is multi-phase; a power line configured to supply power to the stator winding; and a rotation sensor configured to detect a rotational position of the rotor.

BRIEF DESCRIPTION OF THE DRAWINGS

The foregoing and other objects, features, and beneficial advantages of the present disclosure will become more apparent from the following detailed description with reference to the accompanying drawings. The drawings include.

DETAILED DESCRIPTION

Figure 1:
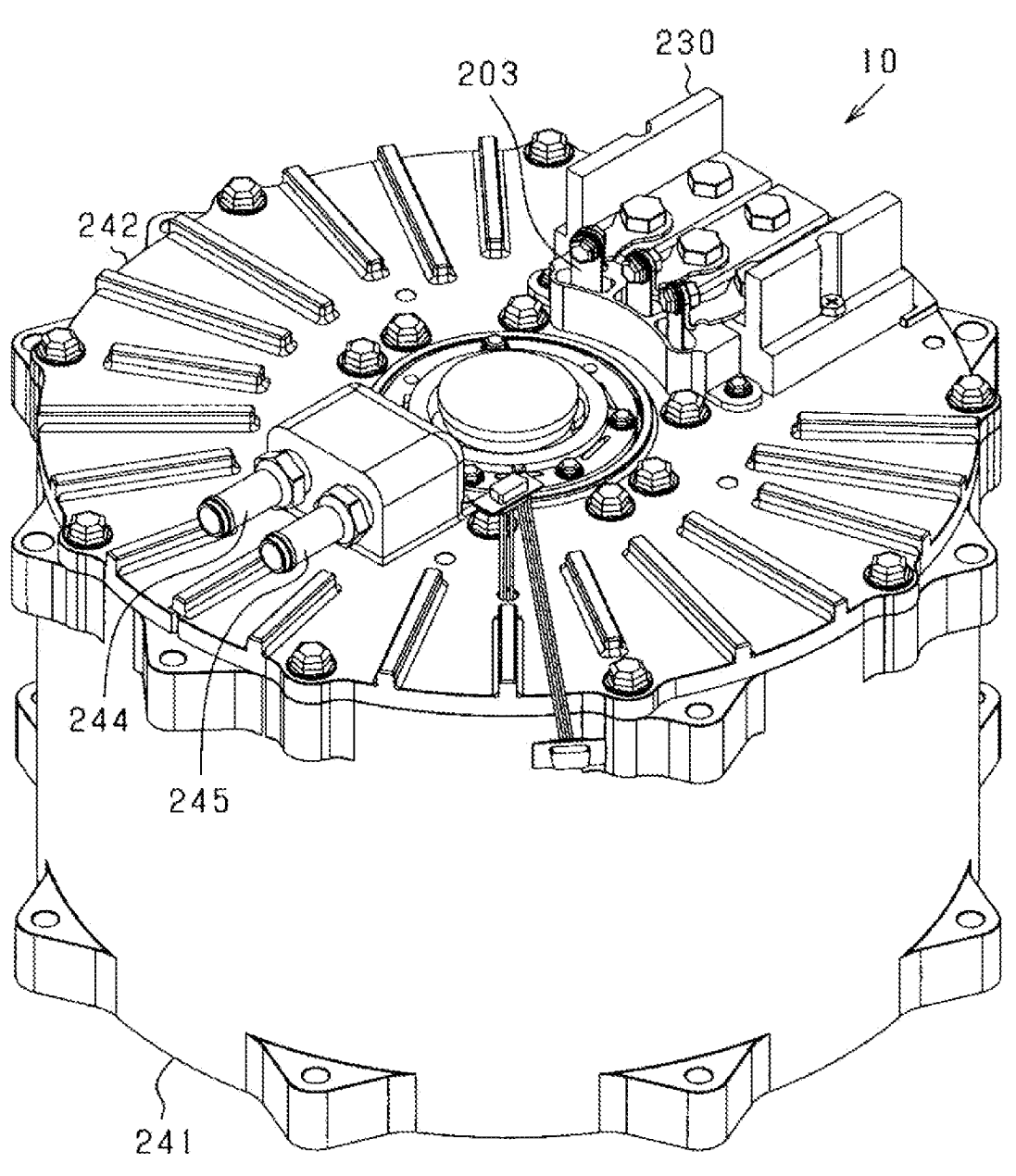
FIG. 1 is a perspective view illustrating an entire rotary electric machine according to a first embodiment.

Hereinafter, examples of the present disclosure will be described.

According to an example of the present disclosure, a rotary electric machine includes a stator winding and a power line of each phase connected to the stator winding. The rotation of the rotor is detected by a rotation sensor such as a resolver. For example, an outer-rotor type rotary electric machine has a configuration in which an annular internal space is formed on an inner side of a stator in a radial direction, and a rotation sensor that detects a rotational position of a rotating shaft is disposed in the internal space.

However, when a power line that supplies power to the stator winding is provided near the signal line extending from the rotation sensor, there is a concern that the influence of the electromagnetic wave noise caused by the energization of the power line may reach the sensor signal line, and eventually, the detection accuracy of the rotation sensor may be lowered.

According to a first example, a rotary electric machine comprises:

a rotor including a plurality of magnetic poles;

a stator including a stator winding that is multi-phase;

a power line configured to supply power to the stator winding; and a rotation sensor configured to detect a rotational position of the rotor.

The stator and the rotor face each other in a radial direction. The power line and a signal line, which extends from the rotation sensor, extend in an axial direction. A blocking portion is interposed between the power line and the signal line and configured to block an electromagnetic field generated by the power line.

In a rotary electric machine, when a power line connected to a stator winding and a signal line extending from a rotation sensor are provided so that both lines extend in the axial direction, there is a concern that noise may be superimposed on a signal of the rotation sensor due to an electromagnetic field generated by the power line and detection accuracy of the rotation sensor may be affected. In this respect, in the above configuration, since the blocking portion that blocks the electromagnetic field generated by the power line is interposed between the power line and the signal line, the influence of the electromagnetic field on the rotation sensor is suppressed. As a result, the rotation detection by the rotation sensor can be appropriately performed.

In a second example according to the first example, a stator holder in a cylindrical shape and assembled inside the stator in the radial direction. The rotary electric machine is an outer-rotor type rotary electric machine including the rotor outside the stator in the radial direction. The stator holder includes a hollow portion and a protrusion in the hollow portion. The protrusion is provided as a fixing portion and protrudes inward in the radial direction for fixing the rotation sensor. The protrusion is the blocking portion.

An outer-rotor type rotary electric machine is conceivably configured such that a stator holder is assembled to an inner side of a stator in the radial direction and a rotation sensor is fixed to the stator holder. In this case, the protrusion protruding inward in the radial direction is provided in the hollow portion of the stator holder and the protrusion is allowed to serve as a fixing portion of the rotation sensor. With this arrangement, the rotation sensor can be suitably disposed at a desired position in the axial direction in the hollow portion of the stator holder. In addition, since the protrusion of the stator holder is used as the blocking portion, the blocking portion need not be newly provided for the purpose of blocking the electromagnetic field, and the configuration can be simplified.

In a third example according to the second example, the protrusion is provided in the hollow portion of the stator holder. The protrusion extends in the axial direction in a range from one end of the stator holder in the axial direction to an intermediate position of the stator holder in the axial direction. The rotation sensor is fixed to an end surface of the protrusion in the axial direction. The signal line extends in the axial direction along the protrusion.

In the above configuration, in the hollow portion of the stator holder, the protrusion is provided not over the entire range in the axial direction of the stator holder but over a partial range up to the intermediate position where the rotation sensor is provided. Accordingly, a space for receiving components other than the rotation sensor in the axial direction while enabling installation of the rotation sensor by using the protrusion and noise suppression of the signal line. Therefore, a configuration in which part of the rotary object including the rotor is received in the hollow portion of the stator holder can be suitably implemented.

In a fourth example according to the third example, the protrusion is provided in the hollow portion of the stator holder in the range from the one end of the stator holder in the axial direction to the intermediate position of the stator holder in the axial direction. A part of a rotary object including the rotor is received in a range from the intermediate position of the stator holder in the axial direction to an other end of the stator holder in the axial direction.

According to the above configuration, in the hollow portion of the stator holder, the protrusion is provided in a partial range from one end to the other end in the axial direction. Further, part of the rotary object including the rotor is received in the region where the protrusion is not provided. Accordingly, the rotary object can be supported by the bearing in the hollow portion of the stator holder. As a result, the axial length can be shortened, and thus the rotary electric machine can be downsized.

In a fifth example according to any one of the second to fourth example, in the hollow portion of the stator holder, the power line is connected to the stator winding of each phase on one end side of the stator in the axial direction, and extends from the one end side of the stator to an other end side of the stator in the axial direction, and the protrusion is provided between the power line and the signal line.

In the configuration in which the power line is provided in the hollow portion of the stator holder so as to extend from one end side to the other end side in the axial direction of the stator, there is a greater concern that an electromagnetic field may be generated by the power line in the hollow portion and the signal line is affected by the electromagnetic field. In this respect, since the protrusion is provided between the power line and the signal line, the influence of the electromagnetic field on the signal line can be suppressed.

In a sixth example according to any one of the second to fourth example, the rotor includes a rotor carrier including an end plate portion on one end side in the axial direction and having an opening on an other end side in the axial direction of the rotor carrier. The stator is inserted inside the rotor carrier in the radial direction from the other end side of the rotor carrier having the opening. The stator winding includes a plurality of winding segments for each multi-phase winding. Each of the winding segments includes a pair of intermediate conductor portions and link portions at both ends of the pair of intermediate conductor portions in the axial direction. The pair of intermediate conductor portions and the link portions are in an annular arrangement. The winding segments include a first winding segment and a second winding segment. One end side of the stator winding of the first winding segment in the axial direction is bent inward in the radial direction. An other end side of the stator winding of the second winding segment in the axial direction is bent outward in the radial direction. The first winding segment and the second winding segment are provided side by side and partially overlap each other in a circumferential direction. A bent side of the first winding segment and a non-bent side of the second winding segment are on a side of the end plate portion of the rotor carrier. A wiring module is provided on the side of the end plate portion of the rotor carrier among both ends of the stator winding in the axial direction and electrically connected to each of the winding segments. The power line is connected to the wiring module. In the hollow portion of the stator holder, the power line extends from one end side of the stator to an other end side of the stator in the axial direction. The protrusion is provided between the power line and the signal line.

In the stator winding, the plurality of winding segments are arranged such that one bent sides thereof in the axial direction are alternately disposed in the axial direction, whereby each winding segment can be suitably disposed while preventing interference between the winding segments. In this case, in the configuration in which the wiring module is provided on the end plate portion side of the rotor carrier among both ends of the stator winding in the axial direction and the power line is connected to the wiring module, the power line is provided in the hollow portion of the stator holder so as to extend from one end side to the other end side of the stator in the axial direction.

Here, in the configuration in which the power line is provided in the hollow portion of the stator holder so as to extend from one end side to the other end side in the axial direction of the stator, there is a greater concern that an electromagnetic field may be generated by the power line in the hollow portion and the signal line is affected by the electromagnetic field. In this respect, since the protrusion is provided between the power line and the signal line, the influence of the electromagnetic field on the signal line can be suppressed.

In a seventh example according to any one of the second to sixth example, a shaft body is provided in the hollow portion of the stator holder to pivotally support a rotary object including the rotor. The protrusion protrudes toward the shaft body in the stator holder. In the hollow portion of the stator holder, the protrusion and the shaft body are the blocking portion.

In the hollow portion of the stator holder, the cylindrical part of the stator holder and the shaft body face each other on the inner side and the outer side in the radial direction with a space therebetween, and a protrusion is interposed between the cylindrical portion and the shaft body. In this case, in the hollow portion of the stator holder, the protrusion and the shaft body each serve as a blocking portion, and the electromagnetic field of the power line with respect to the signal line is blocked by the protrusion and the shaft body. As a result, a more appropriate configuration in blocking the electromagnetic field of the power line can be implemented.

In an eighth example according to the seventh example, the shaft body includes a stationary shaft inserted through the hollow portion of the stator holder and a diameter-expanded portion larger in diameter than the stationary shaft. The diameter-expanded portion includes a first insertion hole and a second insertion hole. Both the first insertion hole and the second insertion hole extend from an end surface of the diameter-expanded portion in the axial direction that is on a side of the hollow portion of the stator holder to pass through the diameter-expanded portion in the axial direction. The power line is inserted through the first insertion hole. The signal line is inserted through the second insertion hole.

In the above configuration, the first insertion hole and the second insertion hole, both extending in the axial direction, from a side of the hollow portion of the stator holder are provided in the diameter-expanded portion of the shaft body. The power line and the signal line are individually inserted through the respective insertion holes. As a result, the influence of the electromagnetic field can be suitably suppressed also in a range where the signal line extends from the hollow portion of the stator holder to the outside of the rotary electric machine (e.g., an external terminal or the like).

In a ninth example according to the eighth example, the shaft body is formed of a magnetic material.

The shaft body includes a magnetic material. The power line and the signal line are individually inserted through the respective insertion holes extending in the axial direction in the diameter-expanded portion of the shaft body. In this case, the noise reduction effect can be improved.

In a tenth example according to the seventh example, the stator holder includes a coolant path extending in an annular shape in a circumferential direction to circulate a coolant in the circumferential direction, an inlet path, as an inlet of the coolant to the coolant path, extending in the axial direction, and an outlet path, as an outlet of the coolant from the coolant path, extending in the axial direction. The shaft body includes a stationary shaft inserted through the hollow portion of the stator holder and a diameter-expanded portion larger in diameter than the stationary shaft. The diameter-expanded portion has two shaft body coolant passages extending in the axial direction and respectively communicating with the inlet path and the outlet path. The diameter-expanded portion includes a power line insertion hole extending in the axial direction and through which the power line is inserted. The two shaft body coolant passages are provided at positions 90° or more away from the power line insertion hole in the circumferential direction.

In the shaft body, the shaft body coolant passage extending in the axial direction and the power line insertion hole extending in the axial direction are provided in the diameter-expanded portion. In this configuration, there is a concern over a decrease in strength of the shaft body due to the hollowing stemming from the provision of the shaft body coolant passage and the power line insertion hole. In this respect, since the shaft body coolant passage is provided at a position 90° or more away from the power line insertion hole in the circumferential direction, a decrease in strength of the shaft body can be suppressed.

Desirably, in the shaft body, the shaft body coolant passage is provided at a position where the angle with respect to the power line insertion hole is 180° or near 180° in the circumferential direction. Accordingly, a decrease in strength of the shaft body can be further suppressed. Preferably, the interval in the circumferential direction between each of the two shaft body coolant passages and the power line insertion hole is an angular interval in the circumferential direction between a straight line passing through the center position of the power line insertion holes and a straight line passing through the center position of the power insertion hole.

In an eleventh example according to any one of the second to tenth example, the rotary electric machine is to be used in a direction where the axial direction is directed along a horizontal direction or a substantially horizontal direction.

The stator holder includes a coolant path extending in an annular shape in a circumferential direction to circulate a coolant in the circumferential direction, an inlet path, as an inlet of the coolant to the coolant path, extending in the axial direction, and an outlet path, as an outlet of the coolant from the coolant path, extending in the axial direction. In the coolant path, a path inlet, which communicates with the inlet path, and a path outlet, which communicates with the outlet path, are provided at positions where an angle with respect to a vertically upward direction is 45° or near 45°. The coolant path is configured to cause the coolant to flow from the path inlet in the circumferential direction downward in a vertical direction and to flow to the path outlet in the circumferential direction downward in the vertical direction.

In the rotary electric machine used in a direction in which the axial direction is directed along the horizontal direction or the substantially horizontal direction, the coolant path provided along the circumferential direction of the stator holder is disposed such that a coolant flows along an upright circle in the vertical direction. In this case, in the coolant path, the degree of retention of air bubbles inside the coolant path (i.e., the amount of air remaining in the coolant path) varies depending on the positions in the circumferential direction of the path inlet and the path outlet and the direction of flow of the coolant in the vertical direction (up or down) at the path inlet and the path outlet (direction of circulation). Accordingly, the coolant filling rate in the coolant path varies. Here, the path inlet and the path outlet are provided at a position where the angle with respect to the vertically upward direction is 45° or near 45°, and the flow of the coolant in the circumferential direction at the path inlet and the path outlet is directed to downward in the vertical direction. In this way, the retention of air bubbles in the coolant path can be reduced. As a result, the coolant is allowed to uniformly flow through the entire region of the coolant path, and thus the cooling performance of the rotary electric machine can be improved.

The flow of the coolant in the coolant path is directed such that "the coolant flows in the circumferential direction and downward in the vertical direction". This configuration corresponds to the configuration in which the coolant flows not upward but downward when circulating in the annular coolant path, and means that the coolant has a speed component in the vertically downward direction.

In a twelfth example according to the eleventh example, a stationary object including the stator holder has an end surface on one end side in the axial direction.

The end surface is provided with a power line terminal portion connected to the power line and pipe ports respectively communicating with the inlet path and the outlet path. The power line terminal portion and the pipe ports are respectively and separately provided on both sides of a vertical line interposed between the power line terminal portion and the pipe ports. The vertical line passes through an axial center of the rotary electric machine and extends in the vertical direction.

In the rotary electric machine used in a direction in which the axial direction is directed along a horizontal direction or a substantially horizontal direction, a power line terminal portion and a pipe port are assumed to be provided on an end surface on one end side in the axial direction of a stationary object including a stator holder. In such a case, as described above, when the path inlet and the path outlet of the coolant path are provided at positions where the angle with respect to the vertically upward direction is 45° or near 45°, the following concern may arise. If the coolant leaks at the pipe port leading to the path inlet or the path outlet, the leaking coolant flows downward and the power line terminal portion is exposed to the coolant. In this regard, the power line terminal portion and the pipe port are respectively and separately provided on both sides with the vertical line interposed therebetween. Accordingly, if the coolant leaks, the power line terminal portion is prevented from being exposed to the coolant.

In a thirteenth example according to the first example, a stator holder in a cylindrical shape and assembled inside the stator in the radial direction. A shaft body provided in a hollow portion of the stator holder and pivotally supports a rotary object including the rotor. The rotary electric machine is an outer-rotor type rotary electric machine including the rotor provided outside the stator in the radial direction. The shaft body includes a first insertion hole and a second insertion hole both extending in the axial direction. The power line is inserted through the first insertion hole. The signal line is inserted through the second insertion hole. A portion of the shaft body between the first insertion hole and the second insertion hole is the blocking portion.

An outer-rotor type rotary electric machine is conceivably configured such that a stator holder is assembled to the inner side of the stator in the radial direction and a shaft body that pivotally supports a rotary object including a rotor is provided in the hollow portion of the stator holder. In this case, the power line and the signal line are respectively inserted through the first insertion hole and the second insertion hole provided in the shaft body, and the shaft body between the first insertion hole and the second insertion hole is allowed to serve as the blocking portion, so that the electromagnetic field generated by the power line is suitably prevented from affecting the signal line.

The embodiments will be described below with reference to the drawings. Parts of the embodiments functionally and/or structurally corresponding to each other and/or associated with each other will be denoted by the same reference numbers or by reference numbers which are different in the hundreds place from each other. The corresponding and/or associated parts may refer to the explanation in the other embodiments.

The rotary electric machine according to the embodiments is configured to be used, for example, as a power source for vehicles. The rotary electric machine may, however, be used widely for industrial, automotive, aerial, domestic, office automation, or game applications. In the following embodiments, the same or equivalent parts will be denoted by the same reference numbers in the drawings, and explanation thereof in detail will be omitted.

First Embodiment

Figure 2:
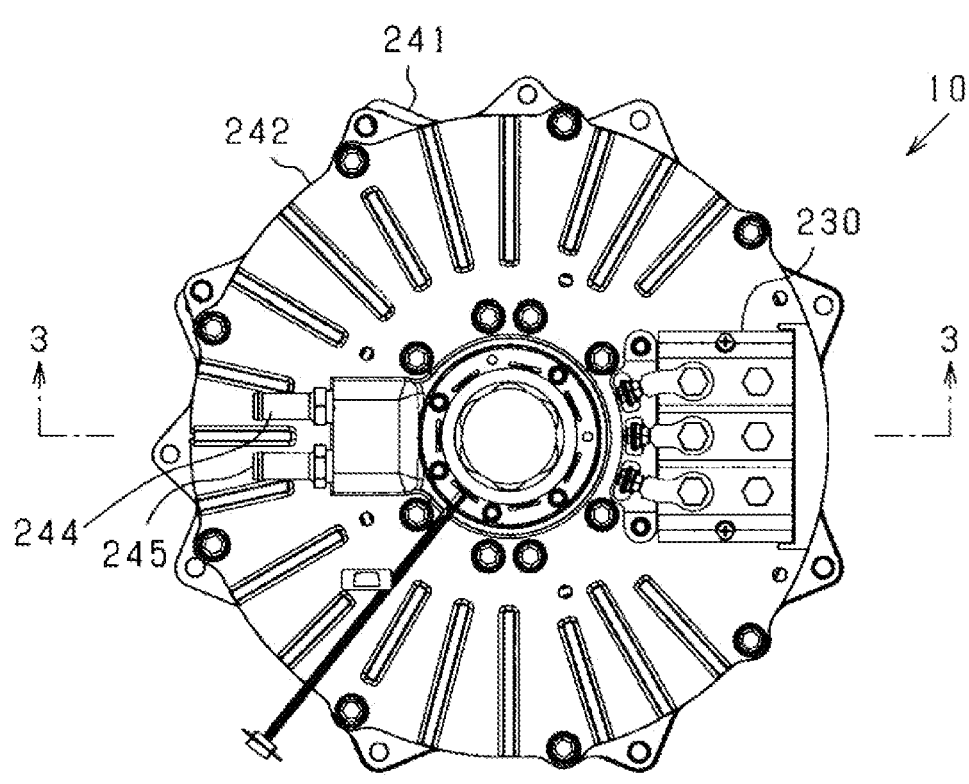
FIG. 2 is a plan view of the rotary electric machine.
Figure 3:
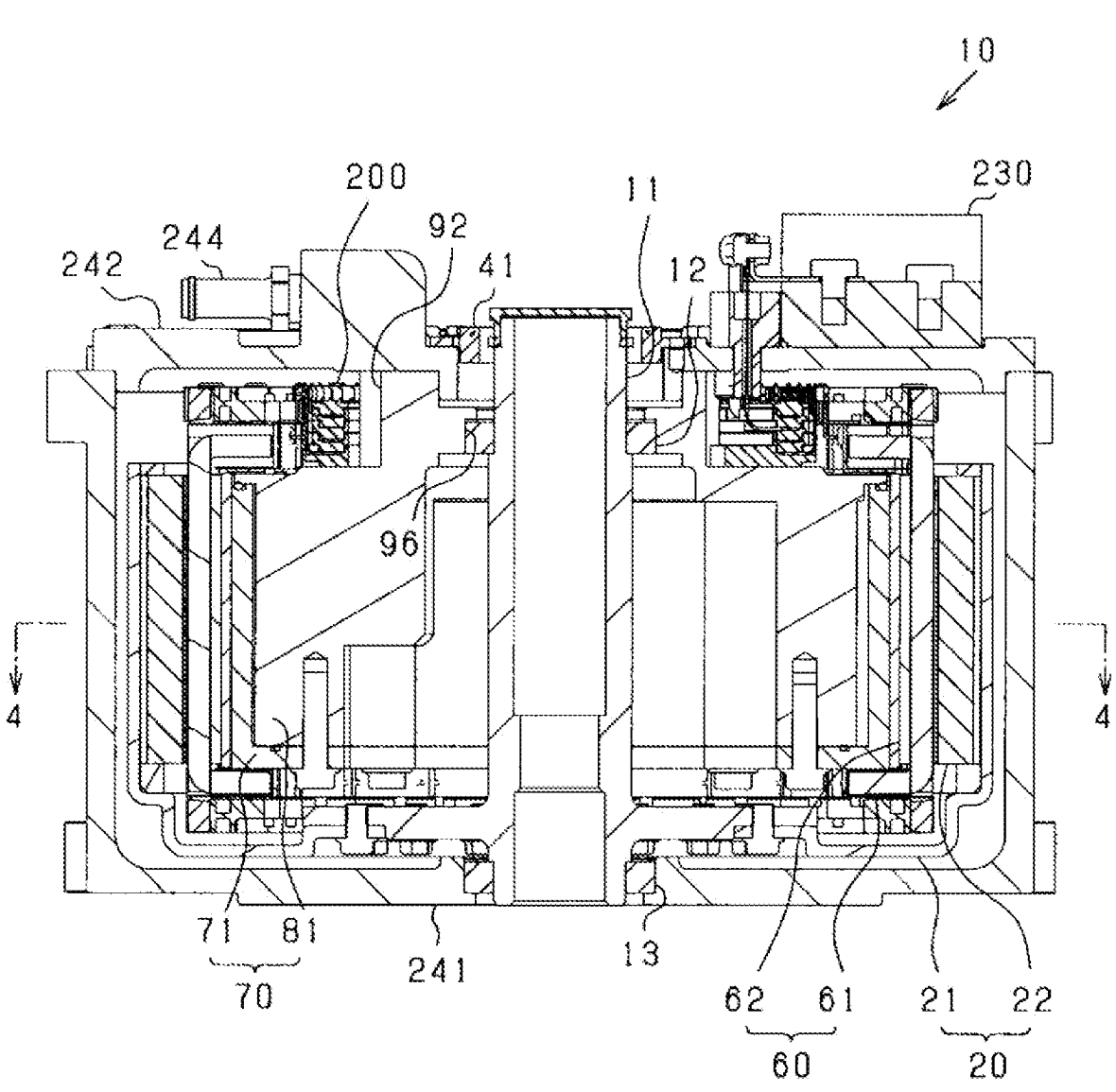
FIG. 3 is a longitudinal sectional view of the rotary electric machine.
Figure 4:
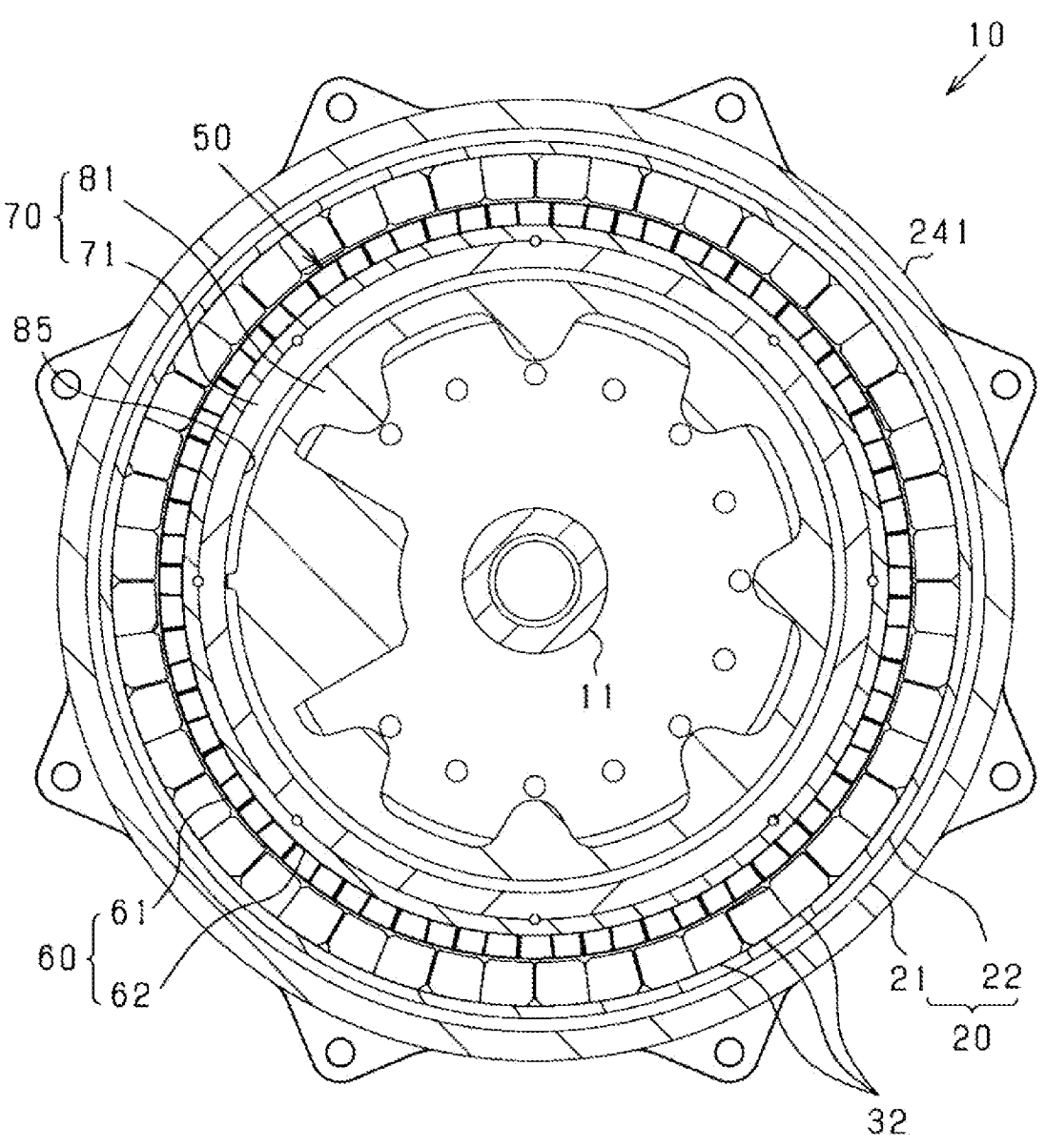
FIG. 4 is a transverse sectional view of the rotary electric machine.
Figure 5:
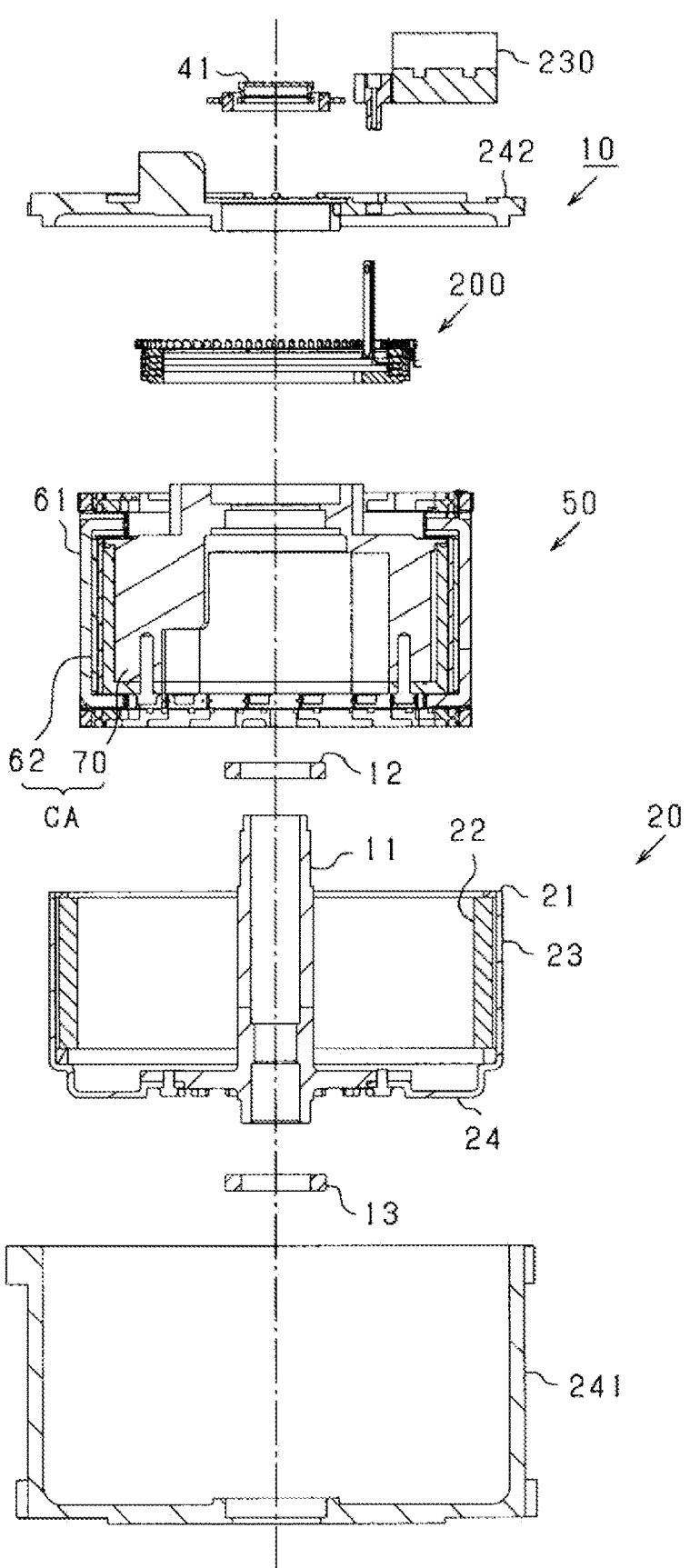
FIG. 5 is an exploded sectional view of the rotary electric machine.

A rotary electric machine 10 according to the present embodiment is a synchronous multi-phase alternating current (AC) motor and has an outer rotor structure (outer rotating structure). A schema of the rotary electric machine 10 is illustrated in FIGS. 1 to 5. FIG. 1 is a perspective view illustrating the entire rotary electric machine 10. FIG. 2 is a plan view of the rotary electric machine 10. FIG. 3 is a longitudinal sectional view of the rotary electric machine 10 (a sectional view taken along line 3-3 in FIG. 2). FIG. 4 is a transverse sectional view of the rotary electric machine 10 (a sectional view taken along line 4-4 in FIG. 3). FIG. 5 is an exploded sectional view illustrating components of the rotary electric machine 10 in an exploded manner. In the following description, in the rotary electric machine 10, a direction in which a rotating shaft 11 extends is defined as an axial direction, a direction radially extending from a center of the rotating shaft 11 is defined as a radial direction, and a direction circumferentially extending around the rotating shaft 11 is defined as a circumferential direction.

In a broad classification, the rotary electric machine 10 includes: a rotary electric machine body including a rotor 20, a stator unit 50, and a bus bar module 200; and a housing 241 and a housing cover 242 both of which are provided so as to surround the rotary electric machine body. Each of these members is disposed coaxially with the rotating shaft 11 integrally provided in the rotor 20, and is assembled in the axial direction in a predetermined order to form the rotary electric machine 10. The rotating shaft 11 is supported by a pair of bearings 12 and 13 provided in the stator unit 50 and the housing 241, respectively, and is rotatable in this state. The bearings 12 and 13 are, for example, radial ball bearings having an inner race, an outer race, and a plurality of balls disposed therebetween. The rotation of the rotating shaft 11 causes, for example, the axle of a vehicle to rotate. The rotary electric machine 10 can be mounted on a vehicle by fixing the housing 241 to a vehicle body frame or the like.

In the rotary electric machine 10, the stator unit 50 is provided so as to surround the rotating shaft 11, and the rotor 20 is disposed on the outer side of the stator unit 50 in the radial direction. The stator unit 50 includes a stator 60 and a stator holder 70 assembled to the inner side of the stator 60 in the radial direction. The rotor 20 and the stator 60 are disposed to face each other in the radial direction with an air gap interposed therebetween. The rotor 20 rotates integrally with the rotating shaft 11, so that the rotor 20 rotates on the outer side of the stator 60 in the radial direction. The rotor 20 corresponds to a "magnetic field-producing unit", and the stator 60 corresponds to an "armature".

Figure 6:
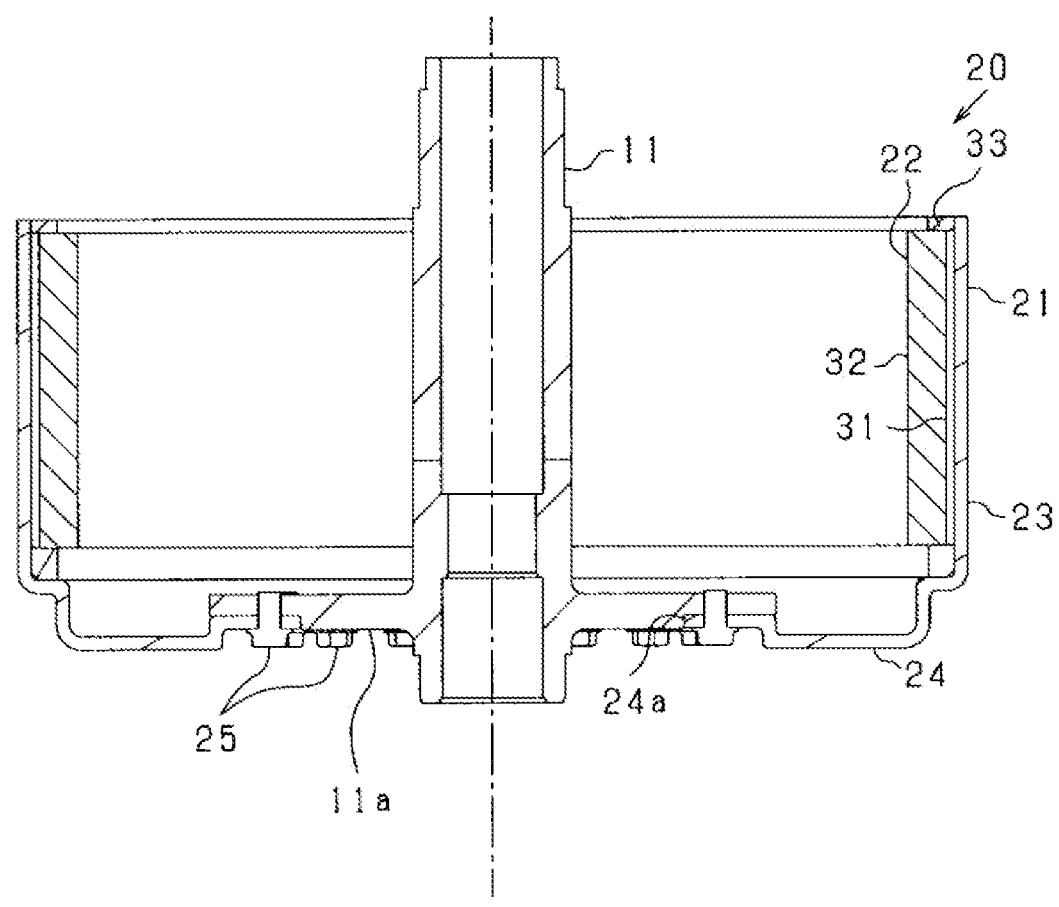
FIG. 6 is a sectional view of a rotor.

FIG. 6 is a longitudinal sectional view of the rotor 20. As illustrated in FIG. 6, the rotor 20 includes a substantially cylindrical rotor carrier 21 and an annular magnet unit 22 fixed to the rotor carrier 21. The rotor carrier 21 includes a cylinder 23 having a cylindrical shape and an end plate portion 24 provided at one end of the cylinder 23 in the axial direction. The cylinder 23 and the end plate portion 24 are integrated to form the rotor carrier 21. The rotor carrier 21 functions as a magnet retainer, and the magnet unit 22 is fixed to the inner side of the cylinder 23 in the radial direction to have an annular shape. A through-hole 24a is formed in the end plate portion 24. The rotating shaft 11 is fixed to the end plate portion 24 by using a fastener 25 such as a bolt while the rotating shaft 11 is inserted through the through-hole 24a. The rotating shaft 11 has a flange 11a extending in a direction intersecting (orthogonal to) the axial direction. The rotor carrier 21 is fixed to the rotating shaft 11 while the flange 11a and the end plate portion 24 are surface-joined.

The magnet unit 22 includes a cylindrical magnet holder 31, a plurality of magnets 32 fixed to an inner peripheral surface of the magnet holder 31, and an end plate 33 fixed to an opposite side of the end plate portion 24 of the rotor carrier 21 among both sides in the axial direction. The magnet holder 31 has the same length dimension as the magnet 32 in the axial direction. The magnet 32 is provided in a state of being surrounded by the magnet holder 31 from the outer side in the radial direction. The magnet holder 31 and the magnet 32 are fixed while being in contact with the end plate 33 at the end on one side in the axial direction. The magnet unit 22 corresponds to a "magnet unit".

Figure 7:
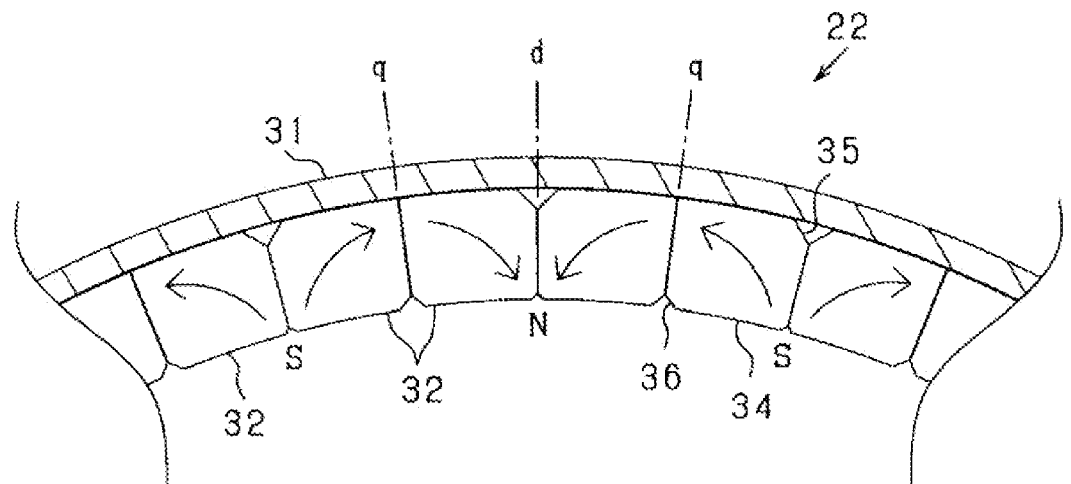
FIG. 7 is a partial transverse sectional view illustrating a sectional structure of a magnet unit.

FIG. 7 is a partial transverse sectional view illustrating a sectional structure of the magnet unit 22. In FIG. 7, the direction of the easy axis of magnetization of the magnet 32 is indicated by an arrow.

In the magnet unit 22, the magnets 32 are provided side by side such that the polarities are alternately changed along the circumferential direction of the rotor 20. Thus, the magnet unit 22 has a plurality of magnetic poles in the circumferential direction. The magnet 32 is a polar anisotropic permanent magnet, and is formed using a sintered neodymium magnet having an intrinsic coercive force of 400 [kA/m] or more and a remanent flux density Br of 1.0 [T] or more.

A peripheral surface of the magnet 32 on the inner side in the radial direction (stator 60 side) is a magnetic flux acting surface 34 on which a magnetic flux is transmitted and received. The magnet unit 22 intensively generates a magnetic flux in a region on or near the d-axis serving as the center of the magnetic pole on the magnetic flux acting surface 34 of the magnet 32. Specifically, in the magnet 32, the directions of the easy axis of magnetization differ between the d-axis side (portion closer to the d-axis) and the q-axis side (portion closer to the q-axis). The direction of the easy axis of magnetization on the d-axis side is parallel to the d-axis, whereas the direction of the easy axis of magnetization on the q-axis side is orthogonal to the q-axis. In this case, an arc-shaped magnetic path is formed along the direction of the easy axis of magnetization. In short, the magnet 32 is oriented such that the direction of the easy axis of magnetization is parallel to the d-axis serving as the center of the magnetic pole on a side of the d-axis as compared with that on a side of the q-axis serving as the boundary of the magnetic pole.

In the magnet 32, since the magnetic path is formed in an arc shape, the length of the magnetic path is greater than the thickness dimension of the magnet 32 in the radial direction. With this configuration, the permeance of the magnet 32 increases, and the magnet 32 can exhibit an ability equivalent or corresponding to a magnet having a large volume of magnets, without changing the volume of magnets.

Two magnets 32 adjacent to each other in the circumferential direction as one set constitutes one magnetic pole. That is, the plurality of magnets 32 arranged in the circumferential direction in the magnet unit 22 has division surfaces on the d-axis and the q-axis. The magnets 32 are disposed while being in contact with or close to each other. The magnet 32 has an arc-shaped magnetic path as described above. On the q-axis, the N-pole and the S-pole face each other in the magnets 32 adjacent to each other in the circumferential direction. Therefore, the permeance on or near the q-axis can be improved. In addition, since the magnets 32 on both sides across the q-axis attract each other, the magnets 32 can maintain a state where the magnets 32 are in contact with each other. Therefore, this also contributes to improvement of permeance.

Figure 8:
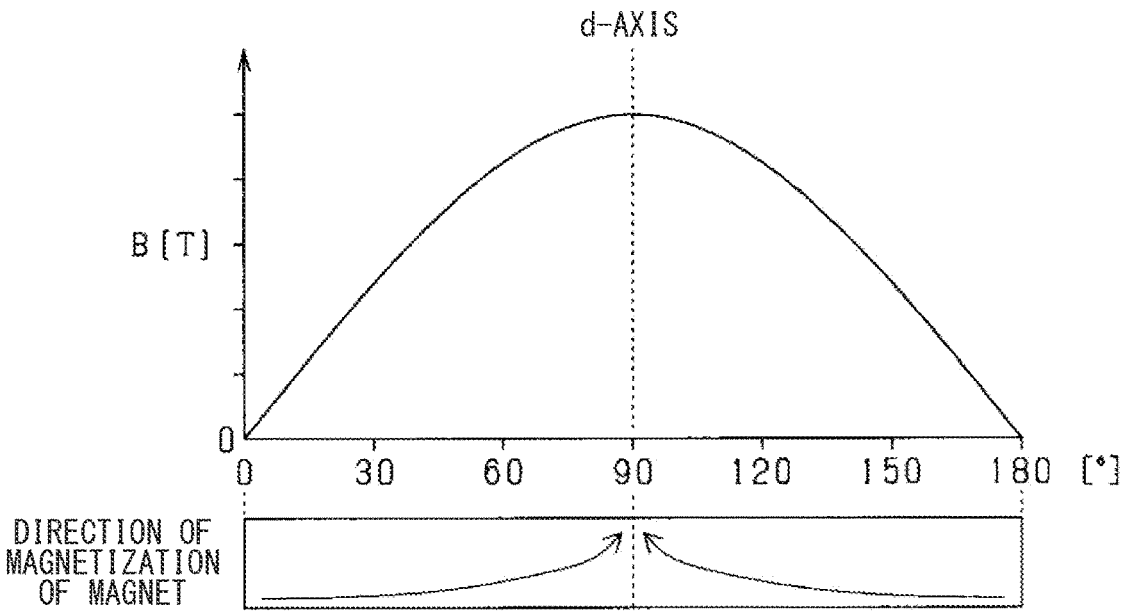
FIG. 8 is a graph illustrating a relationship between an electrical angle and a magnetic flux density for a magnet according to the embodiment.
Figure 9:
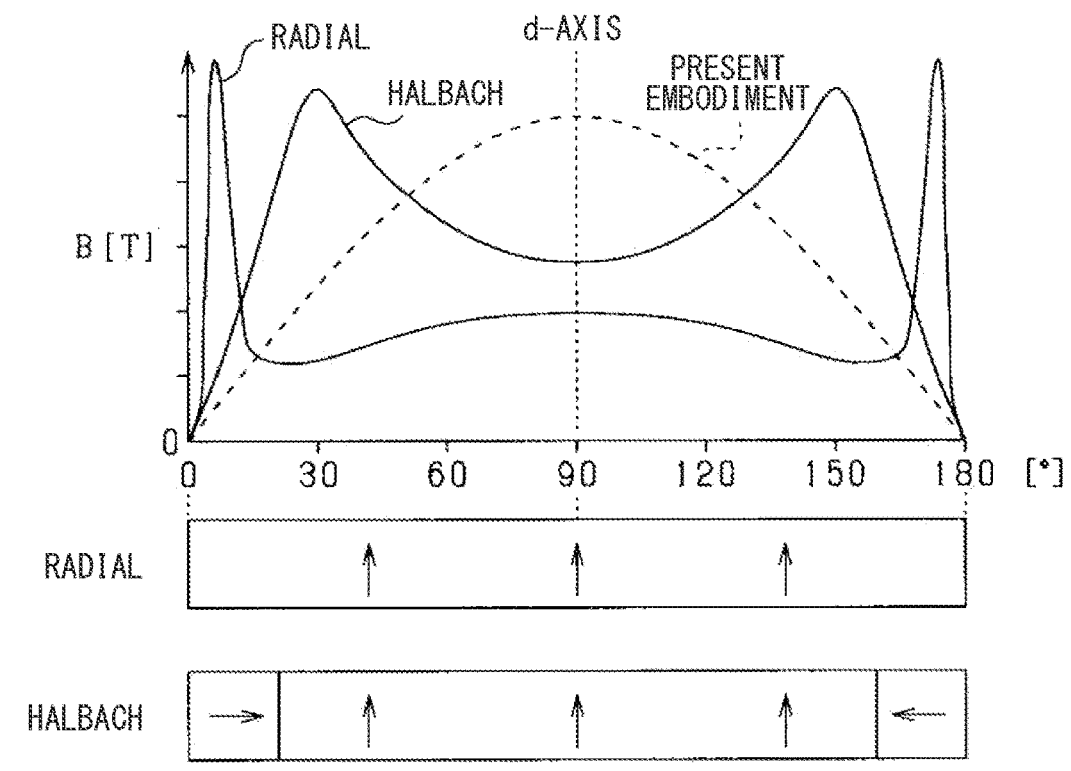
FIG. 9 is a graph illustrating a relationship between an electrical angle and a magnetic flux density for a magnet according to a comparative example.

In the magnet unit 22, since a magnetic flux flows in an arc shape between the adjacent N-pole and S-pole by each magnet 32, the magnetic path thereof is longer than, for example, that of the radial anisotropic magnet. Therefore, as illustrated in FIG. 8, the shape of the magnetic flux density distribution is close to a sine wave. As a result, unlike the magnetic flux density distribution of the radial anisotropic magnet illustrated in FIG. 9 as a comparative example, the magnetic flux can be concentrated on the center side of the magnetic pole, and the torque of the rotary electric machine 10 can be increased. Further, in the magnet unit 22 according to the present embodiment, the fact that there is a difference in the magnetic flux density distribution as compared with the conventional Halbach array magnet can be confirmed. In FIGS. 8 and 9, the horizontal axis represents the electrical angle, and the vertical axis represents the magnetic flux density. In FIGS. 8 and 9, 90° on the horizontal axis represents the d-axis (i.e., the center of the magnetic pole), and 0° and 180° on the horizontal axis each represent the q-axis.

That is, according to each magnet 32 having the above-described configuration, the magnetic flux on the d-axis is strengthened in the magnet unit 22, and the change in the magnetic flux on or near the q-axis is suppressed. Accordingly, implementation of the magnet unit 22 can be suitably performed in which the surface magnetic flux change from the q-axis to the d-axis is gentle in each magnetic pole.

The sine wave matching percentage of the magnetic flux density distribution is only required to be a certain value, for example, a value of 40% or more. This value setting can reliably improve the amount of magnetic flux in the central portion of the waveform, as compared with the case of using a radially oriented magnet or a parallel oriented magnet having a sine wave matching percentage of about 30%. Alternatively, when the sine wave matching percentage is set to 60% or more, the amount of magnetic flux in the central portion of the waveform can be reliably improved, as compared with a concentrated magnetic flux array such as a Halbach array.

In the radial anisotropic magnet illustrated in FIG. 9, the magnetic flux density changes steeply on or near the q-axis. As the change in the magnetic flux density is steeper, the eddy current undesirably increases in a stator winding 61 of the stator 60 to be described later. The magnetic flux change on the stator winding 61 side is also steep. On the other hand, in the present embodiment, the magnetic flux density distribution has a magnetic flux waveform close to a sine wave. Therefore, on or near the q-axis, the change in the magnetic flux density is smaller than the change in the magnetic flux density of the radial anisotropic magnet. This feature makes it possible to prevent the generation of eddy currents.

In the magnet 32, a recess 35 is formed in a predetermined range including the d-axis on the outer peripheral surface on the outer side in the radial direction, and a recess 36 is formed in a predetermined range including the q-axis on the inner peripheral surface on the inner side in the radial direction. In this case, according to the direction of the easy axis of magnetization of the magnet 32, the magnetic path is shortened on or near the d-axis on the outer peripheral surface of the magnet 32, and the magnetic path is shortened on or near the q-axis on the inner peripheral surface of the magnet 32. Therefore, considering the difficulty in causing the magnet 32 to generate a sufficient magnetic flux at a place where the length of the magnetic path is small, the magnet is removed at a place where the magnetic flux is weak.

The magnet unit 22 may use the magnets 32 whose number is identical to the number of the magnetic poles. For example, the magnet 32 is preferably provided such that one magnet is disposed between the d-axes, which serve as centers of two magnetic poles adjacent to each other in the circumferential direction. In this case, the magnet 32 has a center in the circumferential direction on the q-axis and has a division surface on the d-axis. Alternatively, the magnet 32 may have a center in the circumferential direction on the d-axis instead of the q-axis. As the magnet 32, instead of using magnets whose number is twice the number of magnetic poles or magnets whose number is identical to the number of magnetic poles, an annular magnet connected in an annular shape may be used.

As illustrated in FIG. 3, a resolver 41 as a rotation sensor is provided at an end (upper end in the drawing) on the opposite side of the joint portion with the rotor carrier 21 among both sides in the axial direction of the rotating shaft 11. The resolver 41 includes a resolver rotor fixed to the rotating shaft 11 and a resolver stator disposed to face the outer side of the resolver rotor in the radial direction. The resolver rotor has a disk ring shape. The resolver rotor is provided coaxially with the rotating shaft 11 while the rotating shaft 11 is inserted therethrough. The resolver stator includes a stator core and a stator coil, and is fixed to the housing cover 242.

Figure 10:
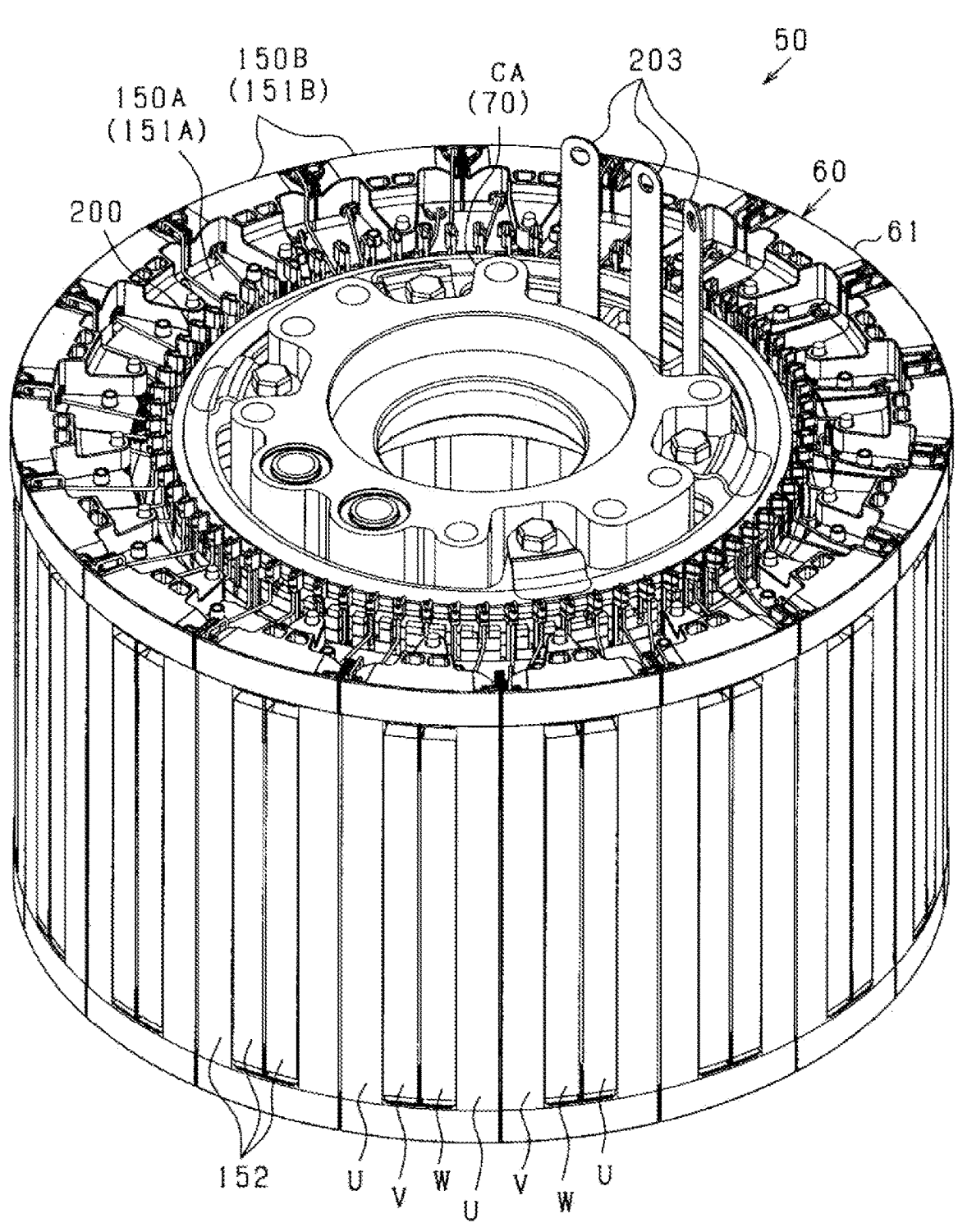
FIG. 10 is a perspective view of a stator unit.
Figure 11:
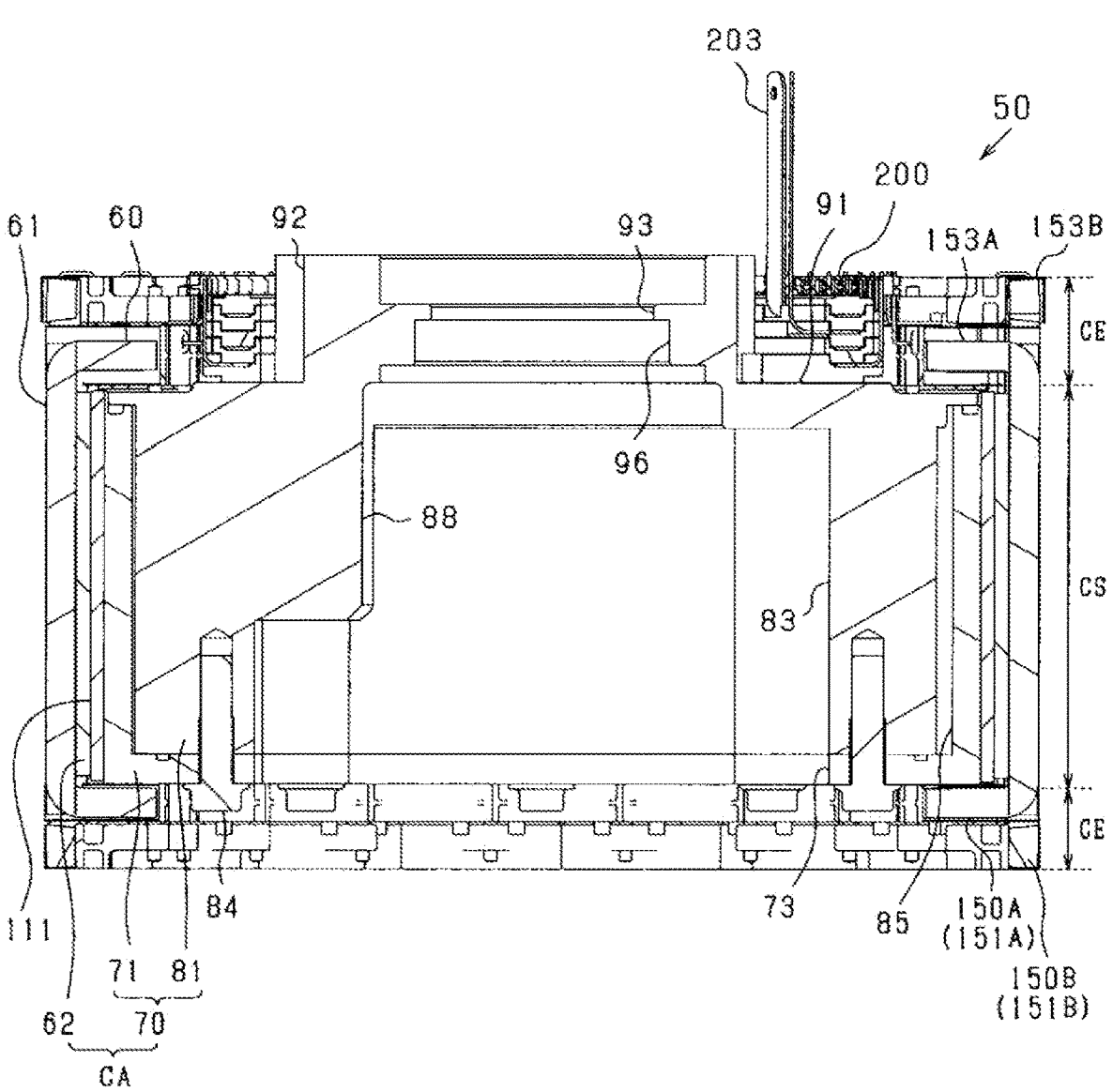
FIG. 11 is a longitudinal sectional view of the stator unit.

Next, a configuration of the stator unit 50 will be described. FIG. 10 is a perspective view of the stator unit 50, and FIG. 11 is a longitudinal sectional view of the stator unit 50. FIG. 11 is a longitudinal sectional view at the same position as FIG. 3.

The stator unit 50 includes the stator 60 and the stator holder 70 on the inner side of the stator 60 in the radial direction. The stator 60 includes the stator winding 61 and a stator core 62. The stator core 62 and the stator holder 70 are integrally provided as a core assembly CA, and a plurality of winding segments 151 constituting the stator winding 61 are assembled to the core assembly CA. The stator winding 61 corresponds to an "armature winding", the stator core 62 corresponds to an "armature core", and the stator holder 70 corresponds to an "armature retainer". The core assembly CA corresponds to a "support member".

Figure 12:
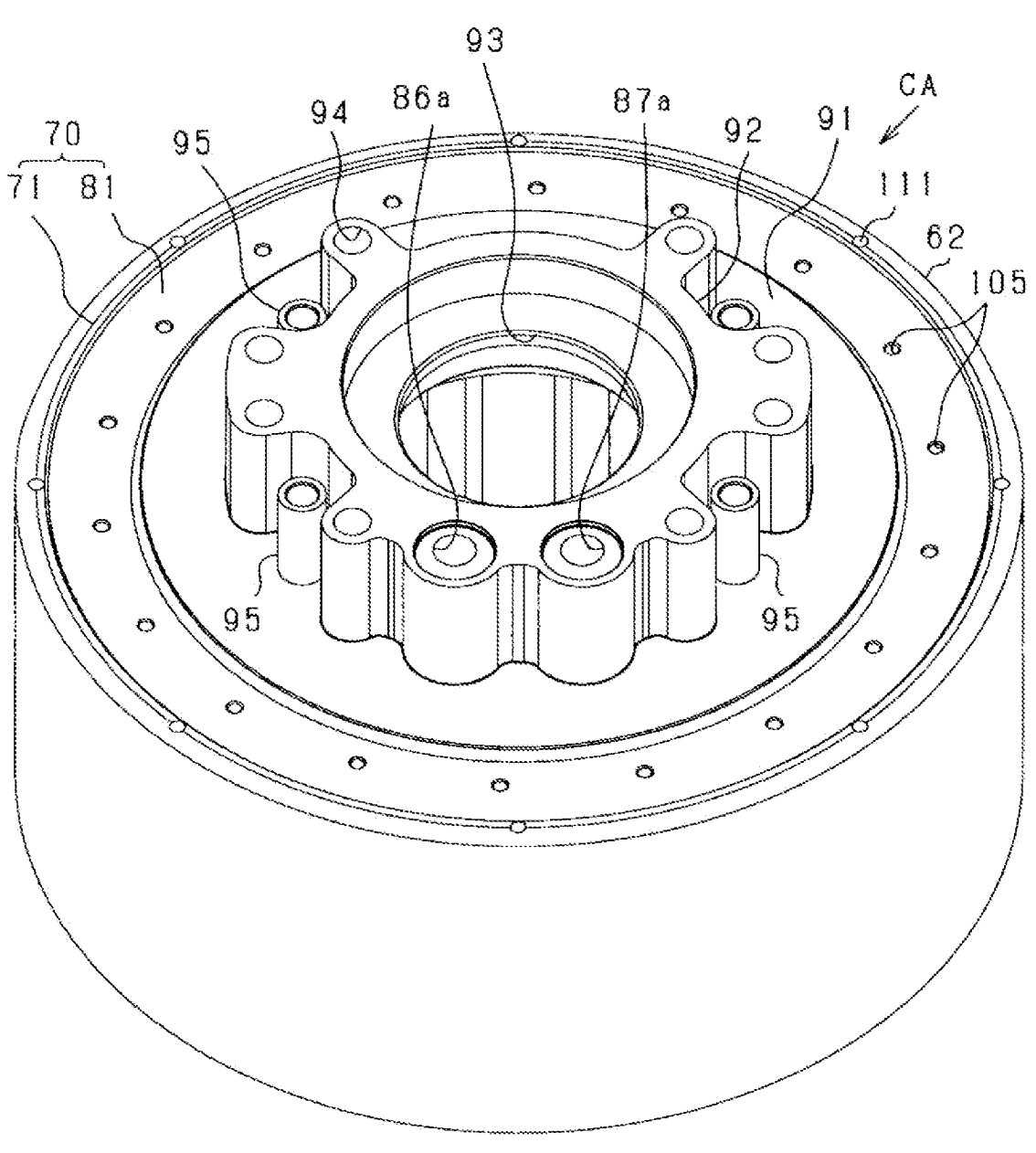
FIG. 12 is a perspective view of a core assembly as viewed from one side in an axial direction.
Figure 13:
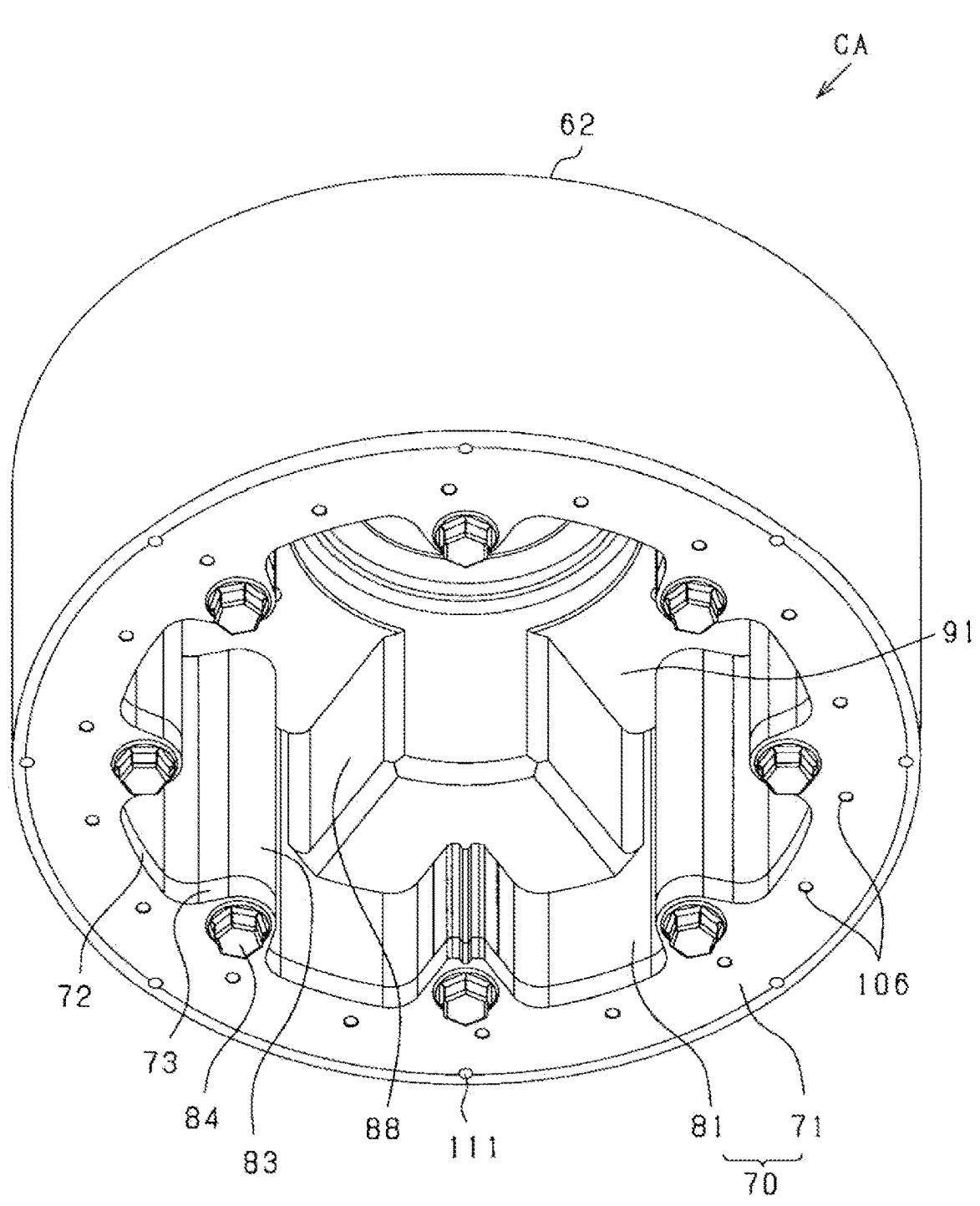
FIG. 13 is a perspective view of the core assembly as viewed from the other side in the axial direction.
Figure 14:
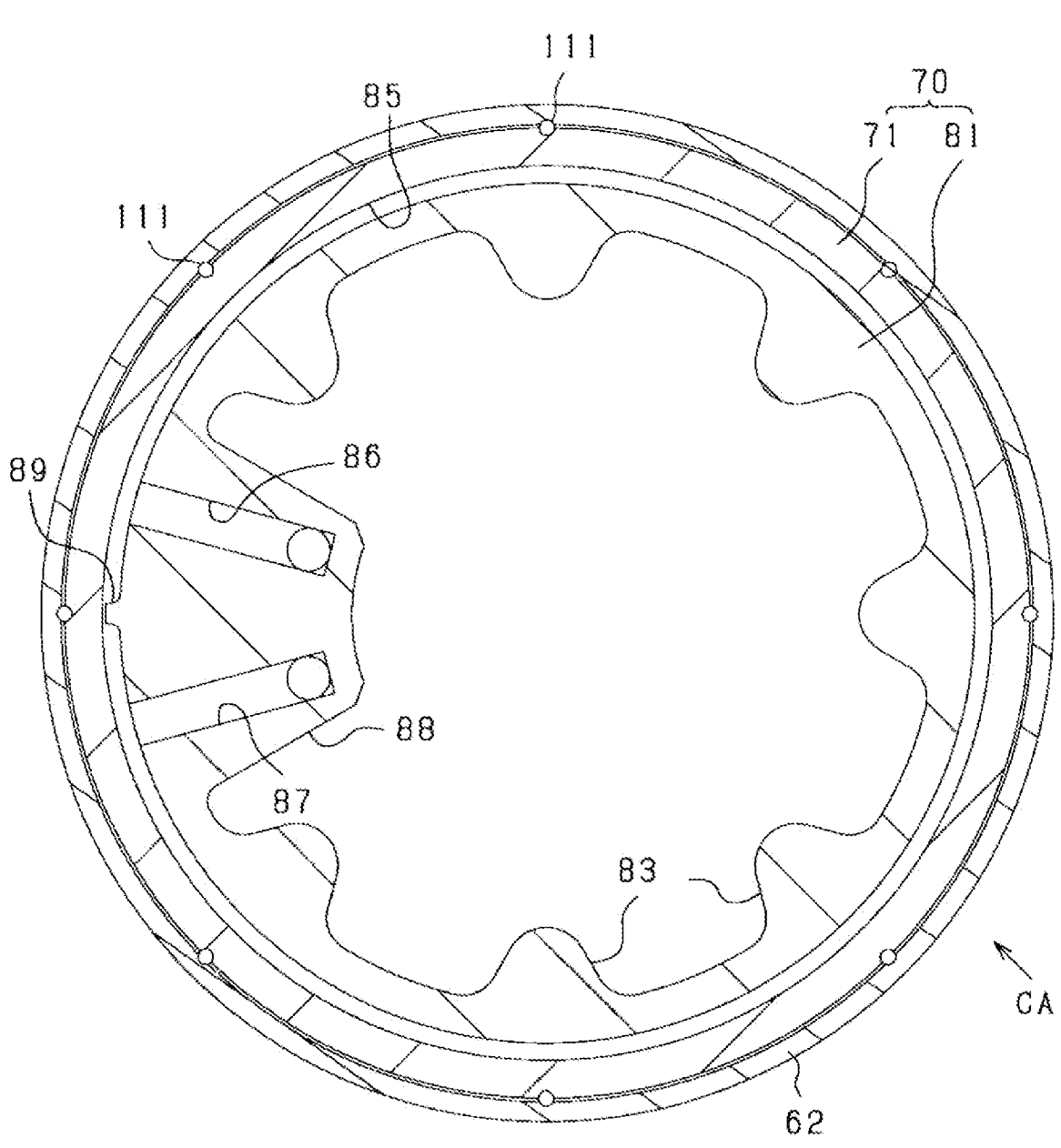
FIG. 14 is a transverse sectional view of the core assembly.
Figure 15:
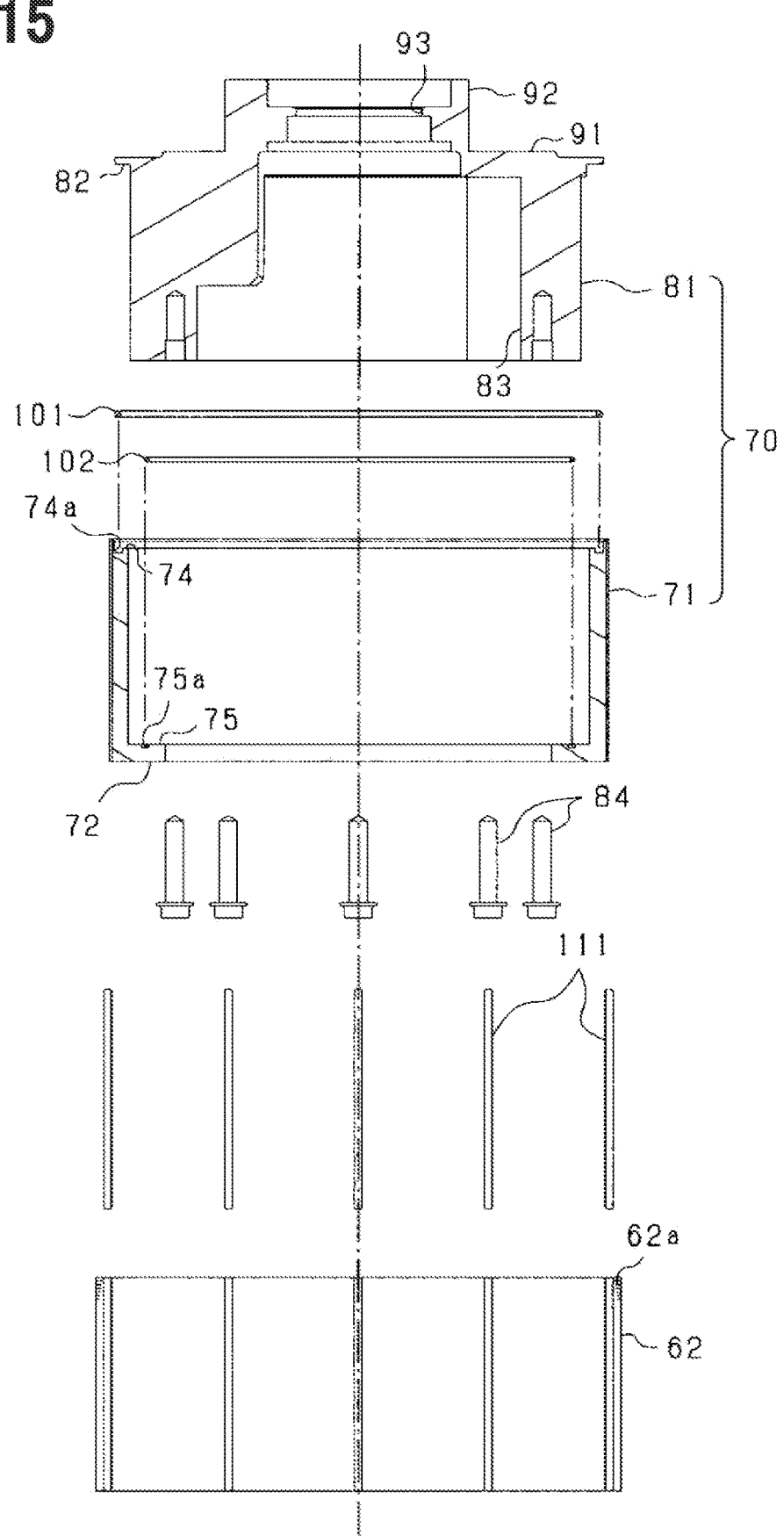
FIG. 15 is an exploded sectional view of the core assembly.

First, the core assembly CA will now be described. FIG. 12 is a perspective view of the core assembly CA as viewed from one side in the axial direction. FIG. 13 is a perspective view of the core assembly CA as viewed from the other side in the axial direction. FIG. 14 is a transverse sectional view of the core assembly CA. FIG. 15 is an exploded sectional view of the core assembly CA.

As described above, the core assembly CA includes the stator core 62 and the stator holder 70 assembled on the inner side of the stator core 62 in the radial direction. In other words, the stator core 62 is integrally assembled to the outer peripheral surface of the stator holder 70.

The stator core 62 is formed as a core sheet stacked body in which core sheets 62a including a magnetic steel sheet, which is a magnetic member, are stacked in the axial direction. The stator core 62 has a cylindrical shape having a predetermined thickness in the radial direction. The stator winding 61 is assembled to the outer side of the stator core 62 in the radial direction, that is, the rotor 20 side. The outer peripheral surface of the stator core 62 has a curved surface shape without protrusions and recesses. The stator core 62 functions as a back yoke. The stator core 62 is formed by stacking a plurality of the core sheets 62a in the axial direction. The core sheet 62a is punched into, for example, an annular plate shape. However, a stator core having a helical core structure may be used as the stator core 62. In the stator core 62 having a helical core structure, a strip-shaped core sheet is used. This core sheet is wound to have an annular shape and is stacked in the axial direction to form the stator core 62 having a cylindrical shape as a whole.

In the present embodiment, the stator 60 has a slot-less structure having no tooth for forming a slot, but the configuration thereof may use any of the following (A) to (C).

(A) The stator 60 includes a conductor-to-conductor member between each adjacent two of the conductor portions (intermediate conductor portions 152 to be described later) in the circumferential direction. As the conductor-to-conductor member, a magnetic material having a relationship of Wt×Bs≤Wm×Br is used, where Wt represents a width dimension in the circumferential direction of the conductor-to-conductor member in one magnetic pole, Bs represents a saturation magnetic flux density of the conductor-to-conductor member, Wm represents a width dimension in the circumferential direction of the magnet 32 in one magnetic pole, and Br represents a remanent flux density of the magnet 32.

(B) The stator 60 includes a conductor-to-conductor member between each adjacent two of the conductor portions (intermediate conductor portions 152) in the circumferential direction. A non-magnetic material is used as the conductor-to-conductor member.

(C) The stator 60 does not include a conductor-to-conductor member between each adjacent two of the conductor portions (intermediate conductor portions 152) in the circumferential direction.

As illustrated in FIG. 15, the stator holder 70 includes an outer cylinder member 71 and an inner cylinder member 81. The outer cylinder member 71 is disposed on the outer side in the radial direction and the inner cylinder member 81 is disposed on the inner side in the radial direction, and they are integrally assembled to form the stator holder 70. Each of these members 71 and 81 includes, for example, metal such as aluminum or cast iron, or carbon fiber reinforced plastic (CFRP).

The outer cylinder member 71 is a cylindrical member having the outer peripheral surface and the inner peripheral surface, both of which are formed into an exact circular curved surface. An annular flange 72 extending inward in the radial direction is formed on one end side in the axial direction. The flange 72 includes a plurality of protrusions 73 extending inward in the radial direction at predetermined intervals in the circumferential direction (see FIG. 13). The outer cylinder member 71 includes facing surfaces 74 and 75 each facing the inner cylinder member 81 in the axial direction on one end side and the other end side in the axial direction, respectively. Annular grooves 74a and 75a that extend annularly are formed on the facing surfaces 74 and 75.

The inner cylinder member 81 is a cylindrical member having an outer diameter dimension smaller than an inner diameter dimension of the outer cylinder member 71. An outer peripheral surface of the inner cylinder member 81 is an exact circular curved surface concentric with the outer cylinder member 71. The inner cylinder member 81 includes an annular flange 82 extending outward in the radial direction on one end side in the axial direction. The inner cylinder member 81 is to be assembled to the outer cylinder member 71 while being in contact with the facing surfaces 74 and 75 of the outer cylinder member 71 in the axial direction. As illustrated in FIG. 13, the outer cylinder member 71 and the inner cylinder member 81 are assembled to each other by using a fastener 84 such as a bolt. Specifically, a plurality of protrusions 83 extending inward in the radial direction is formed on the inner peripheral side of the inner cylinder member 81 at predetermined intervals in the circumferential direction. The protrusions 73 and 83 are fastened to each other by using the fastener 84 while the end surface of the protrusion 83 in the axial direction and the protrusion 73 of the outer cylinder member 71 are stacked.

As illustrated in FIG. 14, the outer cylinder member 71 and the inner cylinder member 81 are assembled to each other. In this state, an annular gap is formed between the inner peripheral surface of the outer cylinder member 71 and the outer peripheral surface of the inner cylinder member 81. This gap space serves as a coolant path 85 through which a coolant such as cooling water flows. The coolant path 85 is provided to have an annular shape in the circumferential direction of the stator holder 70. More specifically, the inner cylinder member 81 includes a path formation wall 88. The path formation wall 88 protrudes inward in the radial direction on the inner peripheral side of the inner cylinder member 81. In the path formation wall 88, an inlet path 86 and an outlet path 87 are formed, and each of the paths 86 and 87 is open to the outer peripheral surface of the inner cylinder member 81. The inner cylinder member 81 includes, on the outer peripheral surface thereof, a partition 89 for partitioning the coolant path 85 into an inlet side and an outlet side. This configuration allows a coolant flowing in from the inlet path 86 to flow through the coolant path 85 in the circumferential direction, and then flow out from the outlet path 87.

The inlet path 86 and the outlet path 87 each include a one end extending in the radial direction to be open to the outer peripheral surface of the inner cylinder member 81, and each include the other end extending in the axial direction to be open to the end surface of the inner cylinder member 81 in the axial direction. FIG. 12 illustrates an inlet opening 86*a* communicating with the inlet path 86 and an outlet opening 87*a* communicating with the outlet path 87. The inlet path 86 and the outlet path 87 respectively communicate with an inlet port 244 and an outlet port 245 (see FIG. 1) attached to the housing cover 242. The coolant enters and exits through the ports 244 and 245, respectively.

A sealing members 101 and 102 for preventing leakage of the coolant in the coolant path 85 is provided at a joint portion between the outer cylinder member 71 and the inner cylinder member 81 (see FIG. 15). Specifically, the sealing members 101 and 102 are, for example, O-rings. The sealing members 101 and 102 are provided in a manner that the annular grooves 74*a* and 75*a* of the outer cylinder member 71 respectively receive the sealing members 101 and 102, and the outer cylinder member 71 and the inner cylinder member 81 respectively compress the sealing members 101 and 102.

As illustrated in FIG. 12, the inner cylinder member 81 has an end plate portion 91 on one end side in the axial direction. The end plate portion 91 includes a boss 92 having a hollow cylindrical shape extending in the axial direction. The Boss 92 is provided so as to surround an insertion hole 93 through which the rotating shaft 11 is inserted. The boss 92 includes a plurality of fastener 94 for fixing the housing cover 242. The end plate portion 91 includes a plurality of rods 95 extending in the axial direction on the outer side of the boss 92 in the radial direction. The rod 95 is a portion serving as a fixing portion for fixing the bus bar module 200, and details thereof will be described later. The boss 92 serves as a bearing retainer that retains the bearing 12. The bearing 12 is fixed to a bearing fixing portion 96 provided on the inner peripheral portion of the boss 92 (see FIG. 3).

As illustrated in FIGS. 12 and 13, the outer cylinder member 71 and the inner cylinder member 81 are respectively formed with recesses 105 and 106, both of which are used for fixing a plurality of coil modules 150 to be described later.

Specifically, as illustrated in FIG. 12, a plurality of the recesses 105 are formed at equal intervals in the circumferential direction on the end surface of the inner cylinder member 81 in the axial direction, more specifically, the outer end surface of the end plate portion 91 in the axial direction around the boss 92. As illustrated in FIG. 13, a plurality of the recesses 106 are formed at equal intervals in the circumferential direction on the end surface of the outer cylinder member 71 in the axial direction, more specifically, on the outer end surface of the flange 72 in the axial direction. These recesses 105 and 106 are each provided so as to be arranged on an imaginary circle concentric with the core assembly CA. The recesses 105 and 106 are provided at the same position in the circumferential direction, and the intervals and the number thereof are the same.

The stator core 62 is assembled while generating a compression force in the radial direction with respect to the stator holder 70 in order to secure the strength of assembly with respect to the stator holder 70. Specifically, the stator core 62 is fitted and fixed to the stator holder 70 with a predetermined interference by shrink-fitting or press-fitting.

In this case, the stator core 62 and the stator holder 70 can be said to be assembled while stress in the radial direction from one of them to the other is generated. In the case of increasing the torque of the rotary electric machine 10, for example, increase of the diameter of the stator 60 is conceivable. In such a case, the tightening force of the stator core 62 is increased in order to strengthen the joining of the stator core 62 to the stator holder 70. However, if the compressive stress (in other words, residual stress) of the stator core 62 is increased, there is a concern that the stator core 62 may be damaged.

To avoid the above problem, in the present embodiment, in the configuration in which the stator core 62 and the stator holder 70 are fitted and fixed to each other with predetermined interference, a regulation portion is provided at portions where the stator core 62 and the stator holder 70 face each other in the radial direction. The regulation portion regulates displacement of the stator core 62 in the circumferential direction by engagement in the circumferential direction. That is, as illustrated in FIGS. 12 to 14, a plurality of engagement members 111 as regulation portions are provided at predetermined intervals in the circumferential direction between the stator core 62 and the outer cylinder member 71 of the stator holder 70 in the radial direction. The engagement members 111 suppress positional shift between the stator core 62 and the stator holder 70 in the circumferential direction. In this case, a recess is preferably provided in at least one of the stator core 62 and the outer cylinder member 71, and the engagement member 111 may be engaged in the recess. Instead of the engagement member 111, a protrusion may be provided on one of the stator core 62 and the outer cylinder member 71.

In the above-described configuration, the stator core 62 and the stator holder 70 (outer cylinder member 71) are provided while mutual displacement in the circumferential direction is regulated by the engagement member 111 in addition to being fitted and fixed with predetermined interference. Therefore, even if the interference in the stator core 62 and the stator holder 70 is relatively small, the stator core 62 can be prevented from being displaced in the circumferential direction. Since a desired displacement prevention effect can be obtained even if the interference is relatively small, the stator core 62 can be prevented from being damaged due to an excessively large interference. As a result, the displacement of the stator core 62 can be appropriately prevented.

An annular internal space may be formed on the inner peripheral side of the inner cylinder member 81 so as to surround the rotating shaft 11. For example, an electrical component constituting an inverter as a power converter may be disposed in the internal space. The electrical component is, for example, an electrical module making a semiconductor switching element and a capacitor into a package. The electrical module is disposed in contact with the inner peripheral surface of the inner cylinder member 81, so that the electrical module can be cooled by the coolant flowing through the coolant path 85. On the inner peripheral side of the inner cylinder member 81, the plurality of protrusions 83 may be eliminated or the protruding height of the protrusions 83 may be reduced. This change can expand the internal space on the inner peripheral side of the inner cylinder member 81.

Next, the configuration of the stator winding 61 assembled to the core assembly CA will be described in detail. As illustrated in FIGS. 10 and 11, the stator winding 61 is assembled to the core assembly CA. The plurality of winding segments 151 constituting the stator winding 61 are assembled to the outer side of the core assembly CA in the radial direction, that is, to the outer side of the stator core 62 in the radial direction, to be arranged in the circumferential direction.

The stator winding 61 has a plurality of phase windings. The phase windings of respective phases are disposed in a predetermined order in the circumferential direction to be formed in a cylindrical shape (annular shape). In the present embodiment, the stator winding 61 has a three-phase windings including the U-phase, the V-phase, and the W-phase windings.

As illustrated in FIG. 11, the stator 60 includes, in the axial direction, a portion corresponding to a coil side CS facing the magnet unit 22 in the rotor 20 in the radial direction, and a portion corresponding to a coil end CE that is the outer side of the coil side CS in the axial direction. In this case, the stator core 62 is provided in a range corresponding to the coil side CS in the axial direction.

In the stator winding 61, the phase winding of each phase has the plurality of winding segments 151 (see FIG. 16), and the winding segments 151 are individually provided as the coil module 150. That is, the winding segments 151 in the phase windings of each phase are integrally provided to form the coil module 150. The coil modules 150 whose number is predetermined and corresponds to the number of poles constitute the stator winding 61. The coil modules 150 (winding segments 151) of the respective phases are disposed side by side in a predetermined order in the circumferential direction. The conductor portion of the respective phases are thus disposed side by side in a predetermined order at the coil side CS of the stator winding 61. FIG. 10 illustrates an arrangement order of the U-phase, V-phase, and W-phase conductor portions at the coil side CS. In the present embodiment, the number of magnetic poles is set to 24, but the number thereof can be freely set.

Figure 16:
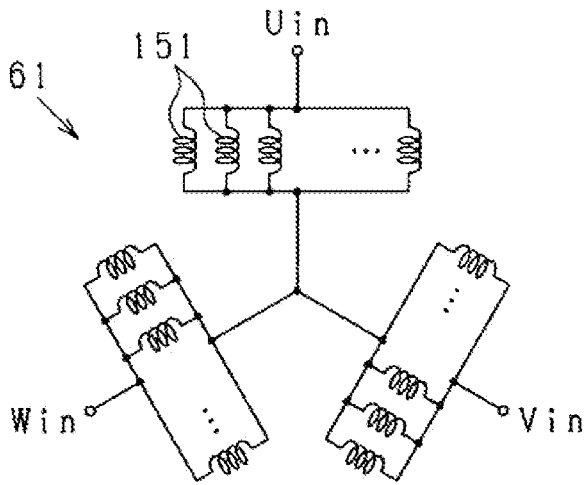
FIG. 16 is a circuit diagram illustrating a connection state of a winding segment in each three-phase winding.

In the stator winding 61, the winding segments 151 of the coil modules 150 are connected in parallel or in series for respective phases, thereby forming phase windings of respective phases. FIG. 16 is a circuit diagram illustrating a connection state of the winding segment 151 in each three-phase winding. FIG. 16 illustrates the winding segments 151 in the phase windings of respective phases in a state of being connected in parallel.

As illustrated in FIG. 11, the coil module 150 is assembled on the outer side of the stator core 62 in the radial direction. In this case, the coil module 150 is assembled while both end portions thereof in the axial direction protrude outward in the axial direction from the stator core 62 (that is, the coil end CE side). In other words, the stator winding 61 has a portion corresponding to the coil end CE protruding outward in the axial direction from the stator core 62, and a portion corresponding to the coil side CS on the inner side of the coil end CE in the axial direction.

The coil module 150 has two types of shapes. One is a shape in which the winding segment 151 is bent inward in the radial direction, that is, bent toward the stator core 62 at the coil end CE. The other is a shape in which the winding segment 151 is not bent inward in the radial direction and extends linearly in the axial direction at the coil end CE. In the following description, for convenience, the winding segment 151 having a bent shape on both end sides in the axial direction is also referred to as a "first winding segment 151A", and the coil module 150 having the first winding segment 151A is also referred to as a "first coil module 150A". On the other hand, the winding segment 151 not having a bent shape on both end sides in the axial direction is also referred to as a "second winding segment 151B", and the coil module 150 having the second winding segment 151B is also referred to as a "second coil module 150B".

Figure 17:
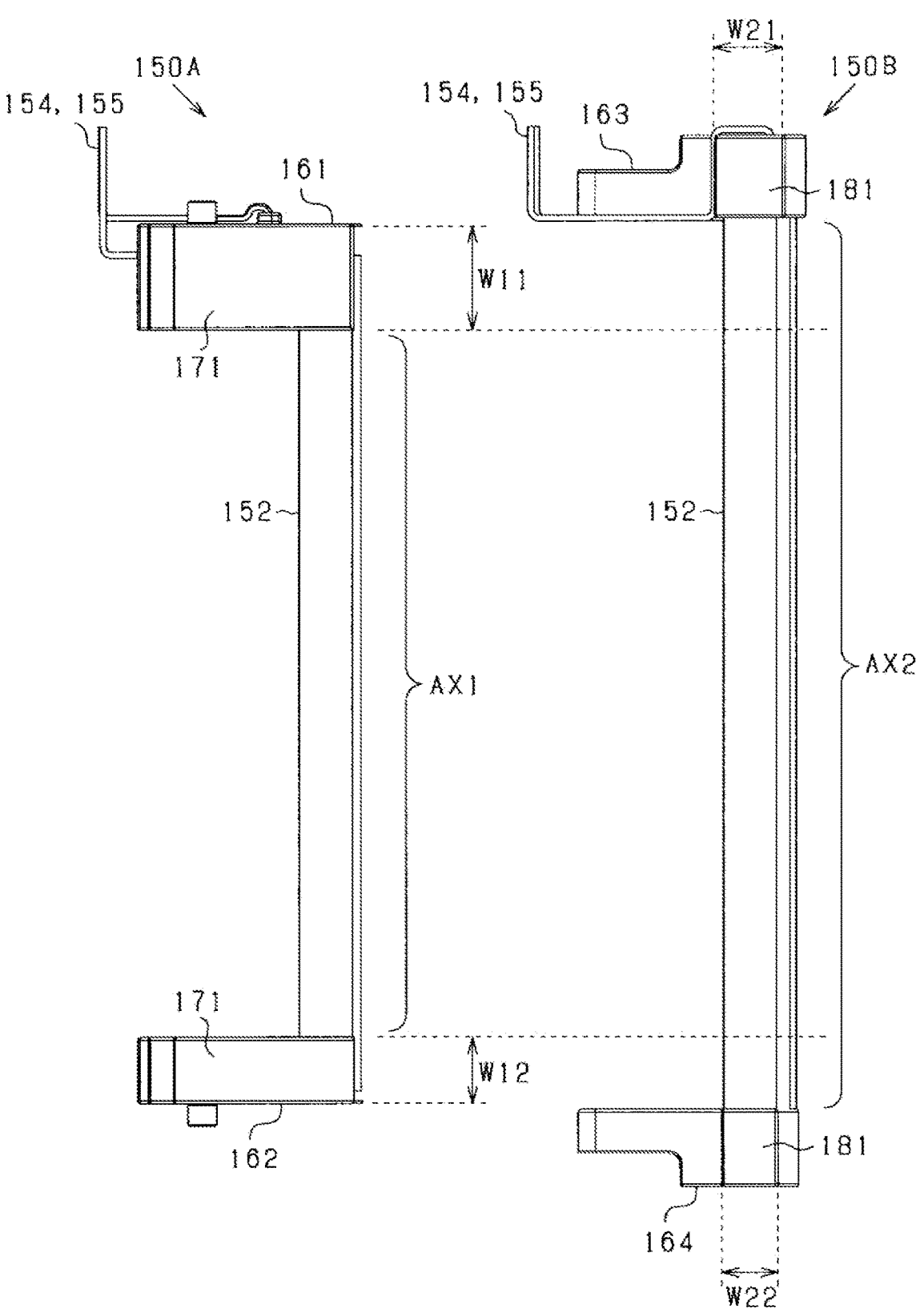
FIG. 17 is a side view illustrating a first coil module and a second coil module arranged side by side for comparison.
Figure 18:
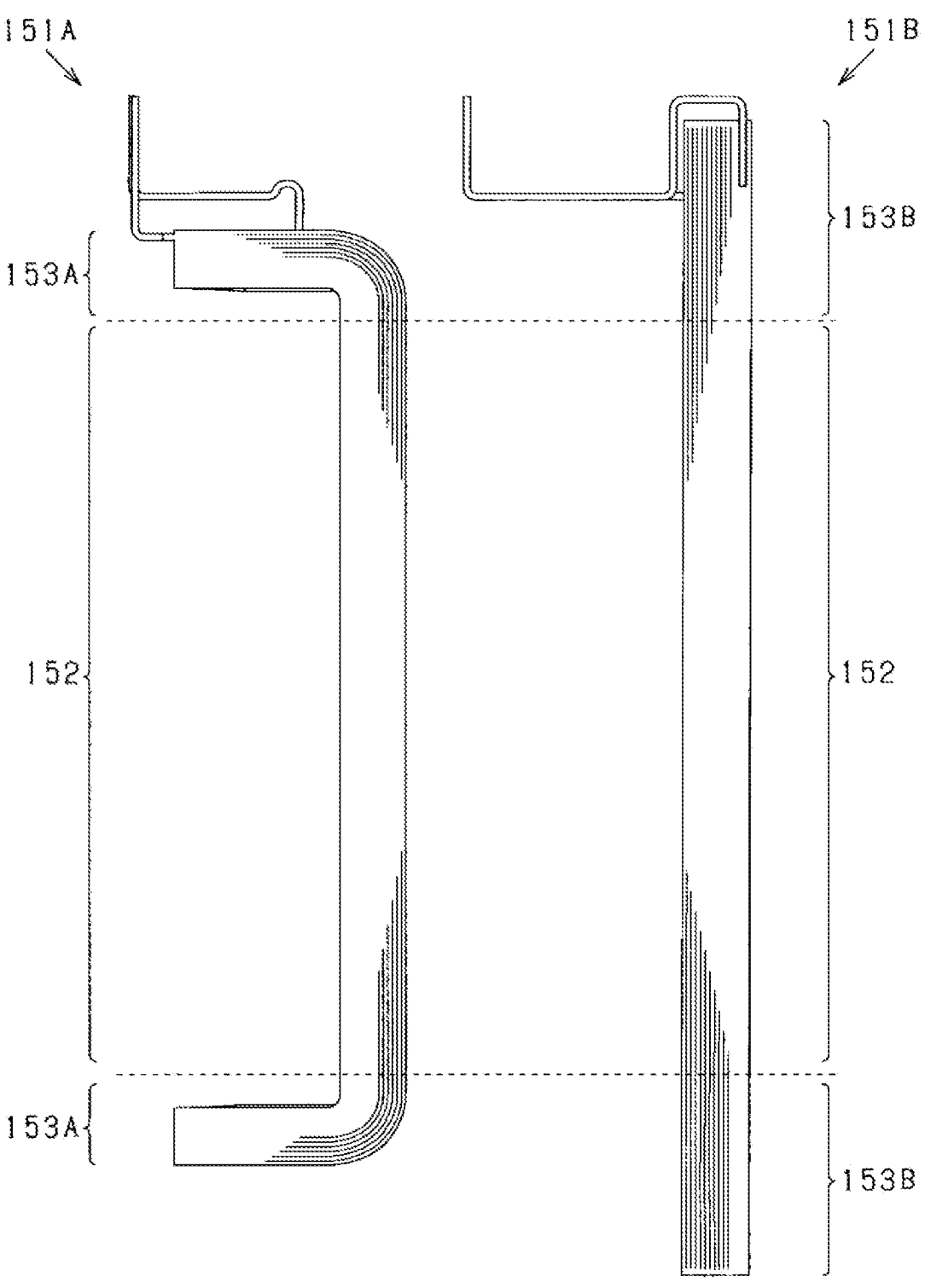
FIG. 18 is a side view illustrating a first winding segment and a second winding segment arranged side by side for comparison.

FIG. 17 is a side view illustrating the first coil module 150A and the second coil module 150B arranged side by side for comparison. FIG. 18 is a side view illustrating the first winding segment 151A and the second winding segment 151B arranged side by side for comparison. As illustrated in these drawings, the coil modules 150A and 150B and the winding segments 151A and 151B have different lengths in the axial direction and different end shapes on both sides in the axial direction. The first winding segment 151A has a substantially C shape in a side view, and the second winding segment 151B has a substantially I shape in a side view. The first winding segment 151A is mounted with insulating covers 161 and 162 as "first insulating covers" on both sides in the axial direction, and the second winding segment 151B is mounted with insulating covers 163 and 164 as "second insulating covers" on both sides in the axial direction.

Next, the configurations of the coil modules 150A and 150B will be described in detail.

Figure 19:
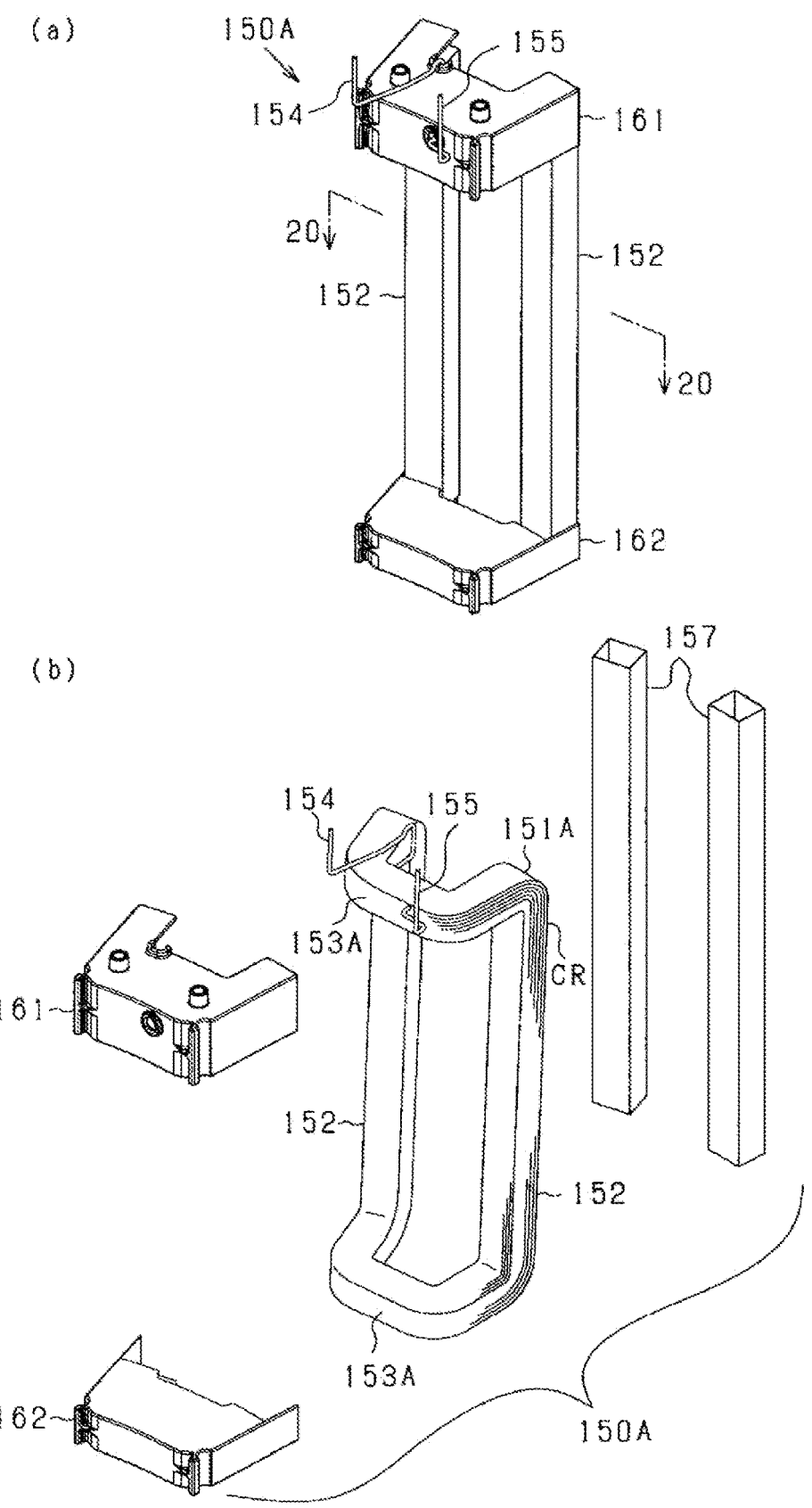
FIG. 19 is a set of views illustrating a configuration of the first coil module.
Figure 20:
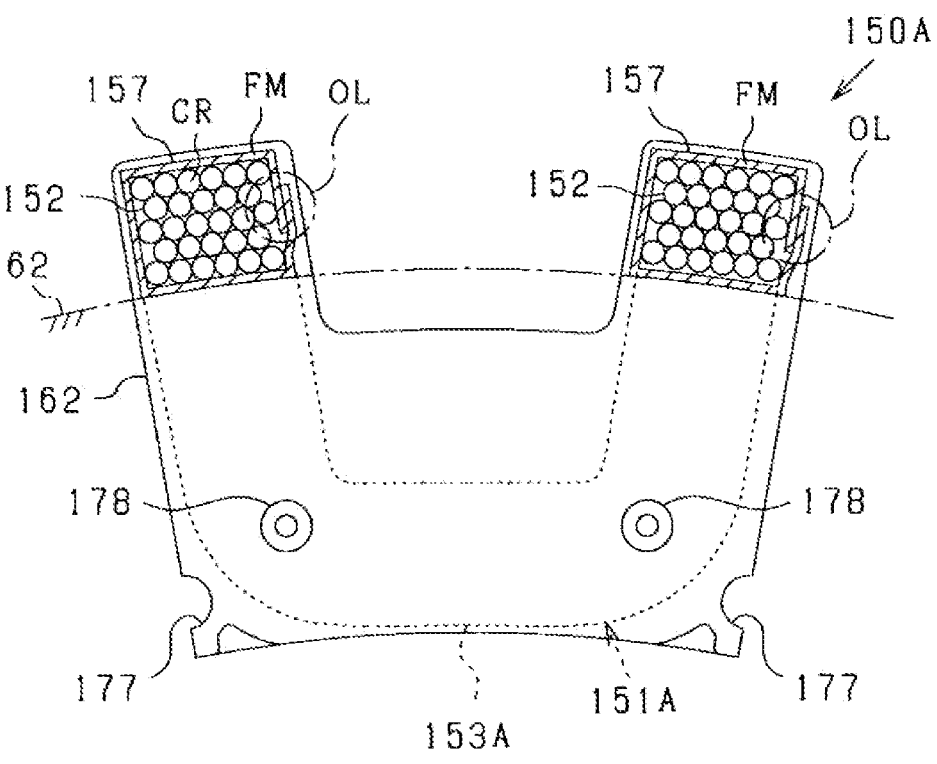
FIG. 20 is a sectional view taken along line 20-20 in (a) of FIG. 19.

Of the coil modules 150A and 150B, first, the first coil module 150A will now be described. (a) of FIG. 19 is a perspective view illustrating a configuration of the first coil module 150A. (b) of FIG. 19 is an exploded perspective view illustrating components of the first coil module 150A. FIG. 20 is a sectional view taken along line 20-20 in (a) of FIG. 19.

As illustrated in (a) and (b) of FIG. 19, the first coil module 150A includes the first winding segment 151A and the insulating covers 161 and 162. The first winding segment 151A is formed by multiply winding a conductive wire member CR. The insulating covers 161 and 162 are respectively attached to one end side and the other end side of the first winding segment 151A in the axial direction. The insulating covers 161 and 162 are each formed of an insulating material such as synthetic resin.

The first winding segment 151A includes a pair of intermediate conductor portions 152 and a pair of link portions 153A. The pair of intermediate conductor portions 152 are provided to be in parallel to each other and have a linear shape. The pair of link portions 153A respectively connect the pair of intermediate conductor portions 152 at both ends in the axial direction. The first winding segment 151A is formed to have an annular shape by the pair of intermediate conductor portions 152 and the pair of link portions 153A. The pair of intermediate conductor portions 152 are separated at a predetermined coil pitch. The intermediate conductor portions 152 of the winding segments 151 of the other phases can be disposed between the pair of intermediate conductor portions 152 in the circumferential direction. In the present embodiment, the pair of intermediate conductor portions 152 are separated at two coil pitches. One intermediate conductor portion 152 for each of the winding segments 151 of the other two phases is disposed between the pair of intermediate conductor portions 152.

The pair of link portions 153A have the shape identical to each other on both sides in the axial direction, and are provided as portions corresponding to the coil ends CE (see FIG. 11). Each of the link portions 153A is provided so as to be bent in a direction orthogonal to the intermediate conductor portion 152, that is, in a direction orthogonal to the axial direction.

As illustrated in FIG. 18, the first winding segment 151A has the link portion 153A on both sides in the axial direction, and the second winding segment 151B has a link portion 153B on both sides in the axial direction. The link portions 153A and 153B of the respective winding segments 151A and 151B have different shapes. In order to clarify the distinction, the link portion 153A of the first winding segment 151A is also referred to as a "first link portion 153A", and the link portion 153B of the second winding segment 151B is also referred to as a "second link portion 153B".

In each of the winding segments 151A and 151B, the intermediate conductor portion 152 is provided as a coil side conductor portion arranged one by one in the circumferential direction at the coil side CS. Each of the link portions 153A and 153B is provided as a coil end conductor portion connecting the intermediate conductor portions 152 of the same phase at two positions different in the circumferential direction at the coil end CE.

As illustrated in FIG. 20, the first winding segment 151A is formed by multiply winding the conductive wire member CR such that the transverse section of a bunch of conductive wire members is quadrangular. FIG. 20 illustrates a transverse section of the intermediate conductor portion 152. In the intermediate conductor portion 152, the conductive wire member CR is multiply wound so as to be arranged in the circumferential direction and the radial direction. In other words, the conductive wire member CR is arranged in a plurality of rows in the circumferential direction and arranged in a plurality of rows in the radial direction in the intermediate conductor portion 152. With this arrangement, the first winding segment 151A is formed such that the transverse section of a bunch of conductive wire members has a substantially rectangular shape. At the extending end of the first link portion 153A, the conductive wire member CR is multiply wound so as to be arranged in the axial direction and the radial direction by being bent in the radial direction. In the present embodiment, the conductive wire member CR is concentrically wound to form the first winding segment 151A. However, any winding method of the conductive wire member CR may be employed. The conductive wire member CR may be multiply wound in a form of alpha winding instead of concentric winding.

In the first winding segment 151A, an end of the conductive wire member CR is drawn out from one first link portion 153A (the first link portion 153A on the upper side of FIG. 19(b)) among the first link portions 153A on both sides in the axial direction. These ends serve as winding ends 154 and 155. The winding ends 154 and 155 are portions that respectively start and end winding of the conductive wire member CR. One of the winding ends 154 and 155 is connected to a current (input/output) I/O terminal, and the other is connected to a neutral point.

In the first winding segment 151A, each intermediate conductor portion 152 is covered with a sheet-like insulating jacket 157. (a) of FIG. 19 illustrates the first coil module 150A in which the intermediate conductor portion 152 is covered with the insulating jacket 157 and is on the inner side of the insulating jacket 157. However, for convenience, such a portion is referred to as an intermediate conductor portion 152 (the same applies to (a) of FIG. 22 to be described later).

The insulating jacket 157 employs a film member FM having at least a length of a range of the intermediate conductor portion 152 to be covered with and insulated in the axial direction as a dimension in the axial direction. The insulating jacket 157 is provided by winding the film member FM around the intermediate conductor portion 152. The film member FM is made of, for example, a polyethylene naphthalate (PEN) film. More specifically, the film member FM includes a film base material and an adhesion layer provided on one of both surfaces of the film base material and having foamability. The film member FM is wound around the intermediate conductor portion 152 while being adhered by an adhesion layer. A non-foamable adhesive can also be used as the adhesion layer.

As illustrated in FIG. 20, the conductive wire member CR is arranged in the circumferential direction and the radial direction, whereby the intermediate conductor portion 152 has a substantially rectangular transverse section. The film member FM covers around the intermediate conductor portion 152 with the ends of the film member FM in the circumferential direction overlapping each other, whereby the insulating jacket 157 is provided. The film member FM is a rectangular sheet whose longitudinal dimension is greater than the length of the intermediate conductor portion 152 in the axial direction and whose lateral dimension is greater than a single wrap-around length of the intermediate conductor portion 152. The film member FM is wound around the intermediate conductor portion 152 while being creased to fit to a sectional shape of the intermediate conductor portion 152. When the film member FM is wound around the intermediate conductor portion 152, a gap between the conductive wire member CR of the intermediate conductor portion 152 and the film base material can be filled with foam generated from the adhesion layer. In an overlapping portion OL of the film member FM, the ends of the film member FM in the circumferential direction are joined to each other by an adhesion layer.

In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the first winding segment 151A, the insulating jacket 157 is provided in a range from the intermediate conductor portion 152 to a portion covered with the insulating covers 161 and 162 in the first link portion 153A on both sides in the axial direction (i.e., a portion on the inner side of the insulating covers 161 and 162). With reference to FIG. 17, a range of AX1 in the first coil module 150A is a portion not covered with the insulating covers 161 or 162, and the insulating jacket 157 is provided in a range vertically expanded from the range AX1.

Next, a configuration of the insulating covers 161 and 162 will be described.

The insulating cover 161 is mounted to the first link portion 153A on one side of the first winding segment 151A in the axial direction. The insulating cover 162 is mounted to the first link portion 153A on the other side of the first winding segment 151A in the axial direction. Among them, the configuration of the insulating cover 161 is illustrated in (a) and (b) of FIG. 21. (a) and (b) of FIG. 21 are perspective views of the insulating cover 161 as viewed from two different directions.

Figure 21:
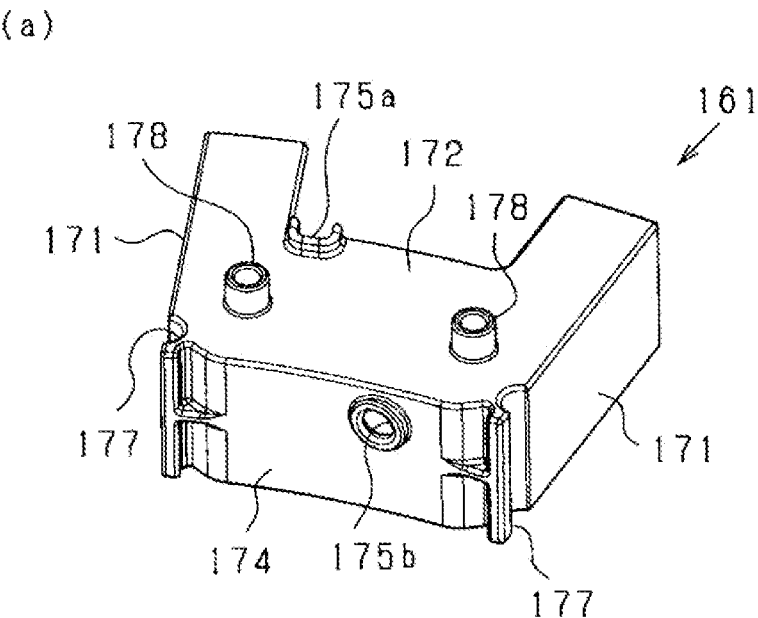
FIG. 21 is a perspective view illustrating a configuration of an insulating cover.
Figure 21:
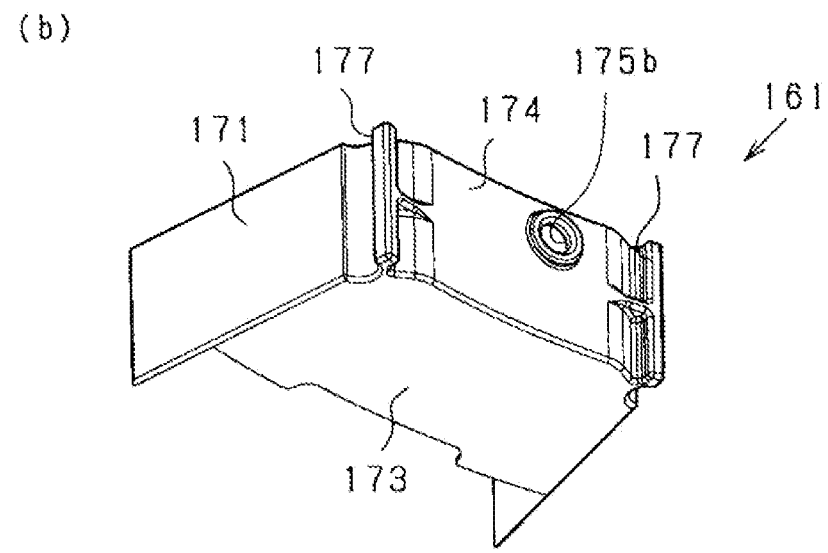

As illustrated in (a) and (b) of FIG. 21, the insulating cover 161 includes a pair of side surface portions 171 serving as side surfaces in the circumferential direction, the outer surface portion 172 on the outer side in the axial direction, an inner surface portion 173 on the inner side in the axial direction, and a front surface portion 174 on the inner side in the radial direction. Each of these portions 171 to 174 is formed in a plate shape, and is three-dimensionally joined to each other such that only the outer side in the radial direction is open. Each of the pair of side surface portions 171 is provided in a direction extending toward the axial center of the core assembly CA with the core assembly CA being assembled. Therefore, in a state where the plurality of first coil modules 150A are disposed side by side in the circumferential direction, the side surface portions 171 of the insulating cover 161 face each other while being in contact with or close to each other in the adjacent first coil modules 150A. As a result, the first coil modules 150A adjacent to each other in the circumferential direction can be disposed in a suitable annular shape while being insulated from each other.

In the insulating cover 161, the outer surface portion 172 includes an opening 175a for drawing out the winding end 154 of the first winding segment 151A, and the front surface portion 174 includes an opening 175b for drawing out the winding end 155 of the first winding segment 151A. In this case, one winding end 154 is drawn out in the axial direction from the outer surface portion 172, whereas the other winding end 155 is drawn out in the radial direction from the front surface portion 174.

In the insulating cover 161, the pair of side surface portions 171 each include semicircular recesses 177 extending in the axial direction at both ends of the front surface portion 174 in the circumferential direction, that is, positions where the side surface portions 171 and the front surface portion 174 intersect. The outer surface portion 172 includes a pair of protrusions 178 extending in the axial direction at positions symmetrical on both sides in the circumferential direction with the center line of the insulating cover 161 in the circumferential direction as a reference.

The supplementary description of the recess 177 of the insulating cover 161 will be provided. As illustrated in FIG. 20, the first link portion 153A of the first winding segment 151A has a curved shape that protrudes inward in the radial direction, that is, toward the core assembly CA, among inward and outward in the radial direction. In such a configuration, a gap that becomes wider toward the extending end side of the first link portion 153A is formed between the first link portions 153A adjacent to each other in the circumferential direction. In the present embodiment, by utilizing the gap between the first link portions 153A arranged in the circumferential direction, the recess 177 is provided at a position on the outer side of the curved portion of the first link portion 153A at the side surface portion 171 of the insulating cover 161.

A temperature detector (thermistor) may be provided in the first winding segment 151A. In such a configuration, an opening for drawing out a signal line extending from the temperature detector is preferably provided in the insulating cover 161. In this case, the temperature detector can be suitably accommodated in the insulating cover 161.

Although not described in detail with reference to the drawings, the insulating cover 162 on the other side in the axial direction has a configuration substantially the same as or similar to the insulating cover 161. Similarly to the insulating cover 161, the insulating cover 162 includes the pair of side surface portions 171, the outer surface portion 172 on the outer side in the axial direction, the inner surface portion 173 on the inner side in the axial direction, and the front surface portion 174 on the inner side in the radial direction. In the insulating cover 162, the pair of side surface portions 171 each include the semicircular recesses 177 at both ends of the front surface portion 174 in the circumferential direction, and the outer surface portion 172 includes the pair of protrusions 178. A difference from the insulating cover 161 is that the insulating cover 162 does not include an opening for drawing out the winding ends 154 and 155 of the first winding segment 151A.

In the insulating covers 161 and 162, the height dimensions thereof in the axial direction (i.e., the width dimension in the axial direction of the pair of side surface portions 171 and the front surface portion 174) differ from each other. Specifically, as illustrated in FIG. 17, W11>W12 is satisfied, where W11 represents a height dimension of the insulating cover 161 in the axial direction, and W12 represents a height dimension of the insulating cover 162 in the axial direction. The reasons for the above are as follows. The multiply wound conductive wire member CR requires the winding stage of the conductive wire member CR to be shifted to the subsequent stage (lane-changed) in a direction orthogonal to the winding direction (turning direction). Accordingly, the winding width is considered to be increased due to the shift thereof. To supplement, the insulating cover 161 among the insulating cover 161 and 162 is a portion covering the first link portion 153A on the side including the winding start and the winding end of the conductive wire member CR. Since the first link portion 153A includes the winding start and the winding end of the conductive wire member CR, the winding margin (overlapping margin) of the conductive wire member CR at the first link portion 153A becomes larger than that at the other portions, resulting in the potentially large winding width. Taking these factors into consideration, the height dimension W11 of the insulating cover 161 in the axial direction is greater than the height dimension W12 of the insulating cover 162 in the axial direction. The above configuration can eliminate the inconvenience that the number of turns of the conductive wire member CR is limited by the insulating covers 161 and 162, unlike the case where the respective height dimensions W11 and W12 of the insulating covers 161 and 162 have the dimension identical to each other.

Next, the second coil module 1508 will be described.

Figure 22:
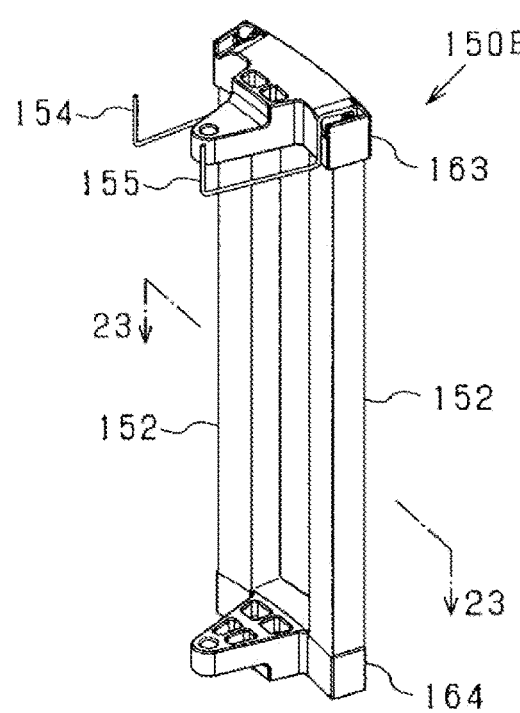
FIG. 22 is a view illustrating a configuration of the second coil module.
Figure 22:
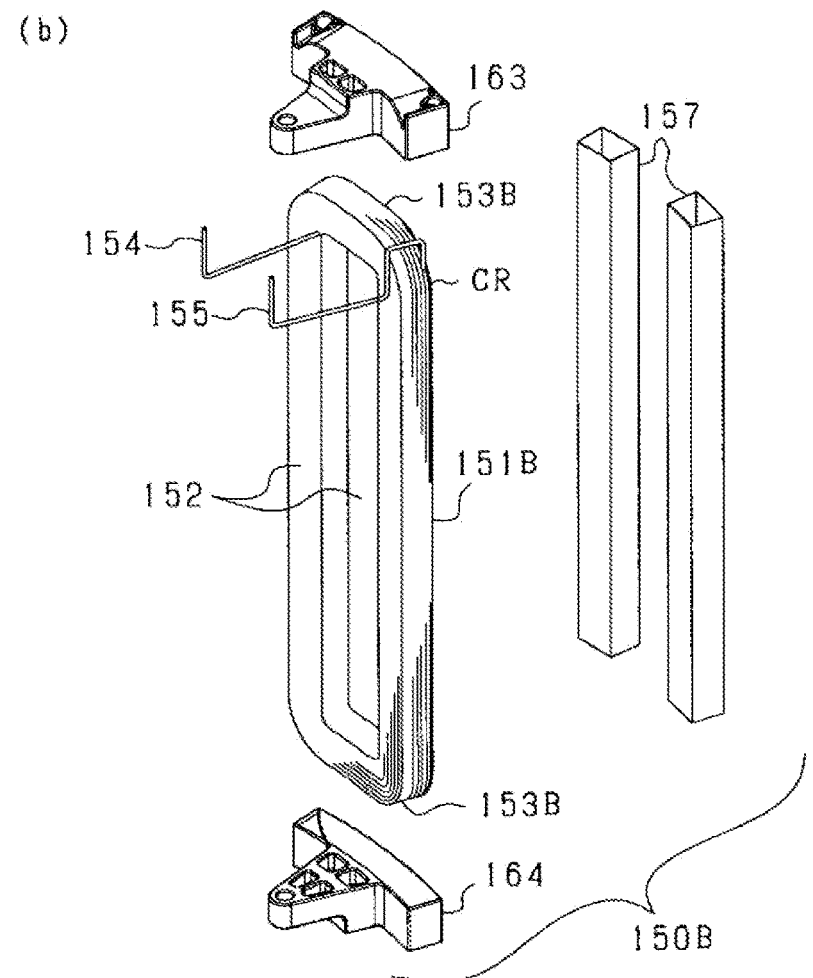
Figure 23:
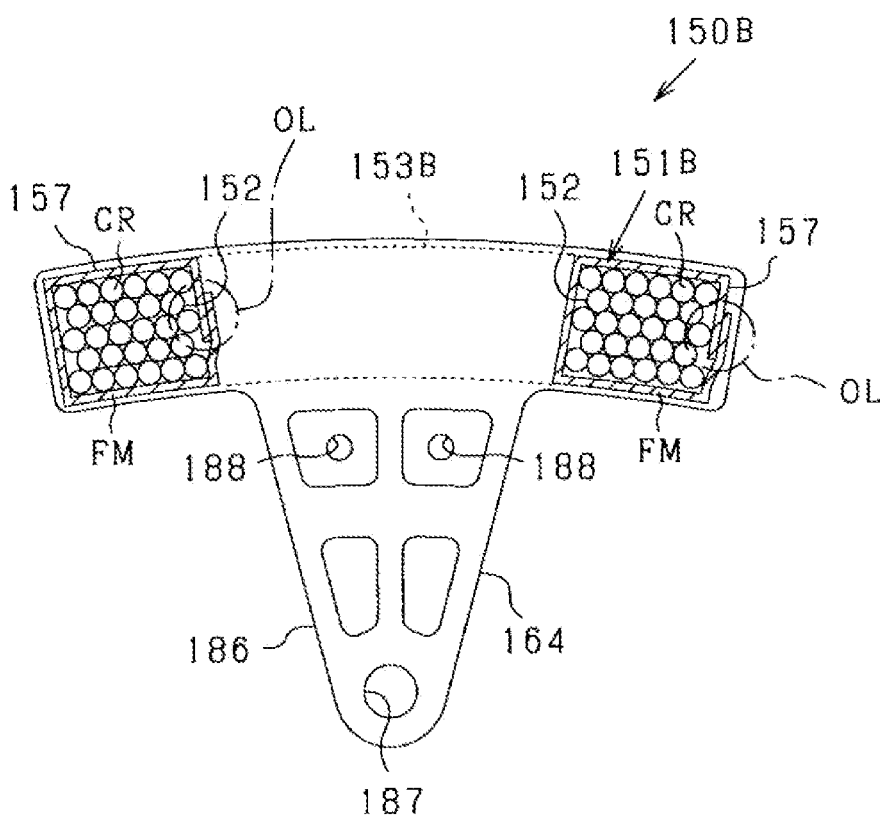
FIG. 23 is a sectional view taken along line 23-23 in (a) of FIG. 22.

(a) of FIG. 22 is a perspective view illustrating a configuration of the second coil module 150B, and (b) of FIG. 22 is an exploded perspective view illustrating components of the second coil module 150B. FIG. 23 is a sectional view taken along line 23-23 in (a) of FIG. 22.

As illustrated in (a) and (b) of FIG. 22, the second coil module 150B includes the second winding segment 151B and the insulating covers 163 and 164. Similarly to the first winding segment 151A, the second winding segment 151B is formed by multiply winding the conductive wire member CR. The insulating covers 163 and 164 are respectively attached to one end side and the other end side of the second winding segment 151B in the axial direction. The insulating covers 163 and 164 are each formed of an insulating material such as synthetic resin.

The second winding segment 151B includes a pair of intermediate conductor portions 152 and a pair of second link portions 153B. The pair of intermediate conductor portions 152 are provided to be in parallel to each other and have a linear shape. The pair of second link portions 153B connect the pair of intermediate conductor portions 152 at both ends in the axial direction. The second winding segment 151B is formed to have an annular shape by the pair of intermediate conductor portions 152 and the pair of second link portions 153B. In the second winding segment 151B, the pair of intermediate conductor portions 152 have the same configuration as the intermediate conductor portions 152 of the first winding segment 151A. On the other hand, the pair of second link portions 153B is different in configuration from the first link portions 153A of the first winding segment 151A. The second link portions 153B of the second winding segment 151B are provided so as to linearly extend in the axial direction from the intermediate conductor portion 152 without being bent in the radial direction. FIG. 18 clearly illustrates the difference between the winding segments 151A and 151B in comparison.

In the second winding segment 151B, an end of the conductive wire member CR is drawn out from one second link portion 153B (the second link portion 153B on the upper side of FIG. 22(*b*)) among the second link portions 153B on both sides in the axial direction. These ends serve as the winding ends 154 and 155. Also in the second winding segment 151B, similarly to the first winding segment 151A, one of the winding ends 154 and 155 is connected to the current I/O terminal, and the other is connected to a neutral point.

In the second winding segment 151B, similarly to the first winding segment 151A, each intermediate conductor portion 152 is covered with a sheet-like insulating jacket 157. The insulating jacket 157 employs the film member FM having at least a length of a range of the intermediate conductor portion 152 to be covered with and insulated in the axial direction as a dimension in the axial direction. The insulating jacket 157 is provided by winding the film member FM around the intermediate conductor portion 152.

The configuration related to the insulating jacket 157 is substantially the same or similar to each other in the winding segments 151A and 151B. That is, as illustrated in FIG. 23, the film member FM covers around the intermediate conductor portion 152 with the ends of the film member FM in the circumferential direction overlapping each other. In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the second winding segment 151B, the insulating jacket 157 is provided in a range from the intermediate conductor portion 152 to a portion covered with the insulating covers 163 and 164 in the second link portion 153B on both sides in the axial direction (i.e., a portion on the inner side of the insulating covers 163 and 164). With reference to FIG. 17, a range of AX2 in the second coil module 150B is a portion not covered with the insulating covers 163 and 164, and the insulating jacket 157 is provided in a range vertically expanded from the range AX2.

In each of the winding segments 151A and 151B, the insulating jacket 157 is provided in a range including part of the link portions 153A and 153B. In other words, in each of the winding segments 151A and 151B, the insulating jacket 157 is provided in the intermediate conductor portion 152 and a portion of the link portions 153A and 153B continuously extending linearly from the intermediate conductor portion 152. However, since the lengths of the winding segments 151A and 151B in the axial direction differ from each other, the ranges of the insulating jacket 157 in the axial direction also differ from each other.

Next, a configuration of the insulating covers 163 and 164 will be described.

The insulating cover 163 is mounted to the second link portion 153B on one side of the second winding segment 151B in the axial direction. The insulating cover 164 is mounted to the second link portion 153B on the other side of the second winding segment 151B in the axial direction. Among them, the configuration of the insulating cover 163 is illustrated in (a) and (b) of FIG. 24. (a) and (b) of FIG. 24 are perspective views of the insulating cover 163 as viewed from two different directions.

Figure 24:
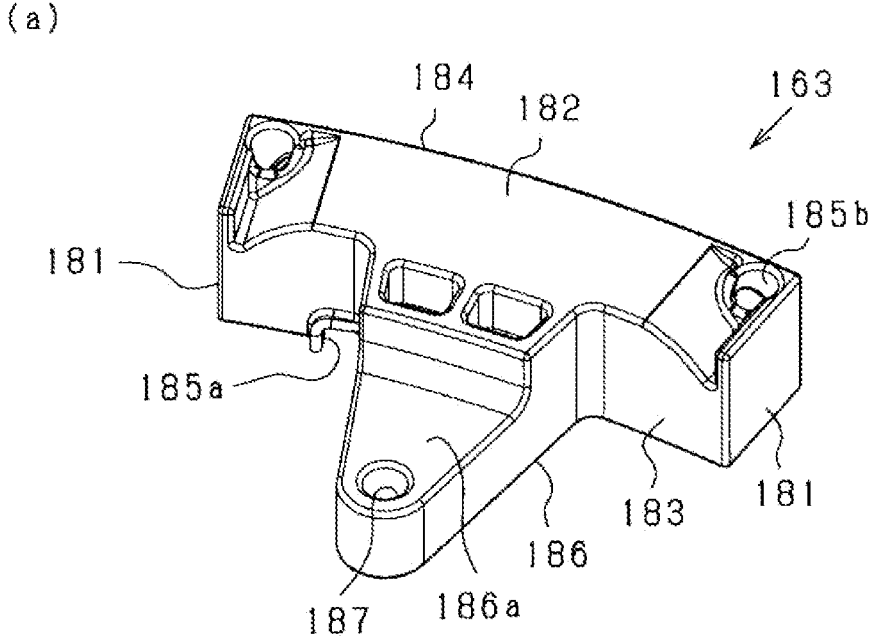
FIG. 24 is a perspective view illustrating a configuration of the insulating cover.
Figure 24:
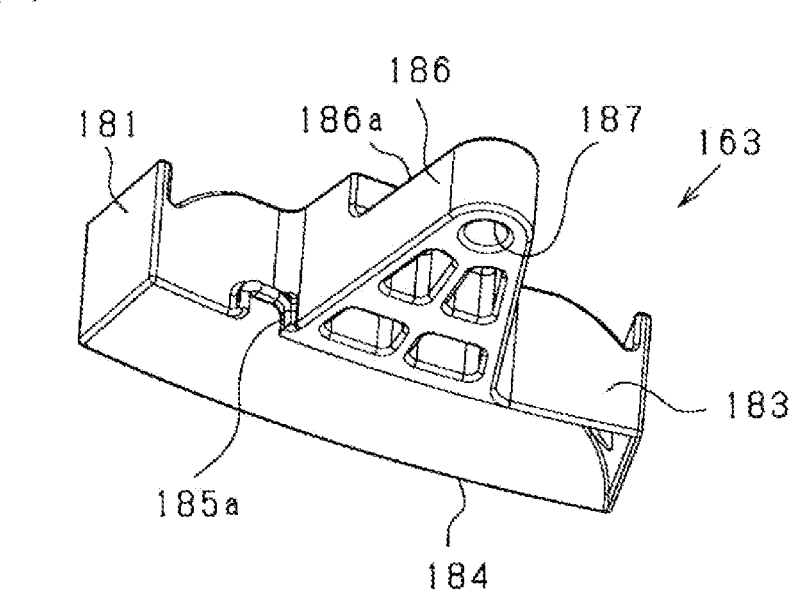

As illustrated in (a) and (b) of FIG. 24, the insulating cover 163 includes a pair of side surface portions 181 serving as side surfaces in the circumferential direction, an outer surface portion 182 on the outer side in the axial direction, a front surface portion 183 on the inner side in the radial direction, and a rear surface portion 184 on the outer side in the radial direction. Each of these portions 181 to 184 is formed in a plate shape, and is three-dimensionally joined to each other such that only the inner side in the axial direction is open. Each of the pair of side surface portions 181 is provided in a direction extending toward the axial center of the core assembly CA with the core assembly CA being assembled. Therefore, in a state where the plurality of second coil modules 150B are disposed side by side in the circumferential direction, the side surface portions 181 of the insulating cover 163 face each other while being in contact with or close to each other in the adjacent second coil modules 150B. As a result, the second coil modules 150B adjacent to each other in the circumferential direction can be disposed in a suitable annular shape while being insulated from each other.

In the insulating cover 163, the front surface portion 183 includes an opening 185*a* for drawing out the winding end 154 of the second winding segment 151B, and the outer surface portion 182 includes an opening 185*b* for drawing out the winding end 155 of the second winding segment 151B.

The front surface portion 183 of the insulating cover 163 includes a protrusion 186 protruding inward in the radial direction. The protrusion 186 is provided at a central position between one end and the other end in the circumferential direction of the insulating cover 163 so as to protrude inward in the radial direction from the second link portion 153B. The protrusion 186 has a tapered shape that tapers toward the inner side in the radial direction in plan view. A through-hole 187 extending in the axial direction is provided at an extending end thereof. The protrusion 186 can employ any configurations as long as the protrusion 186 protrudes inward in the radial direction from the second link portion 153B and has the through-hole 187 at the central position between one end and the other end of the insulating cover 163 in the circumferential direction. However, assuming a state of overlapping with the insulating cover 161 on the inner side in the axial direction, the protrusion 186 is desirably formed to have a small width in the circumferential direction so as to avoid interference with the winding ends 154 and 155.

The protrusion 186 is thinned in the axial direction in a stepwise manner at the extending end on the inner side in the radial direction. The through-hole 187 is provided at a low step portion 186*a* thus thinned. The low step portion 186*a* corresponds to a portion where the height from the end surface of the inner cylinder member 81 in the axial direction is smaller than the height of the second link portion 153B in a state where the second coil module 150B is assembled to the core assembly CA.

As illustrated in FIG. 23, the protrusion 186 includes a through-hole 188 passing therethrough in the axial direction. Accordingly, in a state where the insulating covers 161 and 163 overlap each other in the axial direction, a space between the insulating covers 161 and 163 can be filled with the adhesive through the through-hole 188.

Although not described in detail with reference to the drawings, the insulating cover 164 on the other side in the axial direction has a configuration substantially the same as or similar to the insulating cover 163. Similarly to the insulating cover 163, the insulating cover 164 includes the pair of side surface portions 181, the outer surface portion 182 on the outer side in the axial direction, the front surface portion 183 on the inner side in the radial direction, and the rear surface portion 184 on the outer side in the radial direction. The insulating cover 164 further includes the through-hole 187 provided at the extending end of the protrusion 186. A difference from the insulating cover 163 is that the insulating cover 164 does not include an opening for drawing out the winding ends 154 and 155 of the second winding segment 151B.

In the insulating covers 163 and 164, the width dimensions of the pair of side surface portions 181 in the radial direction differ from each other. Specifically, as illustrated in FIG. 17, W21>W22 is satisfied, where W21 represents a width dimension of the side surface portion 181 in the insulating cover 163 in the radial direction, and W22 represents a width dimension of the side surface portion 181 in the insulating cover 164 in the radial direction. In other words, the insulating cover 163 among the insulating cover 163 and 164 is a portion covering the second link portion 153B on the side including the winding start and the winding end of the conductive wire member CR. Since the second link portion 153B includes the winding start and the winding end of the conductive wire member CR, the winding margin (overlapping margin) of the conductive wire member CR at the second link portion 153B becomes larger than that at the other portions, resulting in the potentially large winding width. Taking this factor into consideration, the width dimension W21 of the insulating cover 163 in the radial direction is greater than the width dimension W22 of the insulating cover 164 in the radial direction. The above configuration can eliminate the inconvenience that the number of turns of the conductive wire member CR is limited by the insulating covers 163 and 164, unlike the case where the respective width dimensions W21 and W22 of the insulating covers 163 and 164 have the dimension identical to each other.

Figure 25:
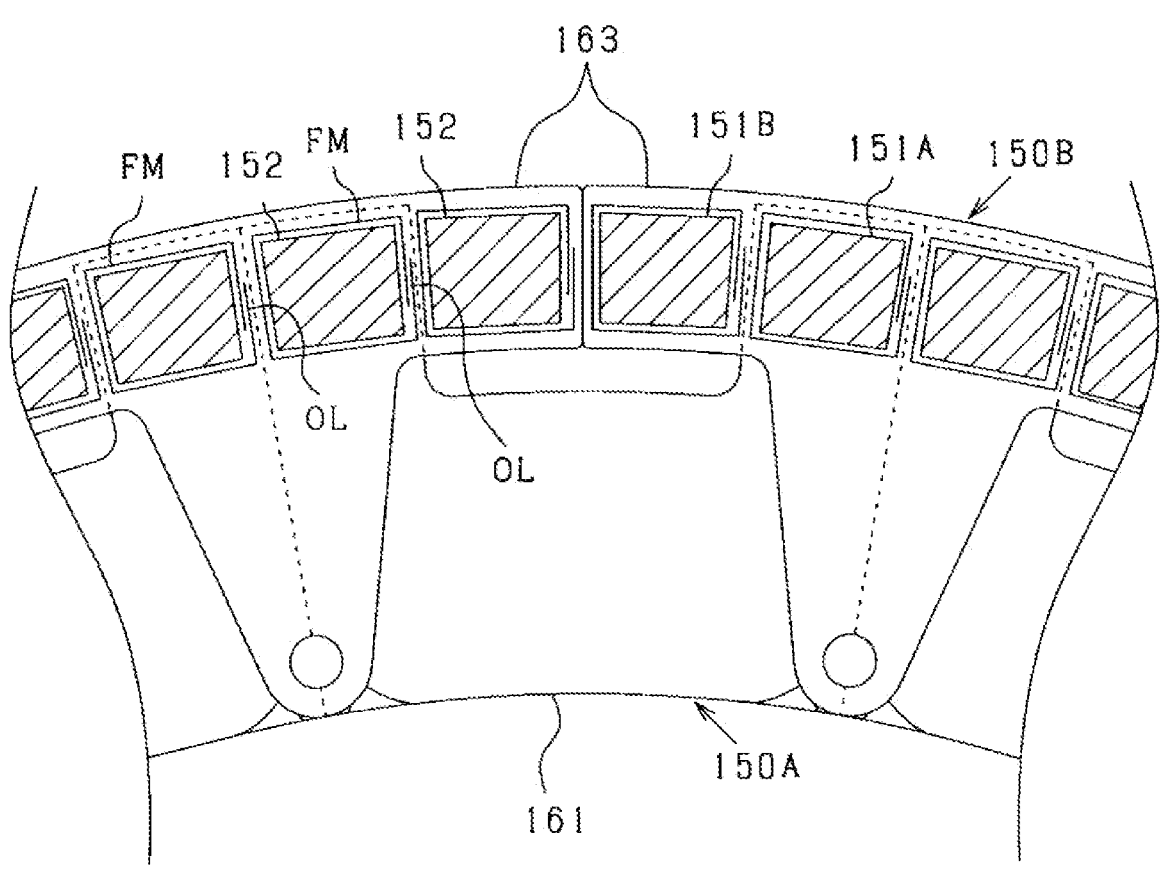
FIG. 25 is a view illustrating an overlapping position of the film member in a state where the coil modules are arranged in a circumferential direction.

FIG. 25 is a view illustrating an overlapping position of the film member FM in a state where the coil modules 150A and 150B are arranged in the circumferential direction. As described above, in each of the coil modules 150A and 150B, the periphery of the intermediate conductor portion 152 is covered with the film member FM so as to overlap with each other at the portion of the winding segment 151 of the other phase facing the intermediate conductor portion 152, that is, at the side surface of the intermediate conductor portion 152 in the circumferential direction (see FIGS. 20 and 23). In a state where the coil modules 150A and 150B are disposed in the circumferential direction, the overlapping portions OL of the film members FM are disposed on the same side among both sides in the circumferential direction (the right side in the circumferential direction in the drawing). With this arrangement, in the intermediate conductor portions 152 of the winding segments 151A and 151B of different phases adjacent to each other in the circumferential direction, the overlapping portions OL of the film members FM do not overlap with each other in the circumferential direction. In this case, a maximum of three film members FM overlap with each other between the intermediate conductor portions 152 arranged in the circumferential direction.

Next, a configuration related to assembly of the coil modules 150A and 150B to the core assembly CA will be described.

The coil modules 150A and 150B have different lengths in axial direction and different shapes of the link portions 153A and 153B of the winding segments 151A and 151B. The coil modules 150A and 150B are attached to the core assembly CA while the first link portion 153A of the first coil module 150A is disposed on the inner side in the axial direction and the second link portion 153B of the second coil module 150B is disposed on the outer side in the axial direction. As for the insulating covers 161 to 164, each of the insulating covers 161 to 164 is fixed to the core assembly CA while the insulating covers 161 and 163 are overlapped in the axial direction on one end side of the respective coil modules 150A and 150B in the axial direction and the insulating covers 162 and 164 are overlapped in the axial direction on the other end side of the respective coil modules 150A and 150B in the axial direction.

Figure 26:
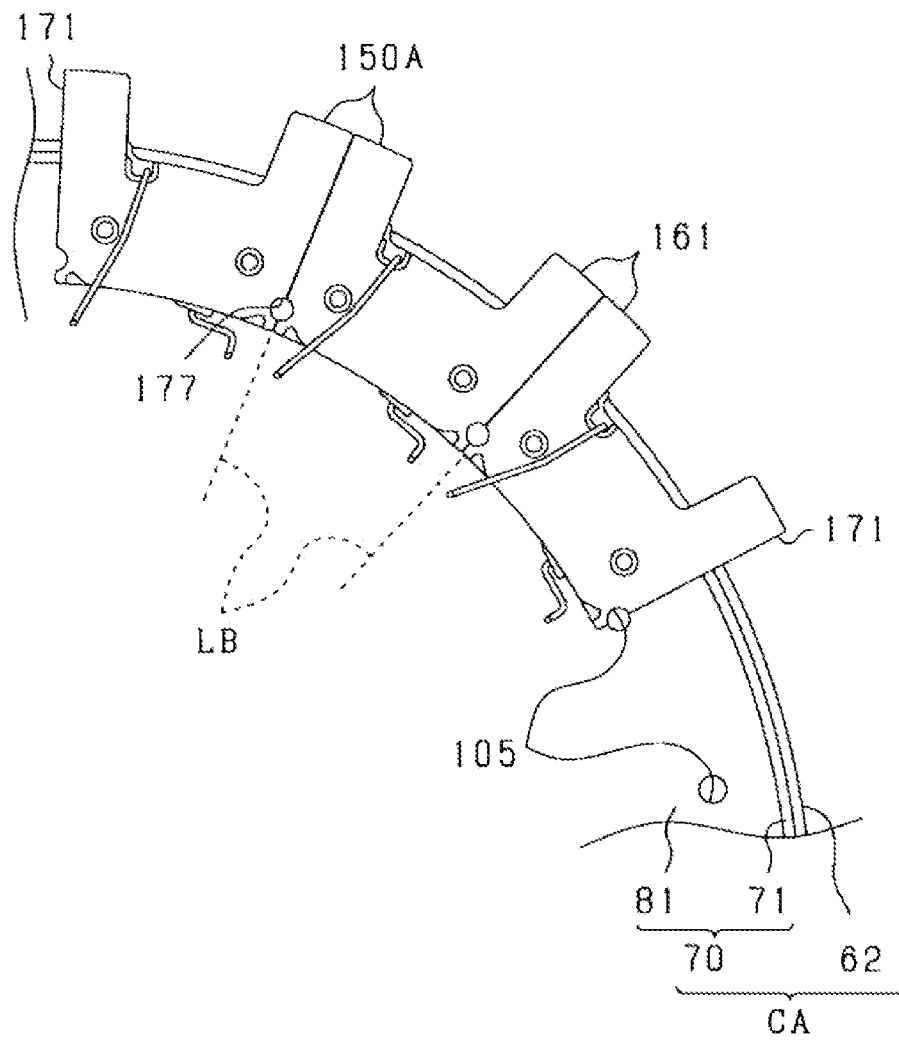
FIG. 26 is a plan view illustrating a state where the first coil module is assembled to the core assembly.
Figure 27:
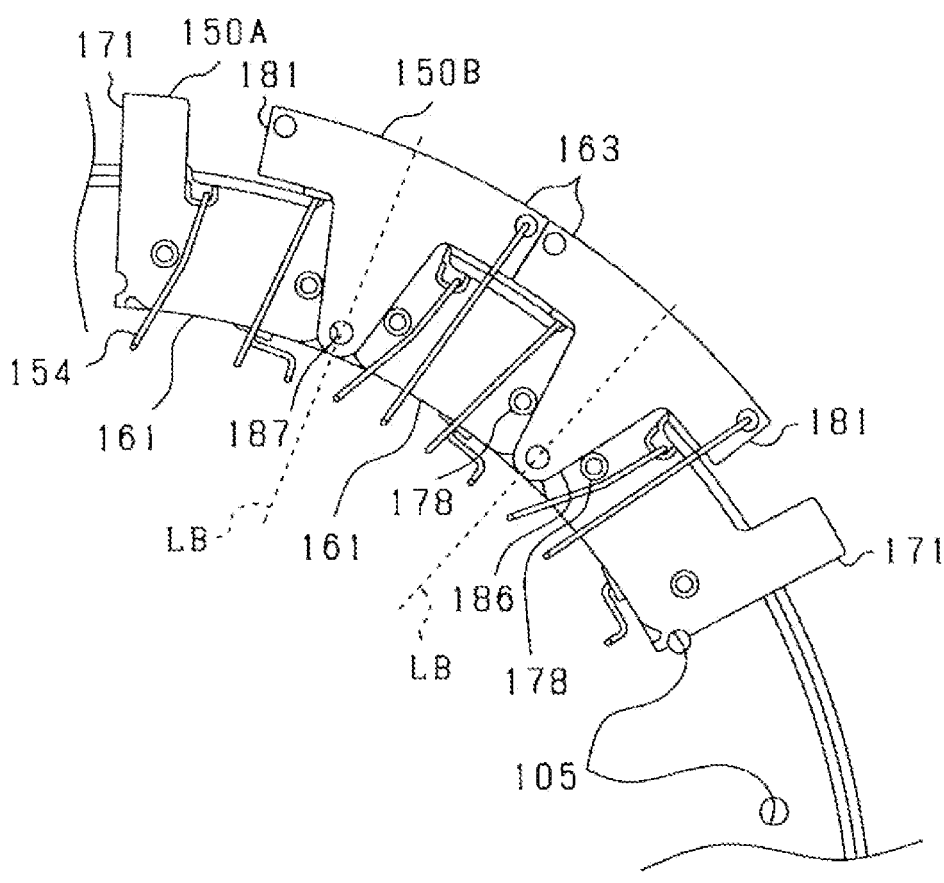
FIG. 27 is a plan view illustrating a state where the first coil module and the second coil module are assembled to the core assembly.
Figure 28:
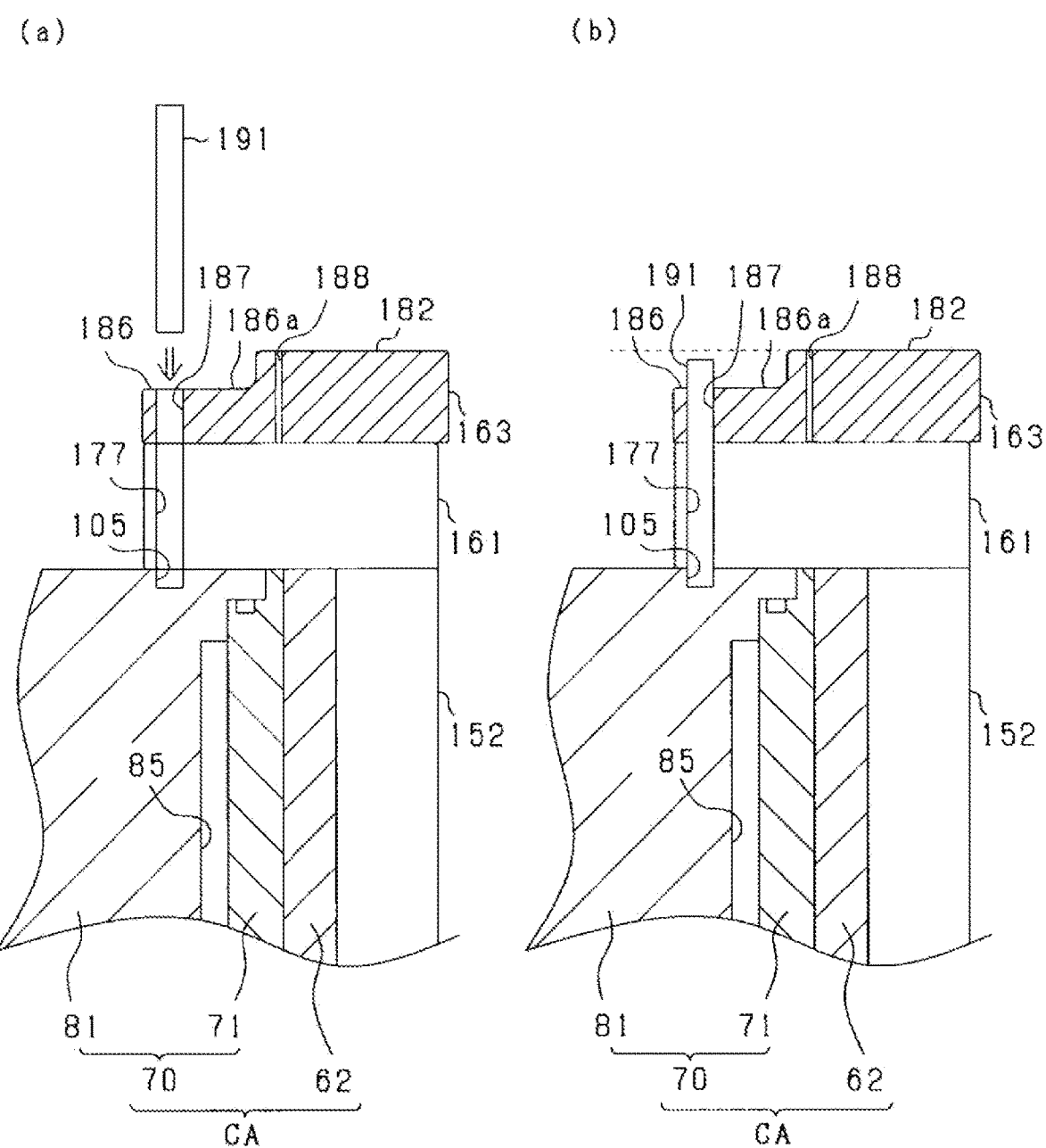
FIG. 28 is a longitudinal sectional view illustrating a fixed state by using a fastening pin.

FIG. 26 is a plan view illustrating a state where the plurality of insulating covers 161 are arranged in the circumferential direction while the first coil module 150A is assembled to the core assembly CA. FIG. 27 is a plan view illustrating a state where the plurality of insulating covers 161 and 163 are arranged in the circumferential direction while the first coil module 150A and the second coil module 150B are assemble to the core assembly CA. (a) of FIG. 28 is a longitudinal sectional view illustrating a state before fixation with a fastening pin 191 while the coil modules 150A and 150B are assemble to the core assembly CA. (b) of FIG. 28 is a longitudinal sectional view illustrating a state after fixation with the fastening pin 191 while the coil modules 150A and 150B are assemble to the core assembly CA.

As illustrated in FIG. 26, in a state where the plurality of first coil modules 150A are assembled to the core assembly CA, the plurality of insulating covers 161 are disposed with the side surface portions 171 being in contact with or close to each other. Each of the insulating covers 161 is disposed such that a boundary line LB at which the side surface portions 171 face each other lays over the recess 105 on the end surface of the inner cylinder member 81 in the axial direction. In this case, when the side surface portions 171 of the insulating covers 161 adjacent to each other in the circumferential direction are brought into contact with or close to each other, a through-hole portion extending in the axial direction is formed by each of the recesses 177 of the insulating covers 161. The positions of the through-hole portion and the recess 105 then match each other.

As illustrated in FIG. 27, the second coil module 150B is further assembled to the integrated object of the core assembly CA and the first coil module 150A. This assembly involves disposing the plurality of insulating covers 163 with the side surface portions 181 being in contact with or close to each other. In this state, the link portions 153A and 153B are disposed so as to cross each other on a circle in which the intermediate conductor portions 152 are arranged in the circumferential direction. Each insulating cover 163 is disposed such that the protrusion 186 overlaps the insulating cover 161 in the axial direction and the through-hole 187 of the protrusion 186 is connected in the axial direction to the through-hole portion formed by each recess 177 of the insulating cover 161.

At this time, the protrusion 186 of the insulating cover 163 is guided to a predetermined position by the pair of protrusions 178 provided on the insulating cover 161. In this way, the position of the through-hole 187 on the insulating cover 163 side matches the position of the through-hole portion and the recess 105 of the inner cylinder member 81 on the insulating cover 161 side. More specifically, in a state where the coil modules 150A and 150B are assembled to the core assembly CA, the recess 177 of the insulating cover 161 is positioned on the back side of the insulating cover 163. Thus, the through-hole 187 of the protrusion 186 may be difficult to be aligned with the recess 177 of the insulating cover 161. In this respect, the protrusion 186 of the insulating cover 163 is guided by the pair of protrusions 178 of the insulating cover 161, so that the alignment of the insulating cover 163 with respect to the insulating cover 161 is facilitated.

As illustrated in (a) and (b) of FIG. 28, fixing with the fastening pin 191 as a fastening member is then performed while the insulating cover 161 and the protrusion 186 of the insulating cover 163 are engaged with the fastening pin 191 at their overlapping portion. More specifically, the fastening pin 191 is inserted into the recesses 105 and 177 and the through-hole 187 while the recess 105 of the inner cylinder member 81, the recess 177 of the insulating cover 161, and the through-hole 187 of the insulating cover 163 are aligned. Accordingly, the insulating covers 161 and 163 are integrally fixed to the inner cylinder member 81. According to this configuration, the coil modules 150A and 150B adjacent to each other in the circumferential direction are fixed to the core assembly CA by the common fastening pin 191 at the coil end CE. The fastening pin 191 desirably includes a material having good thermal conductivity, and is, for example, a metal pin.

As illustrated in FIG. 28(*b*), the fastening pin 191 is assembled to the low step portion 186*a* of the protrusion 186 of the insulating cover 163. In this state, the upper end of the fastening pin 191 protrudes above the low step portion 186*a*, but does not protrude upward from the upper surface (outer surface portion 182) of the insulating cover 163. In this case, the length of the fastening pin 191 is greater than the height dimension in the axial direction of the overlapping portion between the insulating cover 161 and the protrusion 186 (low step portion 186*a*) of the insulating cover 163 and has a margin protruding upward. Thus, conceivably, when the fastening pin 191 is inserted into the recesses 105 and 177 and the through-hole 187 (that is, when the fastening pin 191 is fixed), such an insertion (fixing) work can be easily performed. In addition, the upper end of the fastening pin 191 does not protrude upward from the upper surface (outer surface portion 182) of the insulating cover 163. This configuration can eliminate an inconvenience that the axial length of the stator 60 becomes large due to the protrusion of the fastening pin 191.

After fixing the insulating covers 161 and 163 by the fastening pin 191, the adhesive is filled through the through-hole 188 provided in the insulating cover 163. In this way, the insulating covers 161 and 163 overlapping in the axial direction are securely joined to each other. In (a) and (b) of FIG. 28, for convenience, the through-hole 188 is illustrated in a range from the upper surface to the lower surface of the insulating cover 163. In practice, however, the through-hole 188 is provided in a thin plate portion formed by lightening or the like.

As illustrated in FIG. 28(*b*), the position of each of the insulating covers 161 and 163 fixed with the fastening pin 191 is the end surface of the stator holder 70 in the axial direction further on the inner side than the stator core 62 in the radial direction (on the left side in the drawing), and the fastening pin 191 is fixed to the stator holder 70. That is, the first link portion 153A is fixed to the end surface of the stator holder 70 in the axial direction. In this case, since the stator holder 70 includes the coolant path 85, the heat generated at the first winding segment 151A is directly transferred from the first link portion 153A to the portion at or near the coolant path 85 of the stator holder 70. The fastening pin 191 is inserted into the recess 105 of the stator holder 70, and heat transfer to the stator holder 70 side is promoted through the fastening pin 191. With this configuration, improvement of cooling performance of the stator winding 61 is achieved.

In the present embodiment, 18 of the insulating covers 161 and 18 of the insulating covers 163 are disposed to overlap each other on the inner side and the outer side in the axial direction at the coil end CE. Recesses 105 are provided at 18 locations that is the same as the number of the insulating covers 161 and the number of the insulating covers 163 on the end surface of the stator holder 70 in the axial direction. The recesses 105 at the 18 locations are fixed with the fastening pins 191.

Although not illustrated, the same applies to the insulating covers 162 and 164 on the opposite side in the axial direction. In other words, first, when the side surface portions 171 of the insulating covers 162 adjacent to each other in the circumferential direction are brought into contact with or close to each other upon assembly of the first coil module 150A, a through-hole portion extending in the axial direction is formed by each of the recesses 177 of the insulating covers 162. The positions of the through-hole portion and the recess 106 at the end surface of the outer cylinder member 71 in the axial direction then match each other. Thereafter, due to the assembly of the second coil module 150B, the position of the through-hole 187 on the insulating cover 164 side matches the positions of the through-hole portion on the insulating cover 163 side and the recess 106 of the outer cylinder member 71. Subsequently, the fastening pin 191 is inserted into the recesses 106 and 177 and the through-hole 187, whereby the insulating covers 162 and 164 is integrally fixed to the outer cylinder member 71.

When the coil modules 150A and 150B are assembled to the core assembly CA, all the first coil modules 150A are assembled first to the outer peripheral side of the core assembly CA, and then all the second coil modules 150B are assembled and fixed with the fastening pins 191. Alternatively, the two first coil modules 150A and the one second coil module 150B may be first fixed to the core assembly CA with one fastening pin 191, and thereafter, the assembly of the first coil module 150A, the assembly of the second coil module 150B, and fixing with the fastening pin 191 may be repeatedly performed in this order.

Next, the bus bar module 200 will be described.

Figure 29:
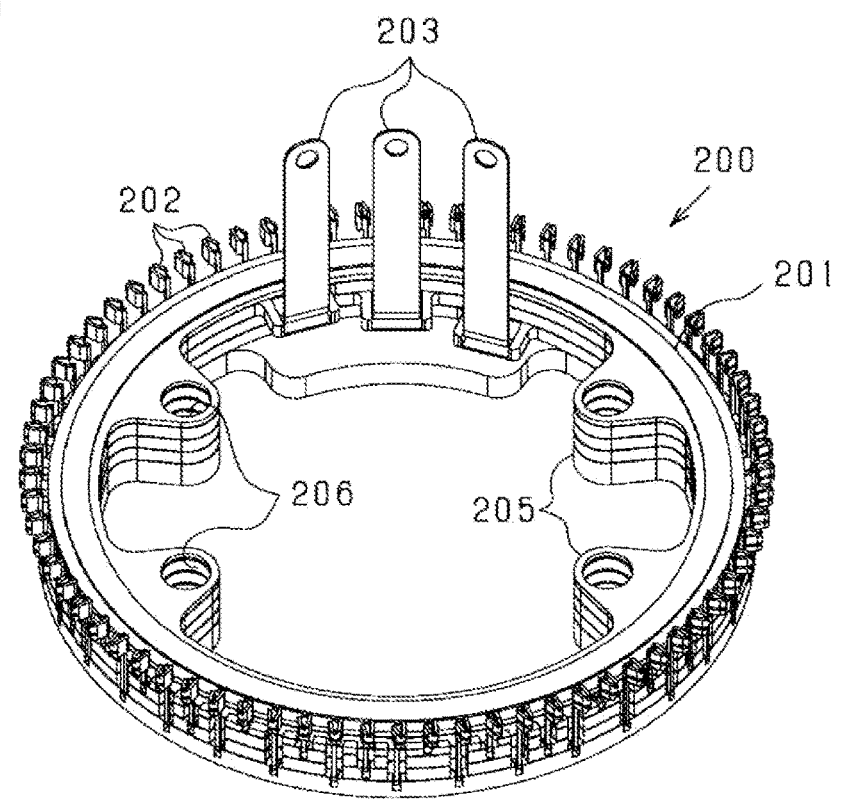
FIG. 29 is a perspective view of a bus bar module.
Figure 30:
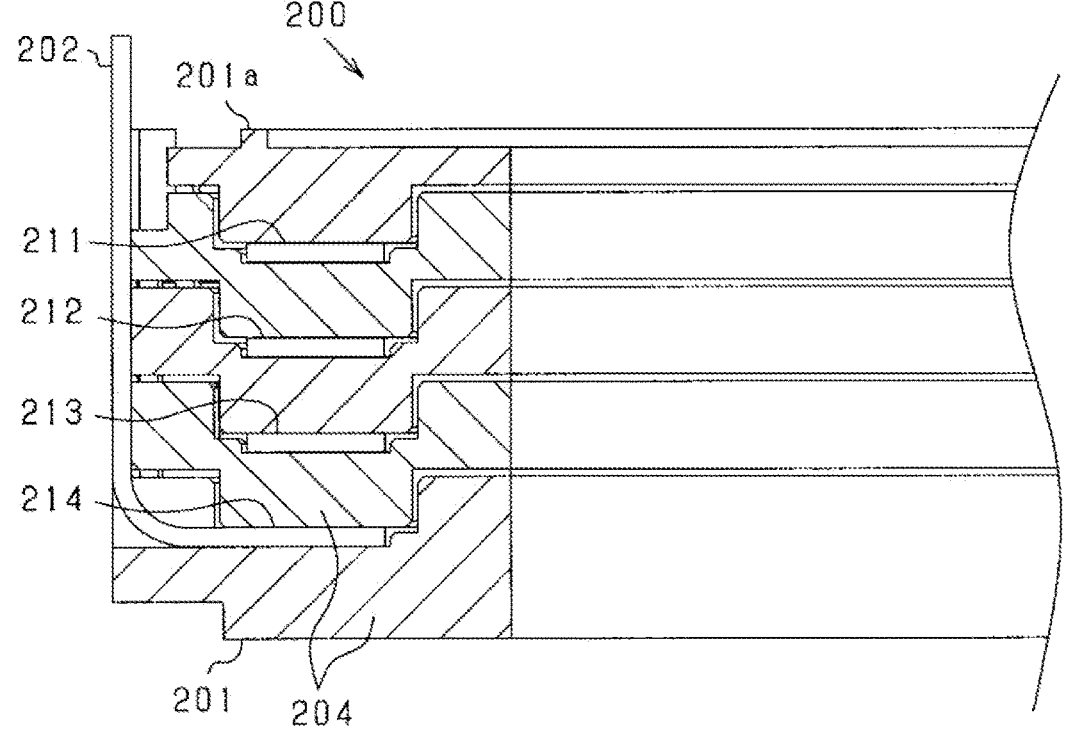
FIG. 30 is a sectional view illustrating part of a longitudinal section of the bus bar module.

The bus bar module 200 is a winding connection member that is electrically connected to the winding segment 151 of each coil module 150 in the stator winding 61, connects one end of the winding segment 151 of each phase in parallel for each phase, and connects the other ends of the winding segments 151 at a neutral point. FIG. 29 is a perspective view of the bus bar module 200. FIG. 30 is a sectional view illustrating part of a longitudinal section of the bus bar module 200.

The bus bar module 200 includes an annular ring 201 having an annular shape, a plurality of connection terminals

202 extending from the annular ring 201, and three I/O terminals 203 provided for each phase winding. The annular ring 201 is formed to have an annular shape by using, for example, an insulating member such as resin.

As illustrated in FIG. 30, the annular ring 201 has a substantially annular plate shape and includes stacked plates 204 stacked in multiple layers (five layers in the present embodiment) in the axial direction. Four bus bars 211 to 214 are provided while being sandwiched between each adjacent two of the stacked plates 204. Each of the bus bars 211 to 214 has an annular shape, and includes a U-phase bus bar 211, a V-phase bus bar 212, a W-phase bus bar 213, and a neutral-point bus bar 214. These bus bars 211 to 214 are disposed side by side in the axial direction with plate surfaces facing each other in the annular ring 201. Each stacked plate 204 and each of the bus bars 211 to 214 are joined to each other by using an adhesive. An adhesive sheet is desirably used as the adhesive. However, a liquid or semi-liquid adhesive may be applied. The connection terminal 202 is connected to each of the bus bars 211 to 214 so as to protrude outward in the radial direction from the annular ring 201.

A protrusion 201*a* annularly extending in an annular shape is provided on the upper surface of the annular ring 201, that is, the upper surface of the stacked plate 204 on the outermost layer side of the stacked plates 204 provided in the form of five layers.

The bus bar module 200 only needs to be provided in a state where the bus bars 211 to 214 are embedded in the annular ring 201. The bus bars 211 to 214 disposed at predetermined intervals may be integrally insert-molded. The arrangement of the bus bars 211 to 214 is not limited to the configuration in which all the bus bars are arranged in the axial direction and all the plate surfaces face the same direction. For example, the bus bars 211 to 214 may be arranged in the radial direction, may be arranged in two rows in the axial direction and in two rows in the radial direction, and may include different extending directions.

In FIG. 29, the connection terminals 202 are arranged in the circumferential direction of the annular ring 201 and extend in the axial direction on the outer side in the radial direction. The connection terminals 202 include a connection terminal connected to the U-phase bus bar 211, a connection terminal connected to the V-phase bus bar 212, a connection terminal connected to the W-phase bus bar 213, and a connection terminal connected to the neutral-point bus bar 214. The connection terminals 202 are provided as many as the winding ends 154 and 155 of the respective winding segments 151 in the coil module 150. One winding end 154 or one winding end 155 of each winding segment 151 is connected to the corresponding connection terminal 202. With this configuration, the bus bar module 200 is connected to each of the U-phase winding segment 151, the V-phase winding segment 151, and the W-phase winding segment 151.

The I/O terminal 203 is made of, for example, a bus bar member, and is provided in a direction extending in the axial direction. The I/O terminal 203 includes a U-phase I/O terminal 203U, a V-phase I/O terminal 203V, and a W-phase I/O terminal 203W. These I/O terminals 203 are connected to the respective bus bars 211 to 213 for each phase in the annular ring 201. Through the I/O terminals 203, power is input from an inverter (not illustrated) and output to the phase winding of each phase of the stator winding 61.

A current sensor that detects the phase current of each phase may be integrally provided in the bus bar module 200. In this case, preferably, a current detection terminal is provided in the bus bar module 200 and a detection result of the current sensor is output to a controller (not illustrated) through the current detection terminal.

The annular ring 201 has a plurality of protrusions 205 protruding toward the inner peripheral side as fixed portions with respect to the stator holder 70. A through-hole 206 extending in the axial direction is formed in the protrusion 205.

Figure 31:
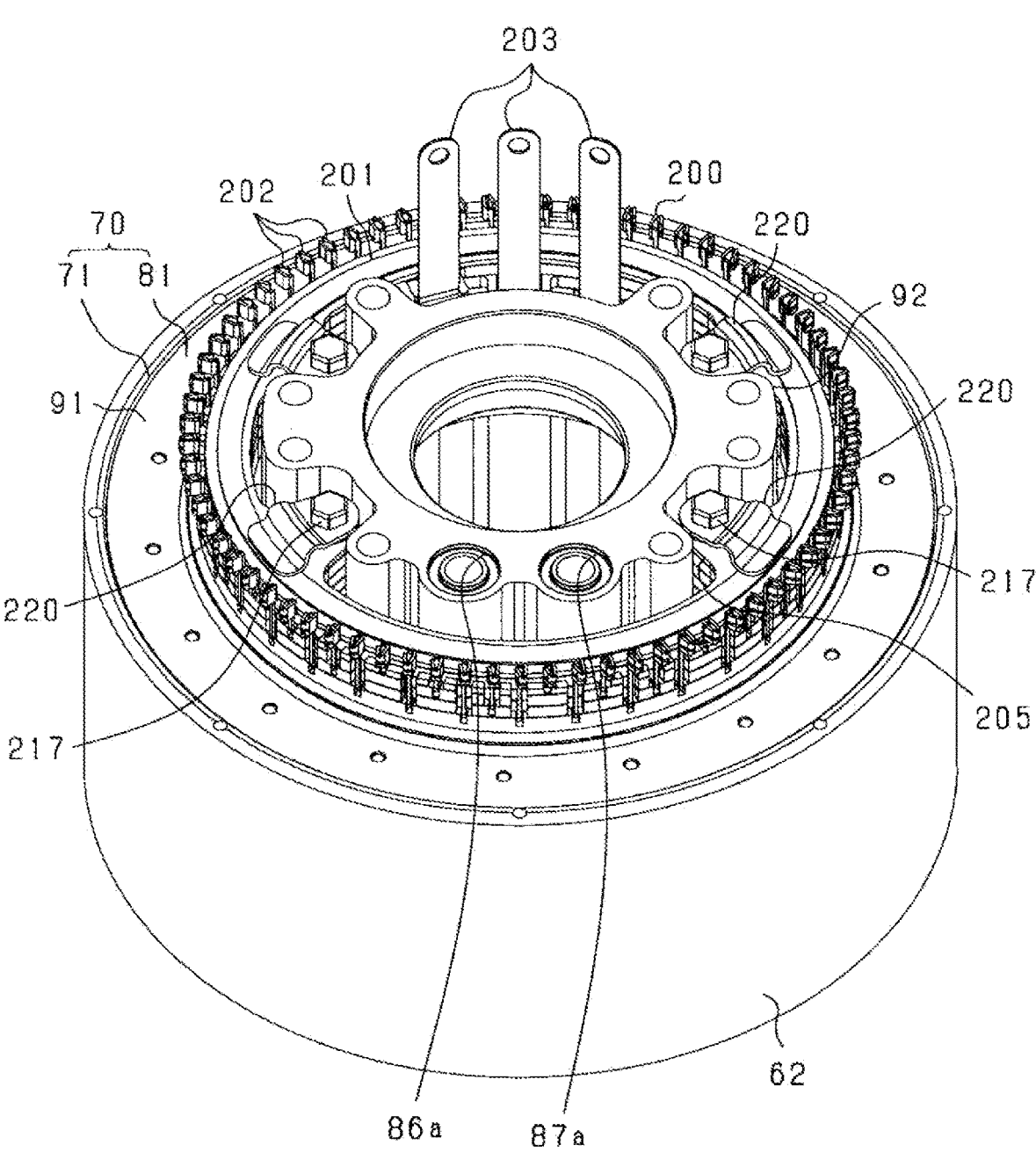
FIG. 31 is a perspective view illustrating a state where the bus bar module is assembled to a stator holder.
Figure 32:
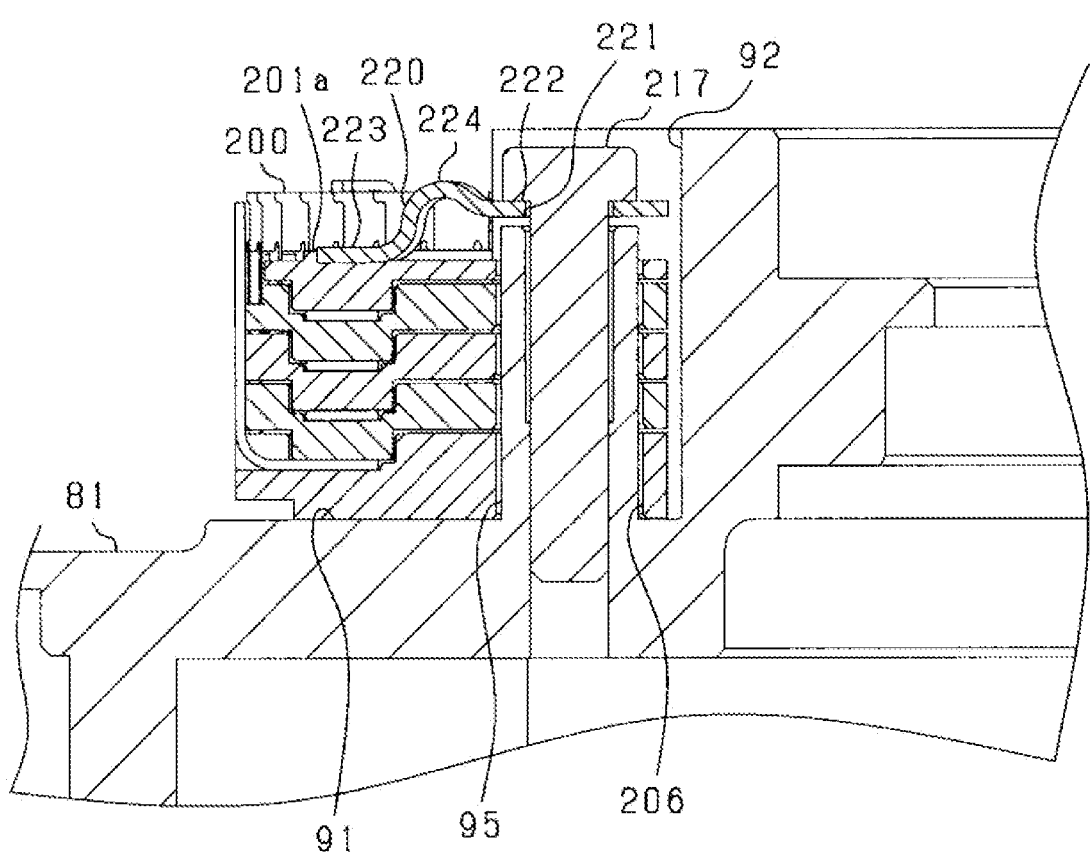
FIG. 32 is a longitudinal sectional view of a stationary portion in which the bus bar module is fixed.

FIG. 31 is a perspective view illustrating a state where the bus bar module 200 is assembled to the stator holder 70, and FIG. 32 is a longitudinal sectional view of the stationary portion in which the bus bar module 200 is fixed. For information about the configuration of the stator holder 70 before the bus bar module 200 is assembled thereto, please refer to FIG. 12.

In FIG. 31, the bus bar module 200 is provided on the end plate portion 91 so as to surround the boss 92 of the inner cylinder member 81. The bus bar module 200 is fixed to the stator holder 70 (inner cylinder member 81) by using a fastener 217 such as a bolt while the bus bar module 200 is positioned through assembling the inner cylinder member 81 to the rod 95 (see FIG. 12).

More specifically, as illustrated in FIG. 32, the end plate portion 91 of the inner cylinder member 81 includes the rod 95 extending in the axial direction. The bus bar module 200 is fixed to the rod 95 by using the fasteners 217 while the rods 95 are inserted through the through-holes 206 respectively provided in the plurality of protrusions 205. In the present embodiment, the bus bar module 200 is fixed using the retainer plate 220 made of a metal material such as iron. The retainer plate 220 includes a mating fastener portion 222, a press portion 223, and a bent portion 224. The mating fastener portion 222 has an insertion hole 221 through which the fastener 217 is inserted. The press portion 223 presses the upper surface of the annular ring 201 of the bus bar module 200. The bent portion 224 is provided between the mating fastener portion 222 and the press portion 223.

When the retainer plate 220 is mounted, the fastener 217 is screwed to the rod 95 of the inner cylinder member 81 while the fastener 217 is inserted through the insertion hole 221 of the retainer plate 220. The press portion 223 of the retainer plate 220 is in contact with the upper surface of the annular ring 201 of the bus bar module 200. In this case, as the fastener 217 is screwed into the rod 95, the retainer plate 220 is pushed downward as viewed in the drawing, and accordingly, the annular ring 201 is pressed downward by the press portion 223. The downward pressure as viewed in the drawing, generated by the screwing of the fastener 217, is transmitted to the press portion 223 through the bent portion 224. Thus, pressing by the press portion 223 is performed while accompanying the elastic pressure at the bent portion 224.

As described above, the annular protrusion 201*a* is provided on the upper surface of the annular ring 201, and the extending end of the retainer plate 220 on the press portion 223 side can be brought into contact with the protrusion 201*a*. This configuration can prevent the downward pressure of the retainer plate 220 as viewed in the drawing from being released outward in the radial direction. That is, the pressure generated by the screwing of the fastener 217 is appropriately transmitted to the press portion 223 side.

As illustrated in FIG. 31, when the bus bar module 200 is assembled with respect to the stator holder 70, the I/O terminal 203 is provided at a position 180° opposite to the inlet opening 86*a* and the outlet opening 87*a* communicating with the coolant path 85 in the circumferential direction. However, the I/O terminal 203 and the openings 86*a* and 87*a* may be collectively provided at the same position (that is, positions close to each other).

Next, a lead member 230 that electrically connects the I/O terminal 203 of the bus bar module 200 to an external device outside the rotary electric machine 10 will be described.

As illustrated in FIG. 1, in the rotary electric machine 10, the I/O terminal 203 of the bus bar module 200 is provided so as to protrude outward from the housing cover 242, and is connected to the lead member 230 on the outer side of the housing cover 242. The lead member 230 relays connection between the I/O terminal 203 for each phase extending from the bus bar module 200 and a power line for each phase extending from an external device such as an inverter.

Figure 33:
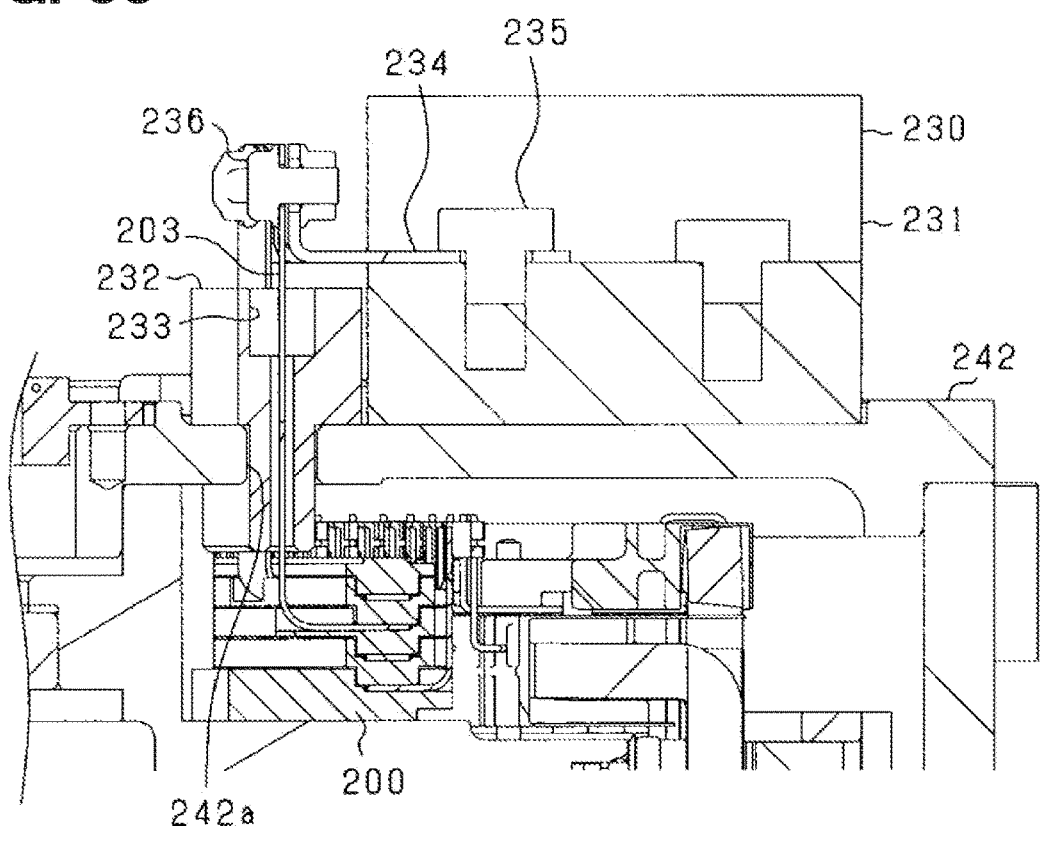
FIG. 33 is a longitudinal sectional view illustrating a state where a lead member is attached to the housing cover.
Figure 34:
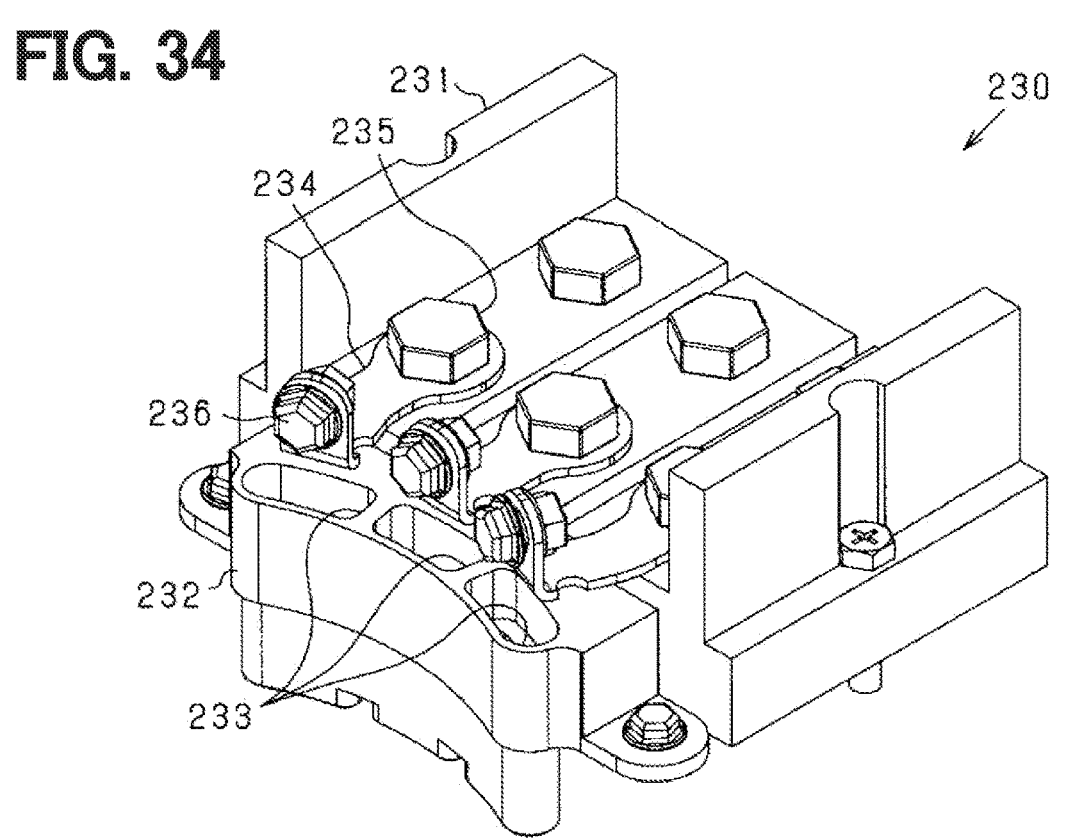
FIG. 34 is a perspective view of the lead member.

FIG. 33 is a longitudinal sectional view illustrating a state where the lead member 230 is attached to the housing cover 242. FIG. 34 is a perspective view of the lead member 230. As illustrated in FIG. 33, a through-hole 242a is formed at the housing cover 242, and the I/O terminal 203 can be drawn out through the through-hole 242a.

The lead member 230 includes a base 231 fixed to the housing cover 242 and a terminal plug 232 inserted into the through-hole 242a of the housing cover 242. The terminal plug 232 has three insertion holes 233. The I/O terminals 203 of the respective phases are inserted through the respective insertion hole 233 on a one-to-one basis. In each of the three insertion holes 233, the section of the opening has an elongated shape. The three insertion holes 233 are formed such that their longitudinal directions are substantially aligned with each other.

The base 231 is attached with three lead bus bars 234 provided for each phase. The lead bus bar 234 is bent and formed in a substantially L shape and is fixed to the base 231 by a fastener 235 such as a bolt. The lead bus bar 234 is further fixed to an extending end of the I/O terminal 203 inserted through the insertion hole 233 of the terminal plug 232 by using a fastener 236 such as a bolt and a nut.

Although not illustrated, a power line for each phase extending from an external device can be connected to the lead member 230. Thus, power can be input to and output from the I/O terminal 203 for each phase.

Figure 35:
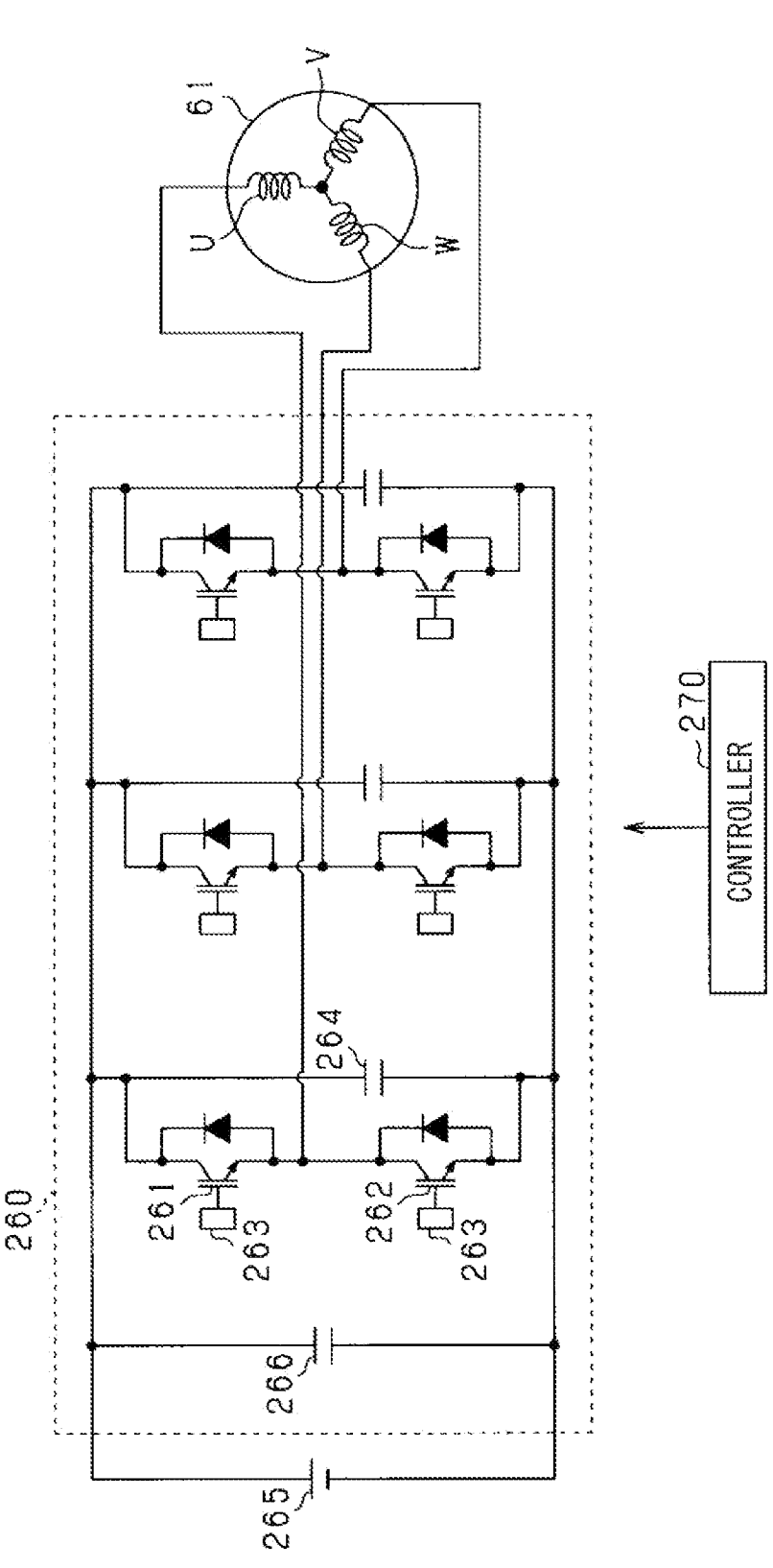
FIG. 35 is an electrical circuit diagram illustrating a control system of the rotary electric machine.
Figure 36:
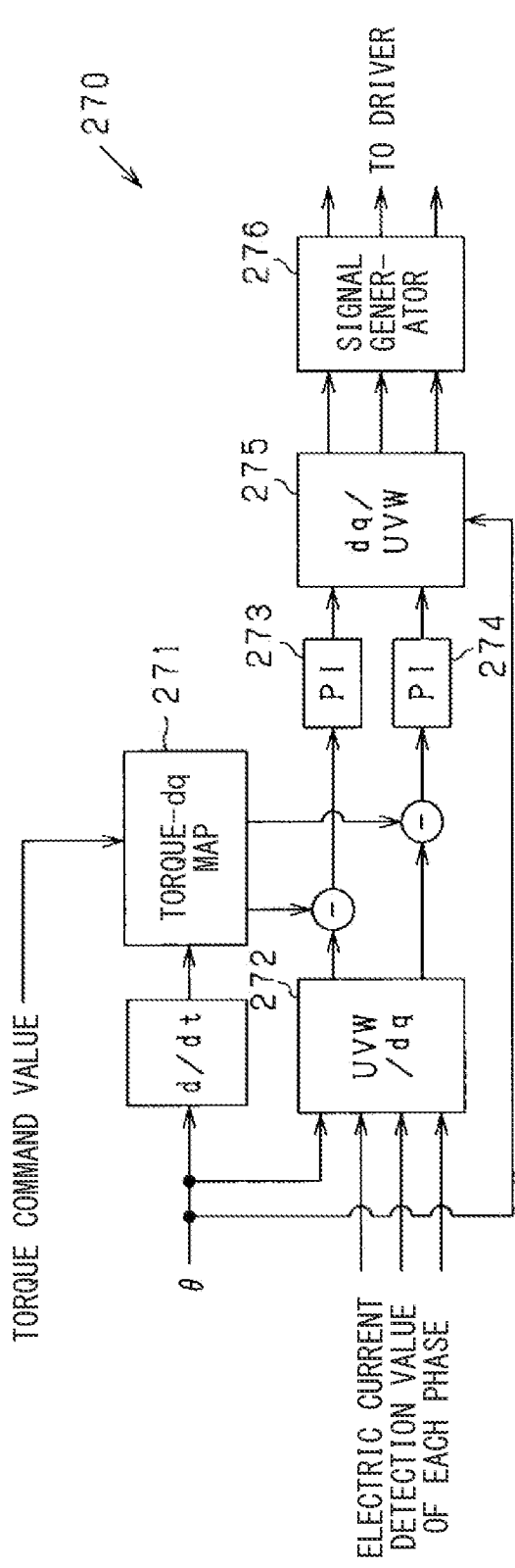
FIG. 36 is a functional block diagram illustrating a current feedback control operation by a controller.

Next, a configuration of a control system that controls the rotary electric machine 10 will be described. FIG. 35 is an electrical circuit diagram of a control system of the rotary electric machine 10, and FIG. 36 is a functional block diagram illustrating control operation by a controller 270.

As illustrated in FIG. 35, the stator winding 61 includes a U-phase winding, a V-phase winding, and a W-phase winding, and an inverter 260 corresponding to a power converter is connected to the stator winding 61. The inverter 260 is configured by a bridge circuit having upper and lower arms whose numbers are respectively identical to the number of phases. The inverter 260 includes a series-connected part including an upper arm switch 261 and a lower arm switch 262 for each phase. Each of these switches 261 and 262 is turned on and off by a driver circuit 263 to control energization of the phase windings of each phase. Each of the switches 261 and 262 includes a semiconductor switch such as a metal-oxide-semiconductor field-effect transistor (MOSFET) or an insulated-gate bipolar transistor (IGBT). A capacitor 264 for charge supply that supplies charges required at the time of switching to the switches 261 and 262 is connected to the upper and lower arms of each phase in parallel to the series-connected part of the switches 261 and 262.

One ends of the U-phase winding, the V-phase winding, and the W-phase winding are respectively connected to intermediate connection points between the switches 261 and 262 of the upper and lower arms. The phase windings are connected in a form of the star connection (Y-connection), and the other ends of the phase windings are connected to one another at the neutral point.

The controller 270 includes a microcomputer including a central processing unit (CPU) and various memories. The controller 270 performs energization control by turning on and off each of the switches 261 and 262 on the basis of various detection information and a request for a motor mode or a generator mode of the rotary electric machine 10. The detection information of the rotary electric machine 10 includes, for example, an angular position (electrical angle) of the rotor 20 detected by an angle detector such as a resolver, a power supply voltage (voltage inputted to the inverter) detected by a voltage sensor, and an exciting current for each phase winding detected by a current sensor. The controller 270 performs on/off control of each of the switches 261 and 262 by, for example, pulse width modulation (PWM) control at a predetermined switching frequency (carrier frequency) or rectangular wave control. The controller 270 may be a built-in controller incorporated into the rotary electric machine 10 or may be an external controller provided outside the rotary electric machine 10.

Since the rotary electric machine 10 according to the present embodiment has a slot-less structure (tooth-less structure), the inductance of the stator 60 is reduced and the electrical time constant is small. Under a condition where the electrical time constant is small, the switching frequency (carrier frequency) is desirably increased to increase the switching speed. In this respect, the capacitor 264 for charge supply is connected in parallel to the series-connected part of the switches 261 and 262 of each phase, thereby reducing the wiring inductance. Therefore, an appropriate counter-measure against surge can be taken even in a configuration in which the switching speed is increased.

The high-potential side terminal of the inverter 260 is connected to the positive electrode terminal of a direct current (DC) power supply 265, and the low-potential side terminal is connected to the negative electrode terminal (ground) of the DC power supply 265. The DC power supply 265 includes, for example, an assembled battery in which a plurality of unit cells are connected in series. In addition, a smoothing capacitor 266 is connected in parallel to the DC power supply 265 to the high-potential side terminal and the low-potential side terminal of the inverter 260.

FIG. 36 is a block diagram illustrating a current feedback control operation for controlling the phase currents of U-, V-, and W-phases.

In FIG. 36, a current command determiner 271 uses a torque-dq map to determine a current command value for the d-axis and a current command value for the q-axis. This command determination is based on: a motor-mode torque command value or a generator-mode torque command value for the rotary electric machine 10; and an electrical angular velocity $\omega$ obtained by differentiating an electrical angle $\theta$ with respect to time. When the rotary electric machine 10 is used as, for example, a power source for an automotive application, the generator-mode torque command value is a regenerative torque command value.

A d-q converter 272 converts a current value (three phase currents) detected by a current sensor provided for each phase into a d-axis current and a q-axis current. The d-axis current and the q-axis current are components of a two-dimensional rotating Cartesian coordinate system having a direction of an axis of a magnetic field, or field direction, as a d-axis.

The d-axis current feedback control device 273 calculates a d-axis command voltage as a manipulated variable for bringing the d-axis current into agreement with the current command value for the d-axis in a feedback mode. The q-axis current feedback control device 274 calculates a q-axis command voltage as a manipulated variable for bringing the q-axis current into agreement with the current command value for the q-axis in a feedback mode. In each of the feedback control devices 273 and 274, the command voltage is calculated using proportional integral (PI) feedback techniques on the basis of the deviation of the d-axis current and the q-axis current with respect to the current command value.

The three-phase converter 275 converts the d-axis and q-axis command voltages into U-phase, V-phase, and W-phase command voltages. Each of the units 271 to 275 described above is a feedback control device that performs feedback control of the fundamental wave current according to the d-q transformation theory. The command voltages of the U-phase, the V-phase, and the W-phase are feedback control values.

An operation signal generator 276 generates an operation signal of the inverter 260 on the basis of a three-phase command voltage by using a well-known triangle wave carrier comparison. Specifically, the operation signal generator 276 generates switch operation signals (duty signals) for the upper and lower arms in each phase by PWM control. The PWM control is based on magnitude comparison between a signal obtained by normalizing command voltages of three phases with a power supply voltage and a carrier signal such as a triangle wave signal. The switch operation signal generated by the operation signal generator 276 is output to the driver circuit 263 of the inverter 260. The driver circuit 263 turns on and off the switches 261 and 262 of the respective phases.

Next, torque feedback control operation will be described. This operation is mainly used for the purpose of increasing the output power and reducing the loss of the rotary electric machine 10 under an operating condition where the output voltage of the inverter 260 increases. Examples of a situation under such an operating condition include a high rotation operation region and a high output operation region. The controller 270 selects and executes either the torque feedback control operation or the current feedback control operation based on the operating condition of the rotary electric machine 10.

Figure 37:
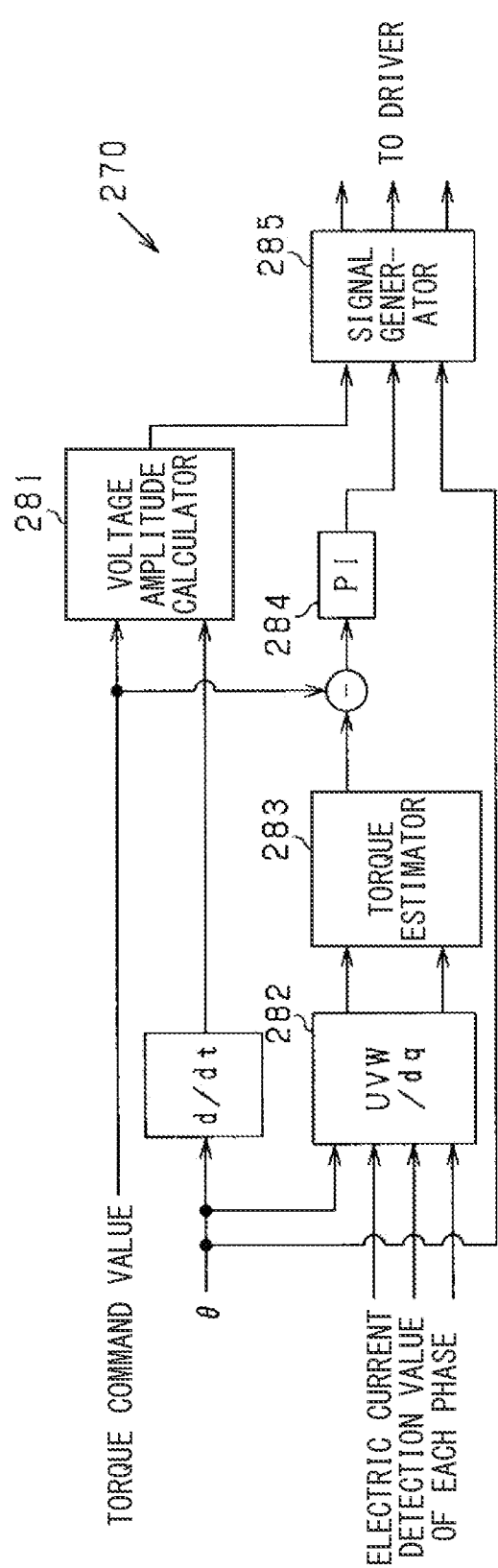
FIG. 37 is a functional block diagram illustrating a torque feedback control operation by the controller.

FIG. 37 is a block diagram illustrating a torque feedback control operation corresponding to the U-, V-, and W-phases.

A voltage amplitude calculator 281 calculates a voltage amplitude command that is a command value of the magnitude of the voltage vector. The calculation is based on the motor-mode torque command value or the generator-mode torque command value for the rotary electric machine 10 and the electrical angular velocity ω obtained by differentiating the electrical angle θ with respect to time.

Similarly to the d-q converter 272, a d-q converter 282 converts a current value detected by a current sensor provided for each phase into a d-axis current and a q-axis current. A torque estimator 283 calculates estimated torque values corresponding to the U-, V-, and W-phases based on the d-axis current and the q-axis current. The torque estimator 283 is only required to calculate the voltage amplitude command on the basis of map information in which the d-axis current, the q-axis current, and the voltage amplitude command are associated with each other.

A torque feedback control device 284 calculates a voltage phase command as a manipulated variable for bringing the estimated torque value into agreement with the motor-mode torque command value or the generator-mode torque command value in a feedback mode. The voltage phase command is a command value of a phase of a voltage vector. The torque feedback control device 284 calculates the voltage phase command using the PI feedback techniques on the basis of the deviation of the estimated torque value with respect to the motor-mode torque command value or the generator-mode torque command value.

An operation signal generator 285 generates an operation signal of the inverter 260 based on the voltage amplitude command, the voltage phase command, and the electrical angle θ. Specifically, the operation signal generator 285 calculates a three-phase command voltages on the basis of the voltage amplitude command, the voltage phase command, and the electrical angle θ. The operation signal generator 285 then generates switch operation signals for the upper and lower arms in each phase by PWM control. The PWM control is based on magnitude comparison between a signal obtained by normalizing three-phase command voltages thus calculated with a power supply voltage, and a carrier signal such as a triangle wave signal. The switch operation signal generated by the operation signal generator 285 is output to the driver circuit 263 of the inverter 260. The driver circuit 263 turns on and off the switches 261 and 262 of the respective phases.

The operation signal generator 285 may alternatively generate the switch operation signal on the basis of: the pulse pattern information that is map information associating the voltage amplitude command, the voltage phase command, the electrical angle θ, and the switch operation signal with one another; the voltage amplitude command; the voltage phase command; and the electrical angle θ.

Modification

Hereinafter, modifications of the above-described first embodiment will be described.

Figure 38:
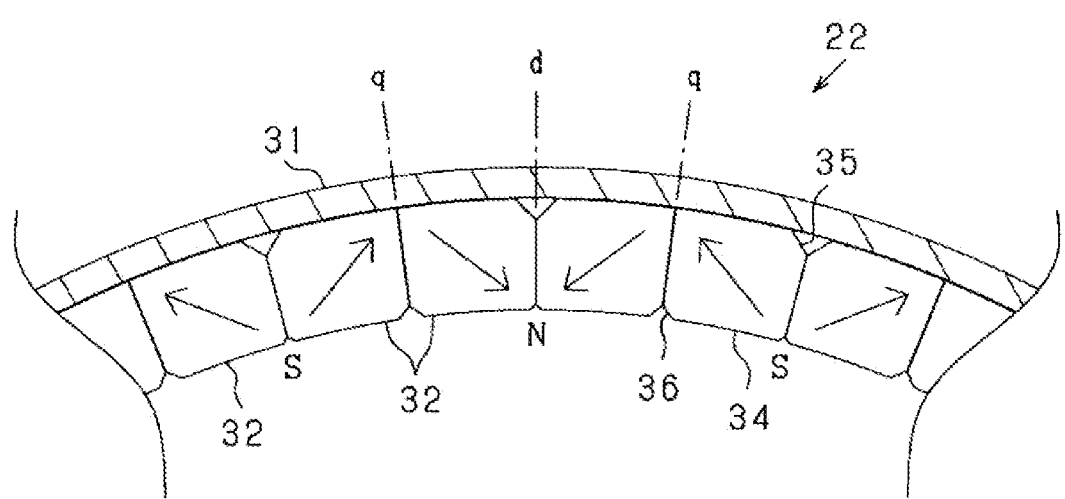
FIG. 38 is a partial transverse sectional view illustrating a sectional structure of the magnet unit in a modification.

The configuration of the magnet 32 in the magnet unit 22 may be changed as follows. In the magnet unit 22 illustrated in FIG. 38, the direction of the easy axis of magnetization is oblique to the radial direction in the magnet 32, and a linear magnetic path is formed along the direction of the easy axis of magnetization. That is, the magnet 32 is linearly oriented as follows. Between a magnetic flux acting surface 34a on the stator 60 side (inner side in the radial direction) and a magnetic flux acting surface 34b on the opposite side to the stator (outer side in the radial direction), the direction of the easy axis of magnetization is oblique to the d-axis. At the same time, the easy axis of magnetization approaches the d-axis on the stator 60 side and separates from the d-axis on the opposite side to the stator in the circumferential direction. Also in this configuration, the length of the magnetic path of the magnet 32 can be made greater than the thickness dimension in the radial direction, and thus the permeance can be improved.

A Halbach array magnet can be used in the magnet unit 22.

In each winding segment 151, the direction of bending of the link portion 153 may be either inward or outward in the radial direction. A relationship between the direction of bending and the core assembly CA may be such that the first link portion 153A is bent toward the core assembly CA, or the first link portion 153A is bent toward the opposite side of the core assembly CA. In addition, the second link portion 153B may be bent either inward or outward in the radial direction as long as the second link portion 153B crosses over part of the first link portion 153A in the circumferential direction, on the outer side of the first link portion 153A in the axial direction.

The winding segments 151 may not include the two types of winding segments 151 (the first winding segment 151A and the second winding segment 151B), but may include one type of winding segment 151. Specifically, the winding segment 151 is preferably formed to have a substantially L shape or a substantially Z shape in a side view. When the winding segment 151 is formed in a substantially L shape in a side view, the link portion 153 is bent either inward or outward in the radial direction on one end side in the axial direction, and the link portion 153 is provided without being bent in the radial direction on the other end side in the axial direction. When the winding segment 151 is formed in a substantially Z shape in a side view, the link portion 153 is bent in directions opposite to each other in the radial direction on one end side in the axial direction and the other end side in the axial direction. In any case, the coil module 150 is preferably fixed to the core assembly CA by the insulating cover covering the link portion 153 as described above.

In the configuration described above, all the winding segments 151 are connected in parallel for each phase winding in the stator winding 61, but this may be changed. For example, all the winding segments 151 for each phase winding may be divided into a plurality of parallel connection groups, and the plurality of parallel connection groups may be connected in series. Specifically, all n winding segments 151 in each phase winding may be divided into two sets of parallel connection groups each including n/2 winding segments 151, three sets of parallel connection groups each including n/3 winding segments 151, or the like, and then those divided parallel connection groups may be connected in series. Alternatively, all of the plurality of winding segments 151 may be connected in series for each phase winding in the stator winding 61.

The stator winding 61 in the rotary electric machine 10 may include two-phase windings (U-phase winding and V-phase winding). In this case, with regard to the winding segment 151 for example, the pair of intermediate conductor portions 152 are separated at one coil pitch. One intermediate conductor portion 152 for the winding segment 151 of another phase is disposed between the pair of intermediate conductor portions 152.

Figure 39:
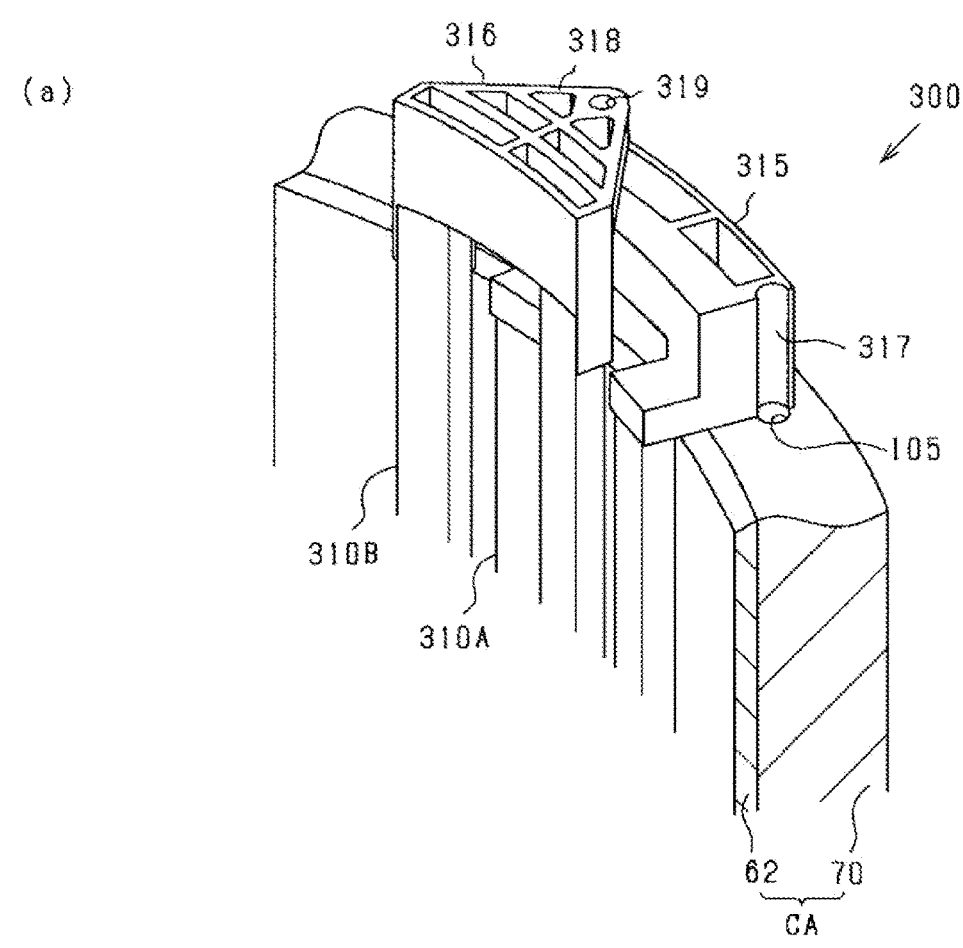
FIG. 39 is a view illustrating a configuration of the stator unit having an inner rotor structure.
Figure 39:
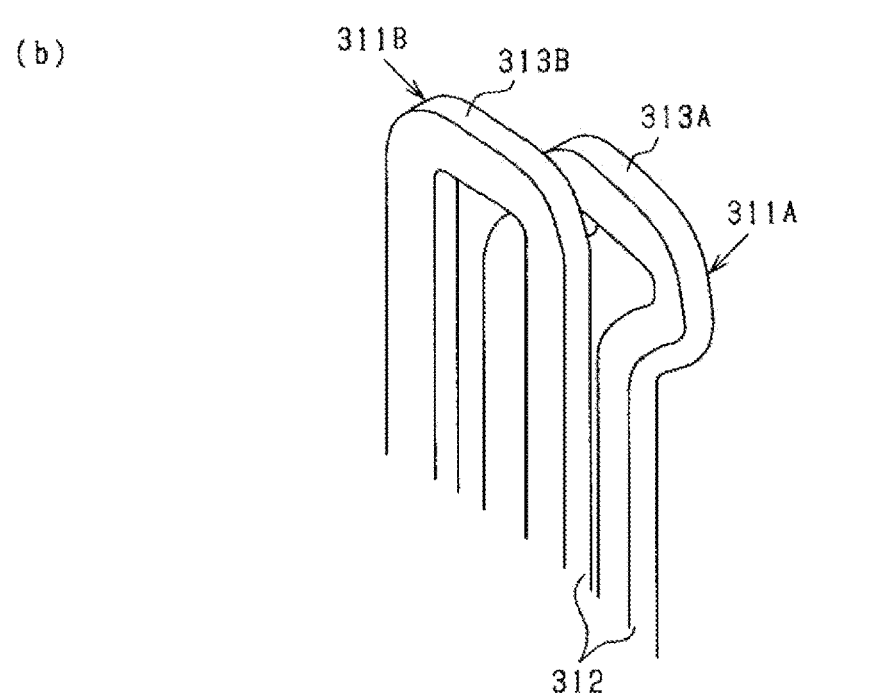

The rotary electric machine 10 can be embodied as an inner rotor type surface permanent magnetic rotary electric machine instead of the outer-rotor type surface permanent magnetic rotary electric machine. (a) and (b) of FIG. 39 is a view illustrating a configuration of a stator unit 300 when employing an inner rotor structure. Of FIG. 39, (a) of FIG. 39 is a perspective view illustrating a state where coil modules 310A and 310B are assembled to the core assembly CA, and (b) of FIG. 39 is a perspective view illustrating the winding segments 311A and 311B included in the coil modules 310A and 310B. In this example, the stator holder 70 is assembled to the outer side of the stator core 62 in the radial direction to form the core assembly CA. In addition, a plurality of the coil modules 310A and 310B are assembled to the inner side of the stator core 62 in the radial direction.

The winding segment 311A has a configuration substantially the same as or similar to that of the first winding segment 151A described above. The winding segment 311A includes a pair of intermediate conductor portions 312 and a link portion 313A formed to be bent to the core assembly CA side on both sides in the axial direction (outer side in the radial direction). The winding segment 311B has a configuration substantially the same as or similar to that of the second winding segment 151B described above. The winding segment 311B includes the pair of intermediate conductor portions 312 and a link portion 313B provided so as to cross over the link portion 313A in the circumferential direction on the outer side in the axial direction, on both sides in the axial direction. An insulating cover 315 is mounted to the link portion 313A of the winding segment 311A, and an insulating cover 316 is mounted to the link portion 313B of the winding segment 311B.

The insulating cover 315 includes semicircular recesses 317 extending in the axial direction at side surface portions on both sides in the circumferential direction. The insulating cover 316 includes a protrusion 318 protruding outward in the radial direction from the link portion 313B. A through-hole 319 extending in the axial direction is provided at an extending end of the protrusion 318.

Figure 40:
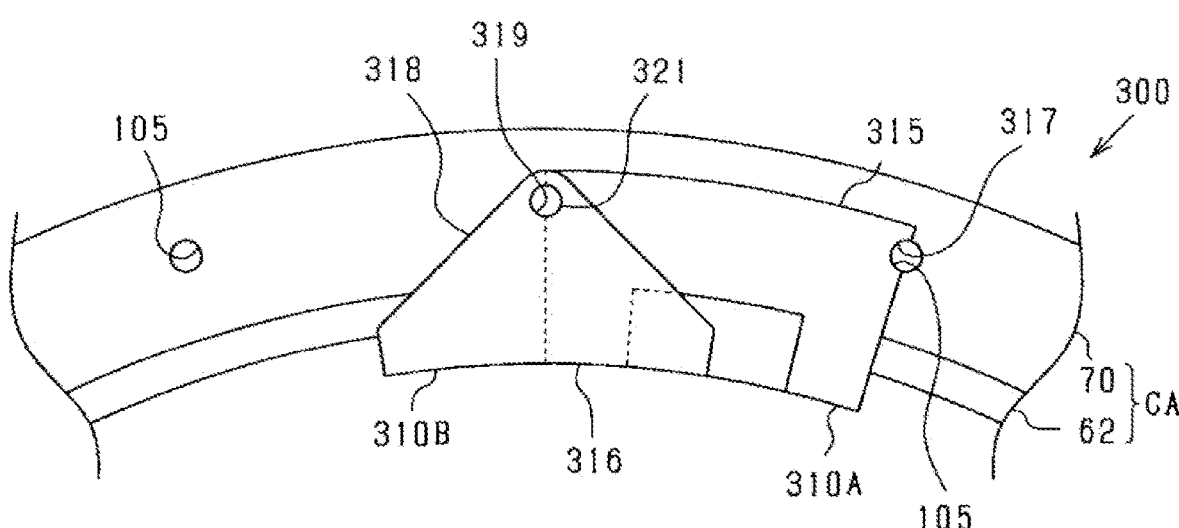
FIG. 40 is a plan view illustrating a state where the coil modules are assembled to the core assembly.

FIG. 40 is a plan view illustrating a state where the coil modules 310A and 310B are assembled to the core assembly CA. In FIG. 40, a plurality of recesses 105 are formed at equal intervals in the circumferential direction at the end surface of the stator holder 70 in the axial direction. The stator holder 70 has a cooling structure utilizing liquid coolant or air. As an air cooling structure, for example, a plurality of heat dissipation fins are preferably formed on the outer peripheral surface.

In FIG. 40, the insulating covers 315 and 316 are disposed to overlap each other in the axial direction. In addition, the recess 317 and the through-hole 319 are connected in the axial direction. The recess 317 is provided at the side surface portion of the insulating cover 315. The through-hole 319 is provided at the central position between one end and the other end in the circumferential direction of the insulating cover 316, in the protrusion 318 of the insulating cover 316. These parts are fixed with fastening pins 321.

In FIG. 40, the fixed position of each of the insulating covers 315 and 316 by the fastening pin 321 is the end surface of the stator holder 70 in the axial direction further on the outer side than the stator core 62 in the radial direction, and the stator holder 70 is fixed with the fastening pin 321. In this case, since the stator holder 70 includes the cooling structure, the heat generated in the winding segments 311A and 311B is easily transferred to the stator holder 70. With this configuration, the cooling performance of the stator winding 61 can be improved.

The stator 60 used in the rotary electric machine 10 may have a protrusion (e.g., tooth) extending from the back yoke. Also in this case, the coil module 150 and the like are only required to be assembled to the back yoke of the stator core.

The rotary electric machine is not limited to a star connection, and may be a Δ connection.

As the rotary electric machine 10, instead of a revolving-field type rotary electric machine in which a magnetic field-producing unit is a rotor and an armature is a stator, a revolving armature type rotary electric machine in which an armature is a rotor and a magnetic field-producing unit is a stator can also be adopted.

Second Embodiment

Figure 41:
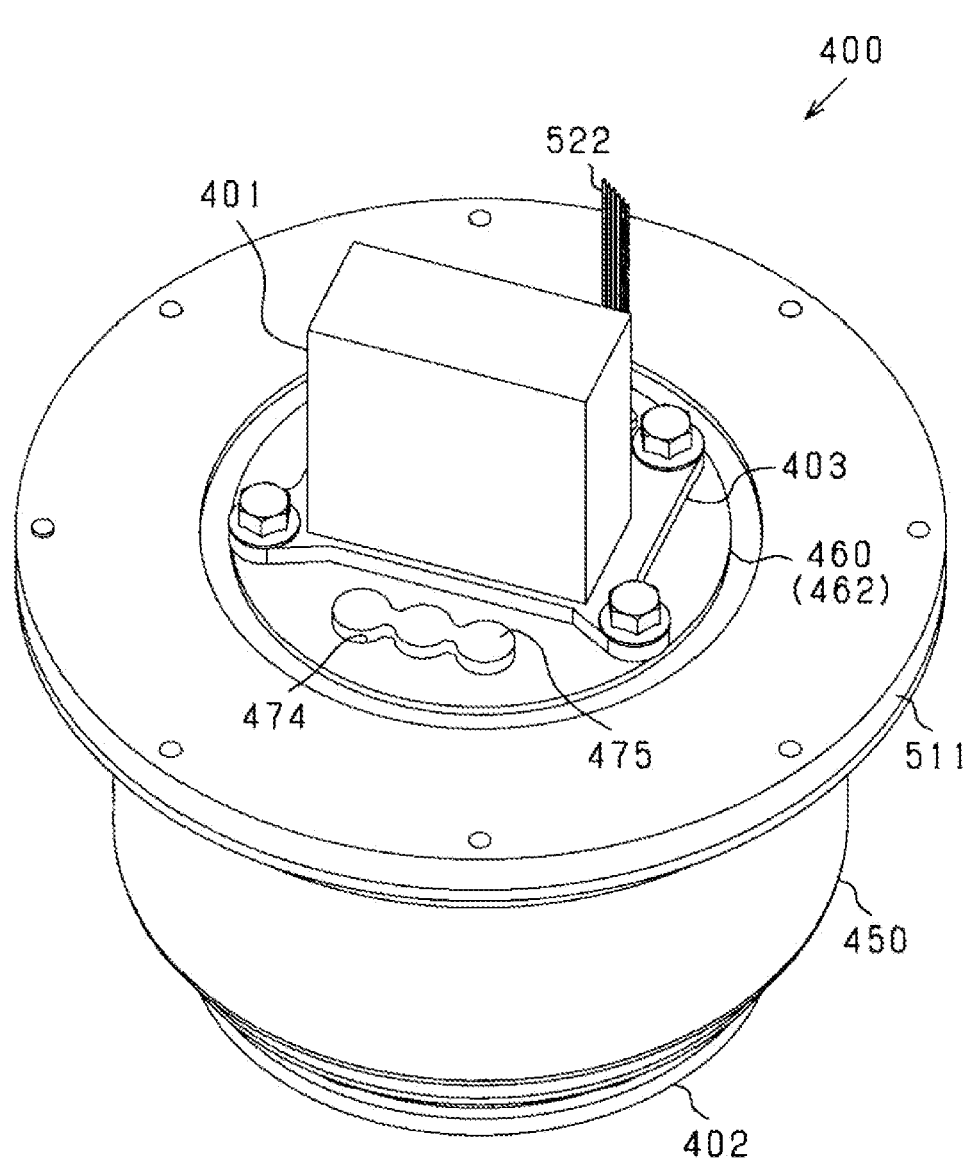
FIG. 41 is a perspective view illustrating an entire rotary electric machine according to a second embodiment.
Figure 42:
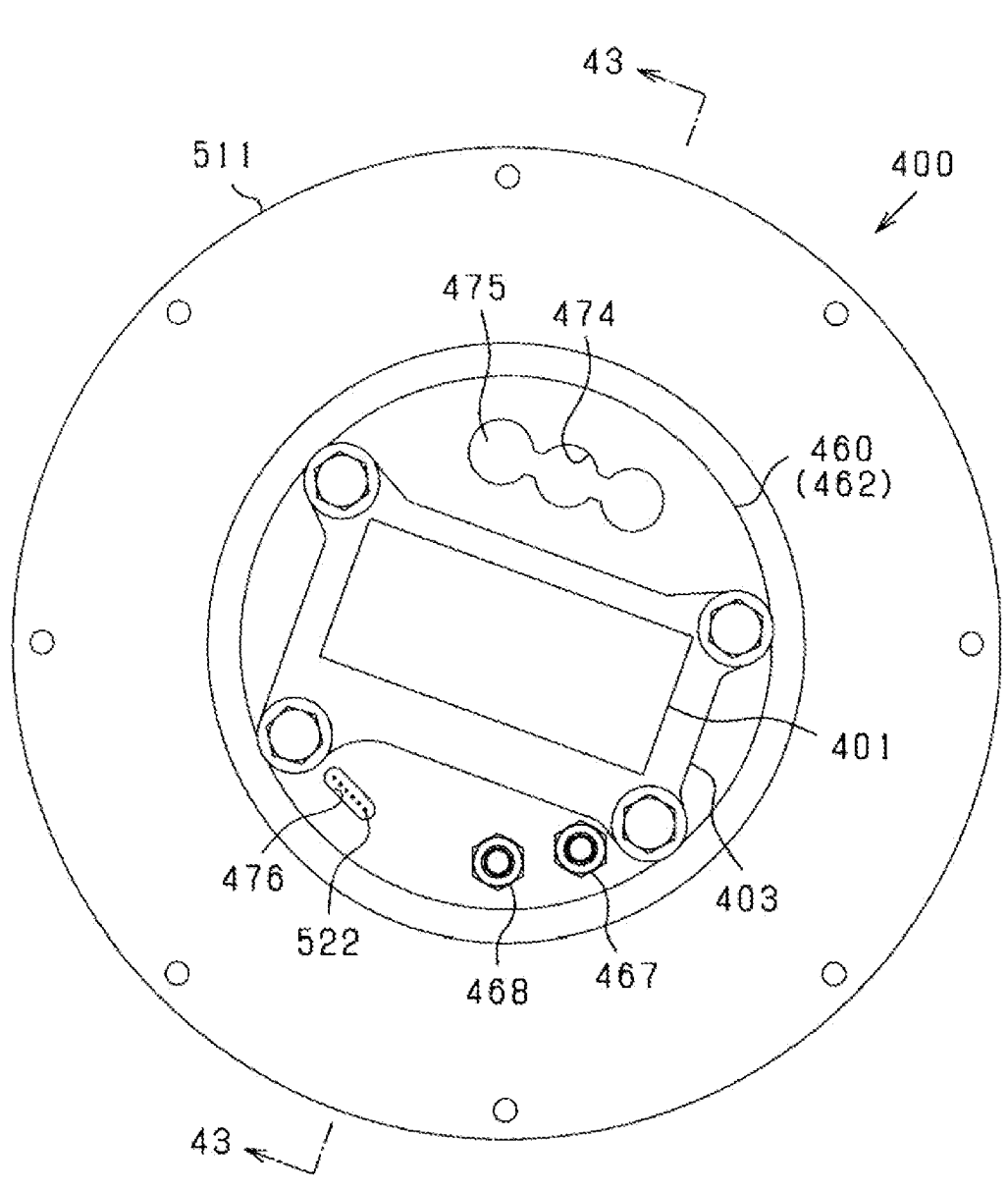
FIG. 42 is a plan view of the rotary electric machine.
Figure 43:
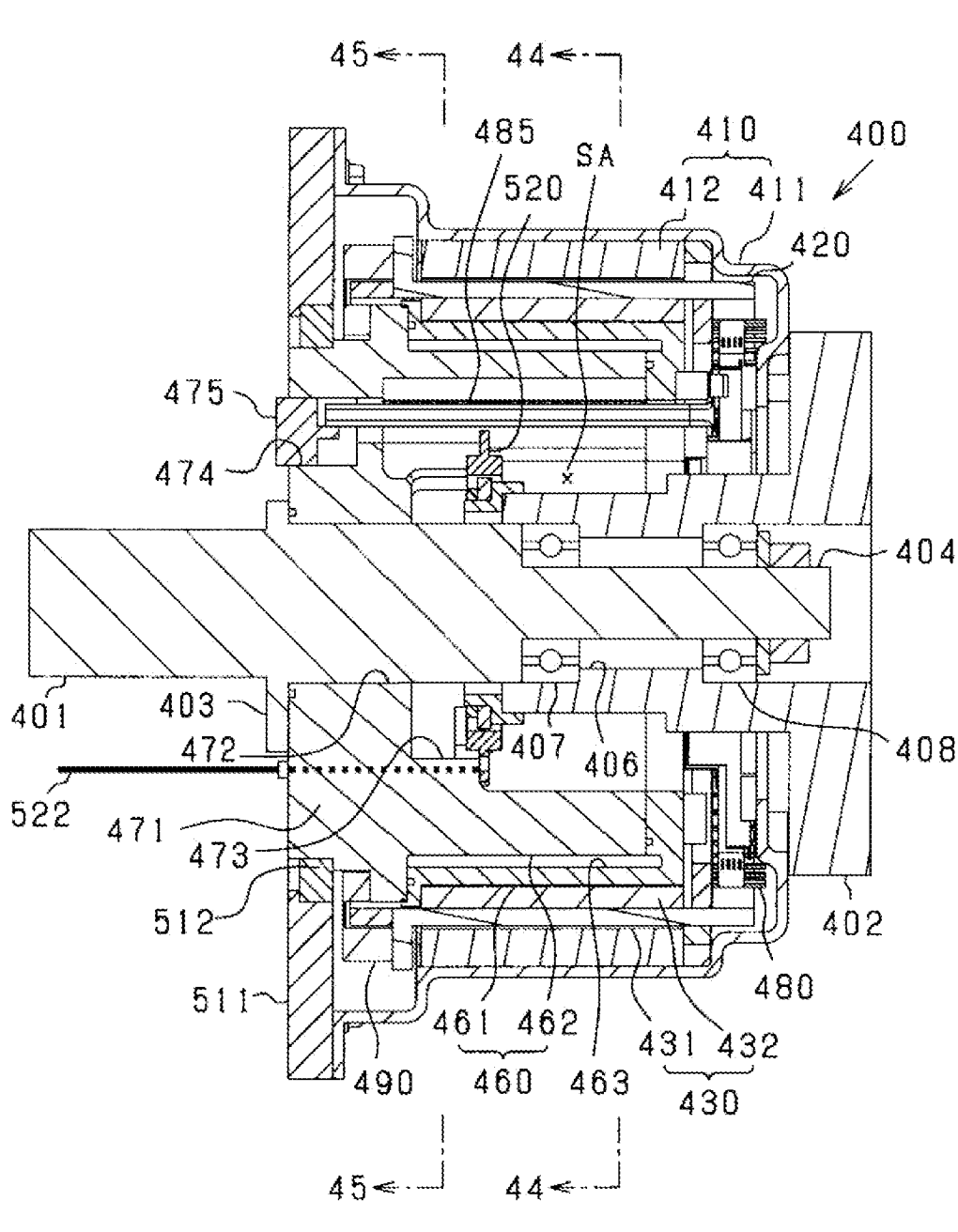
FIG. 43 is a longitudinal sectional view of the rotary electric machine.
Figure 44:
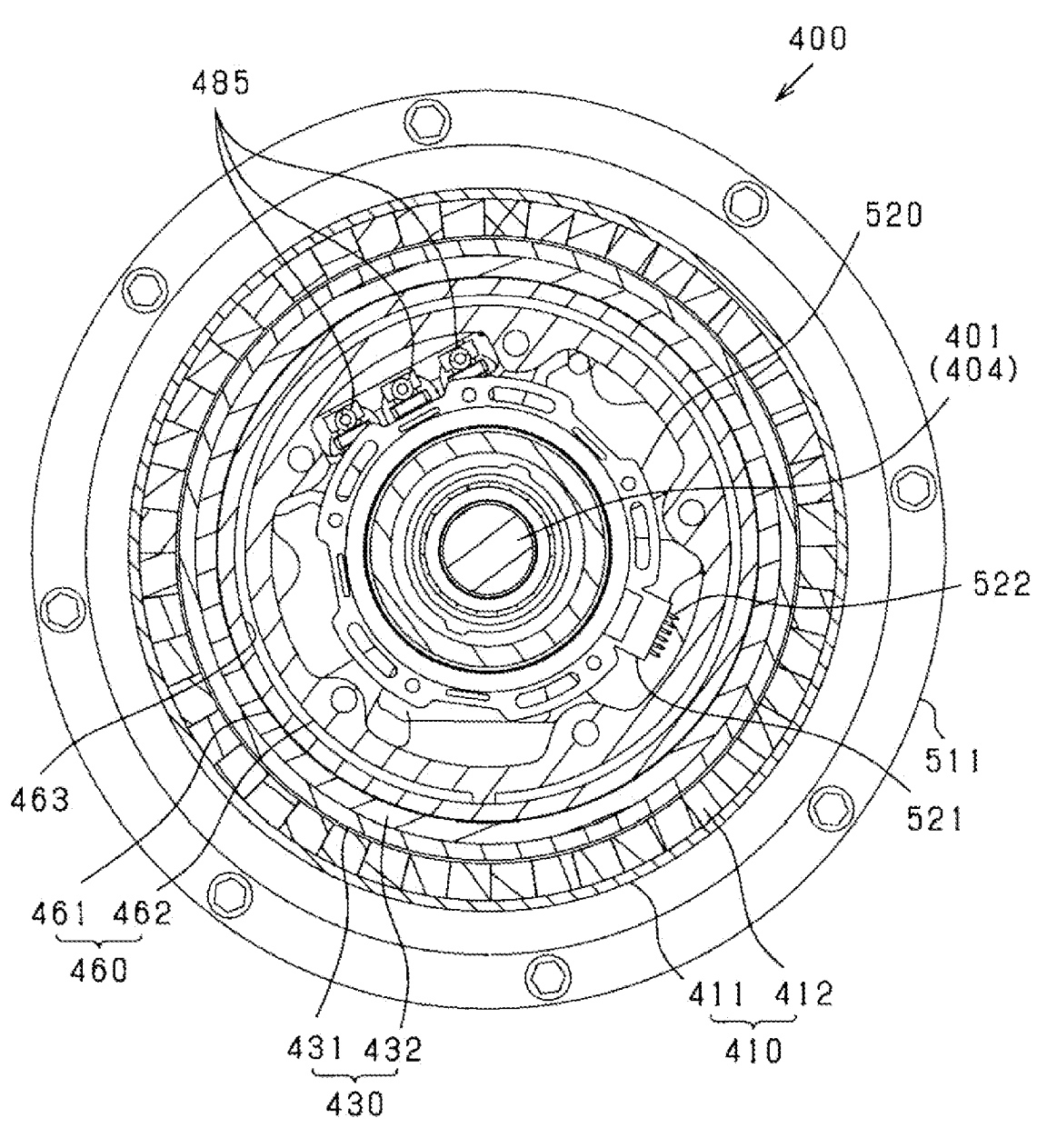
FIG. 44 is a transverse sectional view of the rotary electric machine.
Figure 45:
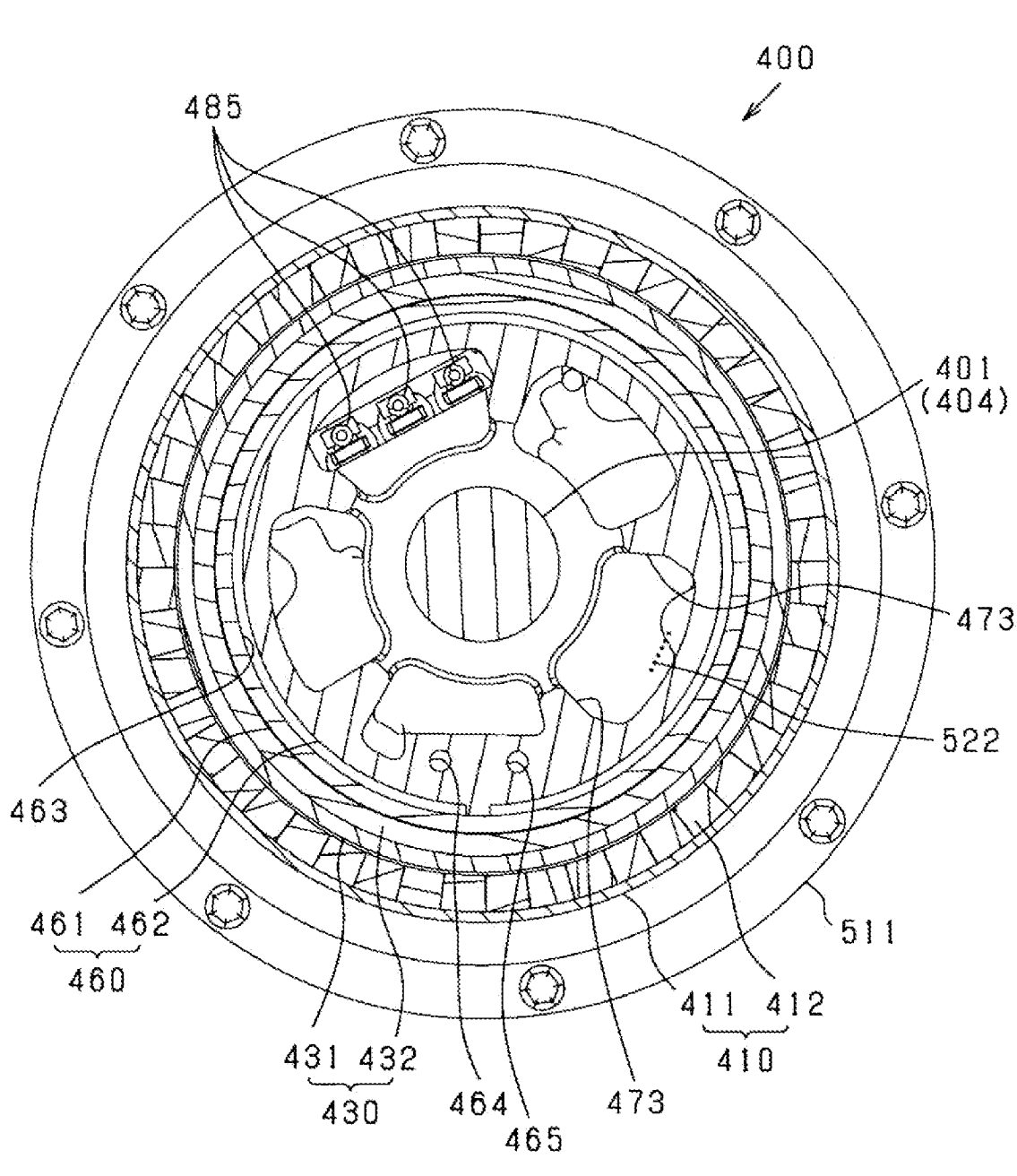
FIG. 45 is a transverse sectional view of the rotary electric machine.
Figure 46:
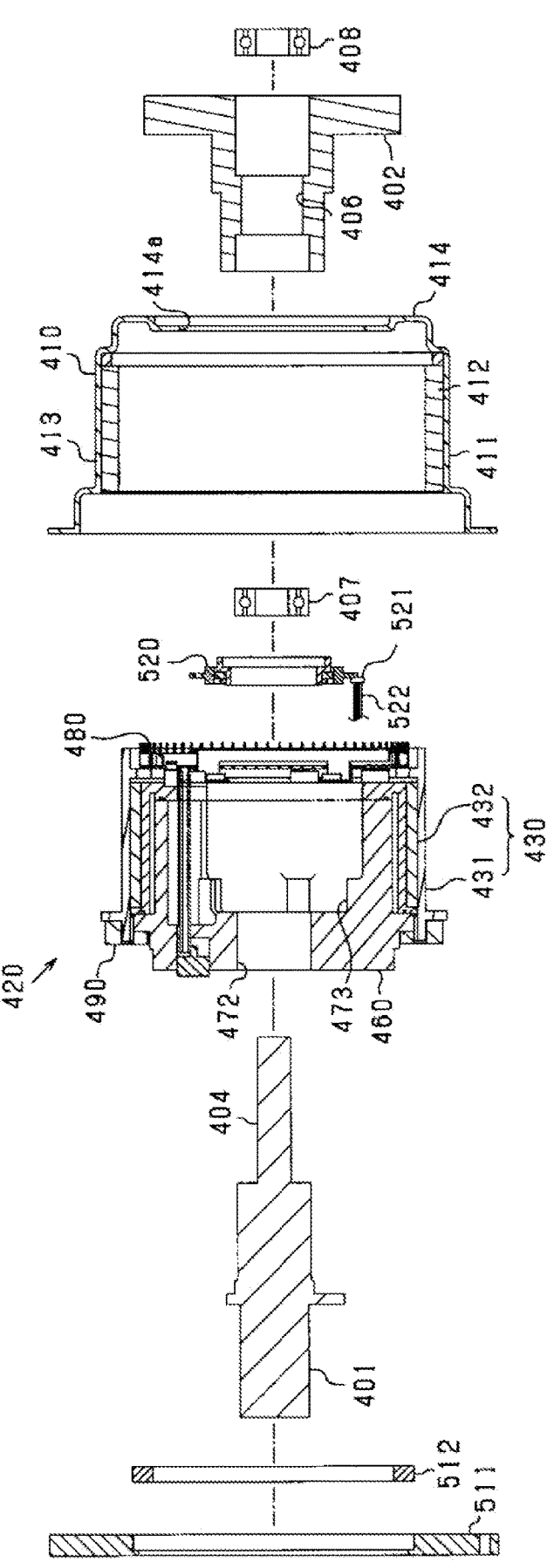
FIG. 46 is an exploded sectional view of the rotary electric machine.

Next, a rotary electric machine 400 according to a second embodiment will be described. The rotary electric machine 400 according to the present embodiment is used as an in-wheel motor of a vehicle. A schema of the rotary electric machine 400 is illustrated in FIGS. 41 to 46. FIG. 41 is a perspective view illustrating the entire rotary electric machine 400. FIG. 42 is a plan view of the rotary electric machine 400. FIG. 43 is a longitudinal sectional view of the rotary electric machine 400 (a sectional view taken along line 43-43 in FIG. 42). FIG. 44 is a transverse sectional view of the rotary electric machine 400 (a sectional view taken along line 44-44 in FIG. 43). FIG. 45 is a transverse sectional view of the rotary electric machine 400 (a sectional view taken along line 45-45 in FIG. 43). FIG. 46 is an exploded sectional view illustrating components of the rotary electric machine 400 in an exploded manner.

The rotary electric machine 400 is an outer-rotor type surface permanent magnetic rotary electric machine. In the broad classification, the rotary electric machine 400 includes a rotary electric machine body including a rotor 410 and a stator unit 420 including a stator 430. The rotary electric machine 400 has a configuration in which a spindle 401 fixed to a vehicle body (not illustrated) and a hub 402 fixed to a wheel (not illustrated) are integrated with the rotary electric machine body. The spindle 401 and the hub 402 are required to have high strength, and are made of, for example, a steel material.

The spindle 401 includes a flange 403 and a stationary shaft 404. The flange 403 extends in a direction orthogonal to the axial direction. The stationary shaft 404 has a columnar shape, extends toward the center of the rotary electric machine from the flange 403, and is inserted through a hollow portion of the stator unit 420. The stationary shaft 404 preferably includes a large diameter portion and a small diameter portion as illustrated in the drawing. The hub 402 includes an insertion hole 406 through which the stationary shaft 404 is inserted. The hub 402 is rotatably supported by the pair of bearings 407 and 408 while the stationary shaft 404 is inserted through the insertion hole 406 of the hub 402. The hub 402 is rotatably supported by the bearings 407 and 408 at two positions in the axial direction. The bearings 407 and 408 are, for example, radial ball bearings and each have an outer race, an inner race, and a plurality of balls disposed therebetween. The bearings 407 and 408 may be roller bearing (needle roller bearing, tapered roller bearing) using rollers as rolling elements instead of balls.

In the rotary electric machine 400, a direction in which the axis serving as the rotation center extends (left-right direction in FIG. 43) is defined as the axial direction. The rotary electric machine 400 is attached to the vehicle such that the axial direction is directed along the horizontal direction or the substantially horizontal direction. When the wheels have a camber angle, the axial direction of the rotary electric machine 400 is preferably directed along the substantially horizontal direction while inclination corresponding to the camber angle is applied.

In the rotary electric machine 400, the rotor 410 and the stator 430 are disposed to face each other in the radial direction with an air gap interposed therebetween. The stator unit 420 is fixed to the spindle 401, and the rotor 410 is fixed to the hub 402. Therefore, the hub 402 and the rotor 410 are rotatable with respect to the spindle 401 and the stator unit 420.

As illustrated in FIG. 46, the rotor 410 includes a substantially cylindrical rotor carrier 411 and an annular magnet unit 412 fixed to the rotor carrier 411. The rotor carrier 411 includes a cylindrical portion 413 having a cylindrical shape and an end plate portion 414 provided on one end side in the axial direction of the cylindrical portion 413. The magnet unit 412 is fixed to the inner side of the cylindrical portion 413 in the radial direction to have an annular shape. The other end side in the axial direction of the rotor carrier 411 is open. The rotor carrier 411 functions as a magnet retainer. A through-hole 414a is formed in the central portion of the end plate portion 414. The hub 402 is fixed to the end plate portion 414 by using a fixing tool such as a bolt while the hub 402 is inserted through the through-hole 414a (see FIG. 43).

The magnet unit 412 includes a plurality of permanent magnets disposed such that the polarities are alternately changed along the circumferential direction of the rotor 410. The magnet unit 412 corresponds to a "magnet unit". With this configuration, the magnet unit 412 has a plurality of magnetic poles in the circumferential direction. The magnet unit 412 has, for example, the configuration described as the magnet unit 22 according to the first embodiment in FIGS. 6 and 7. For the permanent magnet, a sintered neodymium magnet having an intrinsic coercive force of 400 [kA/m] or more and the remanent flux density Br of 1.0 [T] or more is used.

Similarly to the magnet unit 22 in FIG. 7, the magnet unit 412 has a plurality of polar anisotropic permanent magnets. In these magnets, the directions of the easy axis of magnetization differ between the d-axis side (portion closer to the d-axis) and the q-axis side (portion closer to the q-axis). The direction of the easy axis of magnetization on the d-axis side is parallel to the d-axis, whereas the direction of the easy axis of magnetization on the q-axis side is orthogonal to the q-axis. In this case, an arc-shaped magnetic path is formed along the direction of the easy axis of magnetization. In short, each magnet is oriented such that the direction of the easy axis of magnetization is parallel to the d-axis serving as the center of the magnetic pole on the d-axis side as compared with that on the side of q-axis serving as the boundary of the magnetic pole.

Note that each magnet of the magnet unit 412 is preferably fixed to each other by adhesion or the like in the circumferential direction, and a fixing member such as a yarn is preferably attached, thereby being integrated each other at the outer peripheral portion. An annular end plate member is preferably attached to an end of each magnet in the axial direction.

Figure 47:
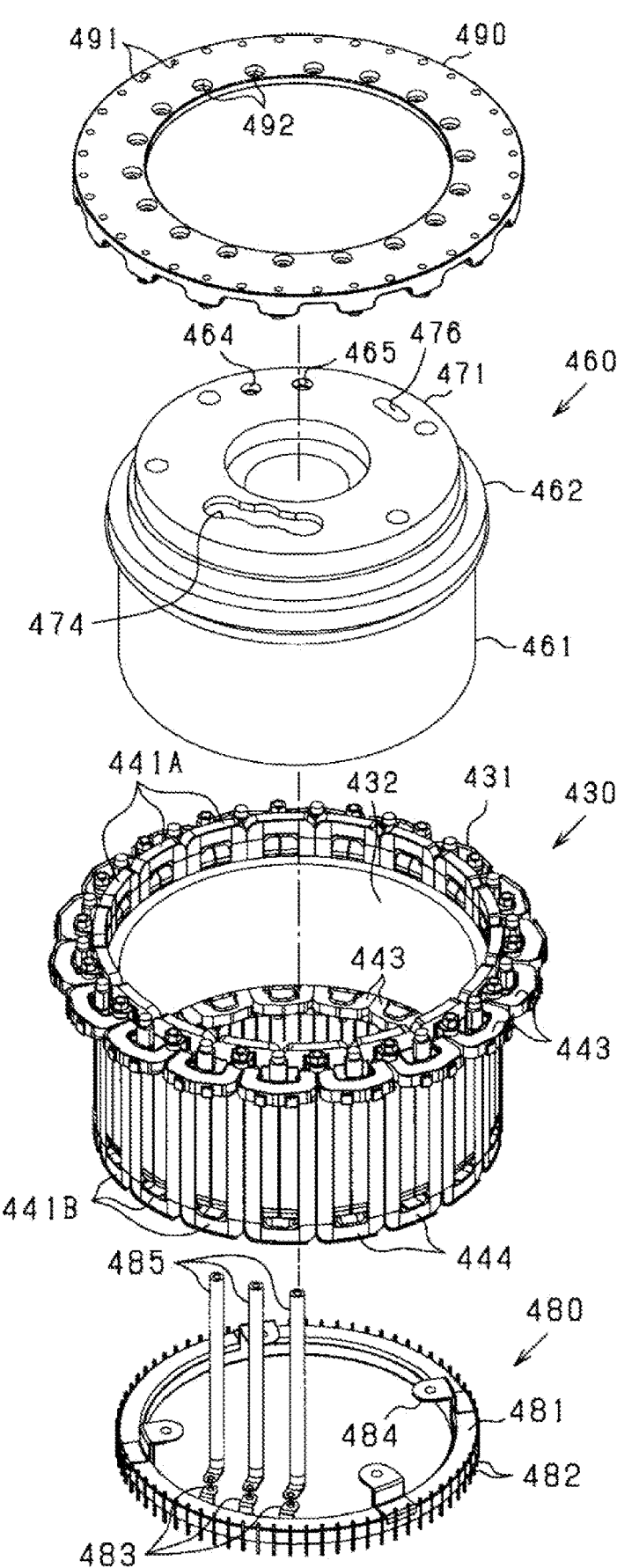
FIG. 47 is an exploded perspective view of the stator unit.

Next, a configuration of the stator unit 420 will be described. FIG. 47 is an exploded perspective view of the stator unit 420. The stator unit 420 includes the annular tubular stator 430, a stator holder 460 that holds the stator 430, a wiring module 480 attached to one end side in the axial direction, and a coil end cover 490 attached to the other end side in the axial direction of the stator 430.

Figure 48:
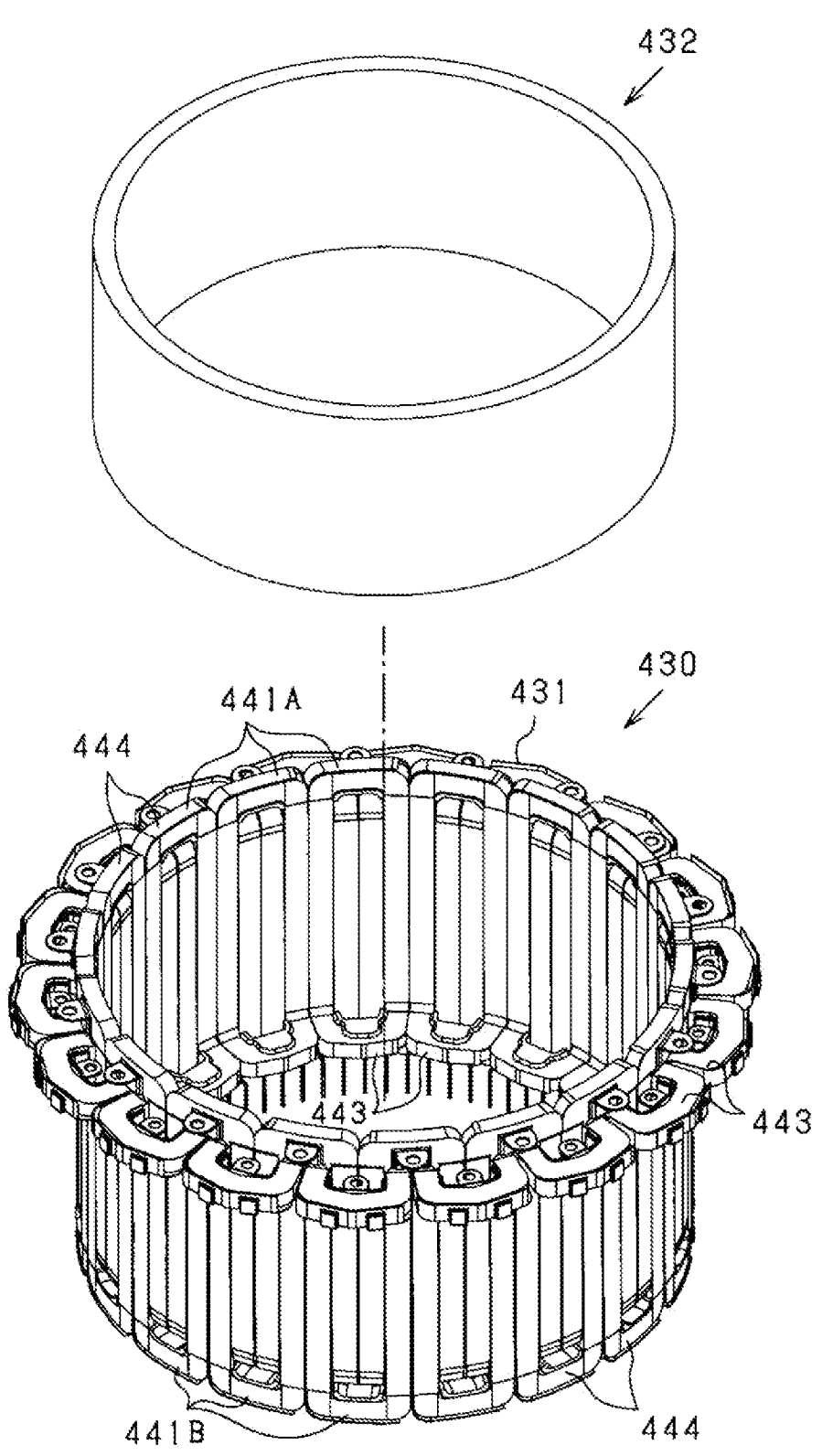
FIG. 48 is an exploded perspective view of a stator.
Figure 49:
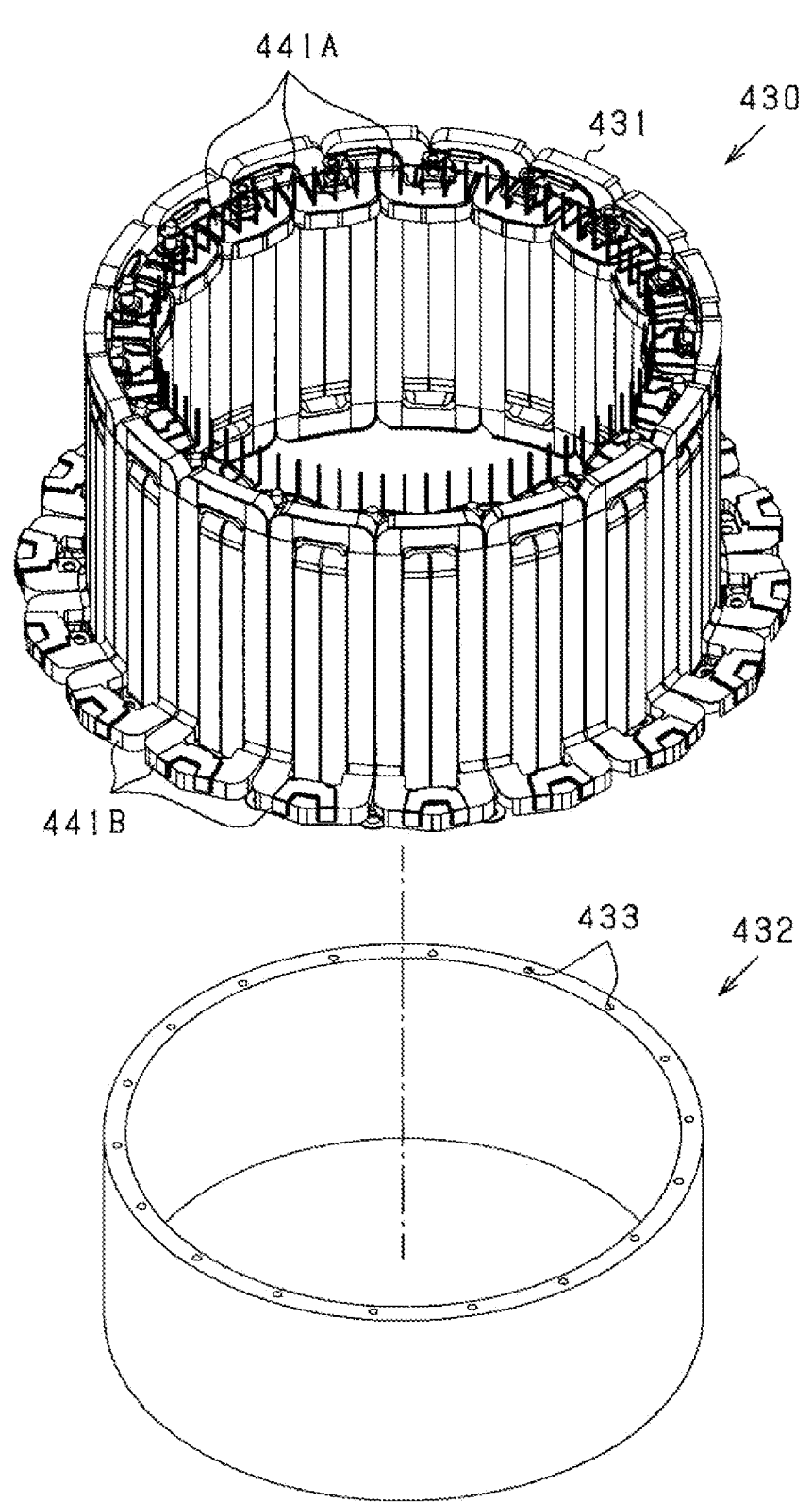
FIG. 49 is an exploded perspective view of the stator.
Figure 50:
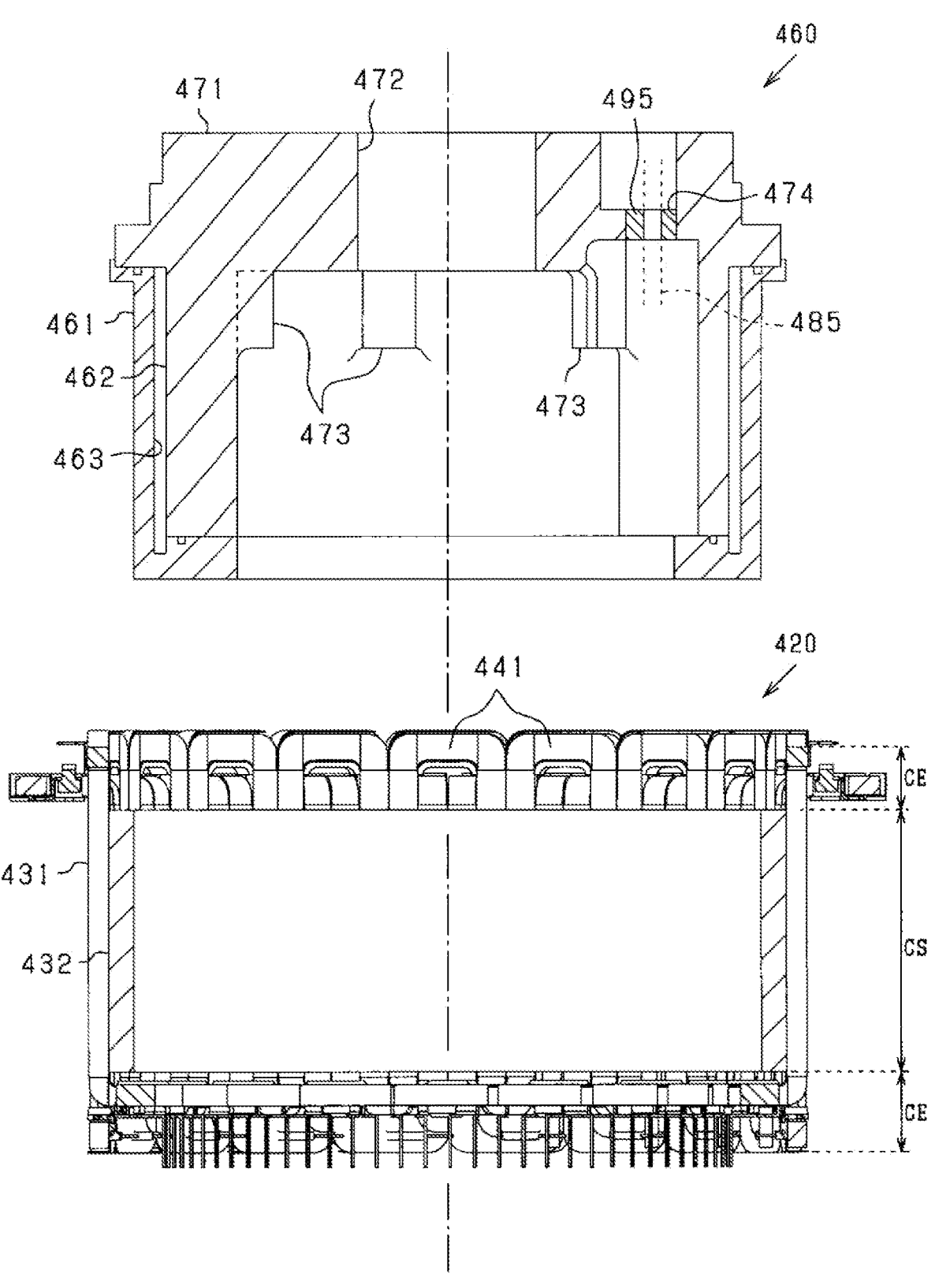
FIG. 50 is an exploded sectional view of the stator unit.

First, the stator 430 will now be described. FIGS. 48 and 49 are exploded perspective views of the stator 430, and FIG. 50 is an exploded sectional view of the stator unit 420. FIGS. 48 and 49 are exploded perspective views of the stator 430 viewed from different directions in the axial direction.

The stator 430 includes a stator winding 431 and a stator core 432. In the stator 430, the stator winding 431 has three-phase windings, and the phase winding of each phase includes a plurality of winding segments 441. The winding segments 441 are provided in accordance with the number of poles of the rotary electric machine 400, and the plurality of winding segments 441 are connected in parallel or in series for each phase. In the present embodiment, the number of magnetic poles is set to 24, but the number thereof can be freely set.

As illustrated in FIG. 50, the stator 430 includes, in the axial direction, a portion corresponding to the coil side CS facing the stator core 432 in the radial direction, and a portion corresponding to a coil end CE that is the outer side of the coil side CS in the axial direction. The coil side CS is also a portion facing the magnet unit 412 of the rotor 410 in the radial direction. The winding segments 441 are assembled to the outer side of the stator core 432 in the radial direction. In this case, the winding segments 441 are assembled in a state where both end portions thereof in the axial direction protrude outward from the stator core 432 in the axial direction (that is, to the coil end CE side).

Each of the winding segments 441 is provided such that one of both ends in the axial direction is bent in the radial direction and the other is not bent in the radial direction. In the winding segments 441 that is half the number of all the winding segments 441, one end side in the axial direction (lower side in FIG. 48) is a bent side, and is bent inward in the radial direction on the bent side. In the winding segments 441 that is remaining half of all the winding segments 441, the other end side in the axial direction (upper side in FIG. 48) is a bent side, and is bent outward in the radial direction on the bent side. In the following description, among the winding segments 441, the winding segment 441 having the portion bent inward in the radial direction is also referred to as a "winding segment 441A", and the winding segment 441 having the portion bent outward in the radial direction is also referred to as a "winding segment 441B".

Figure 51:
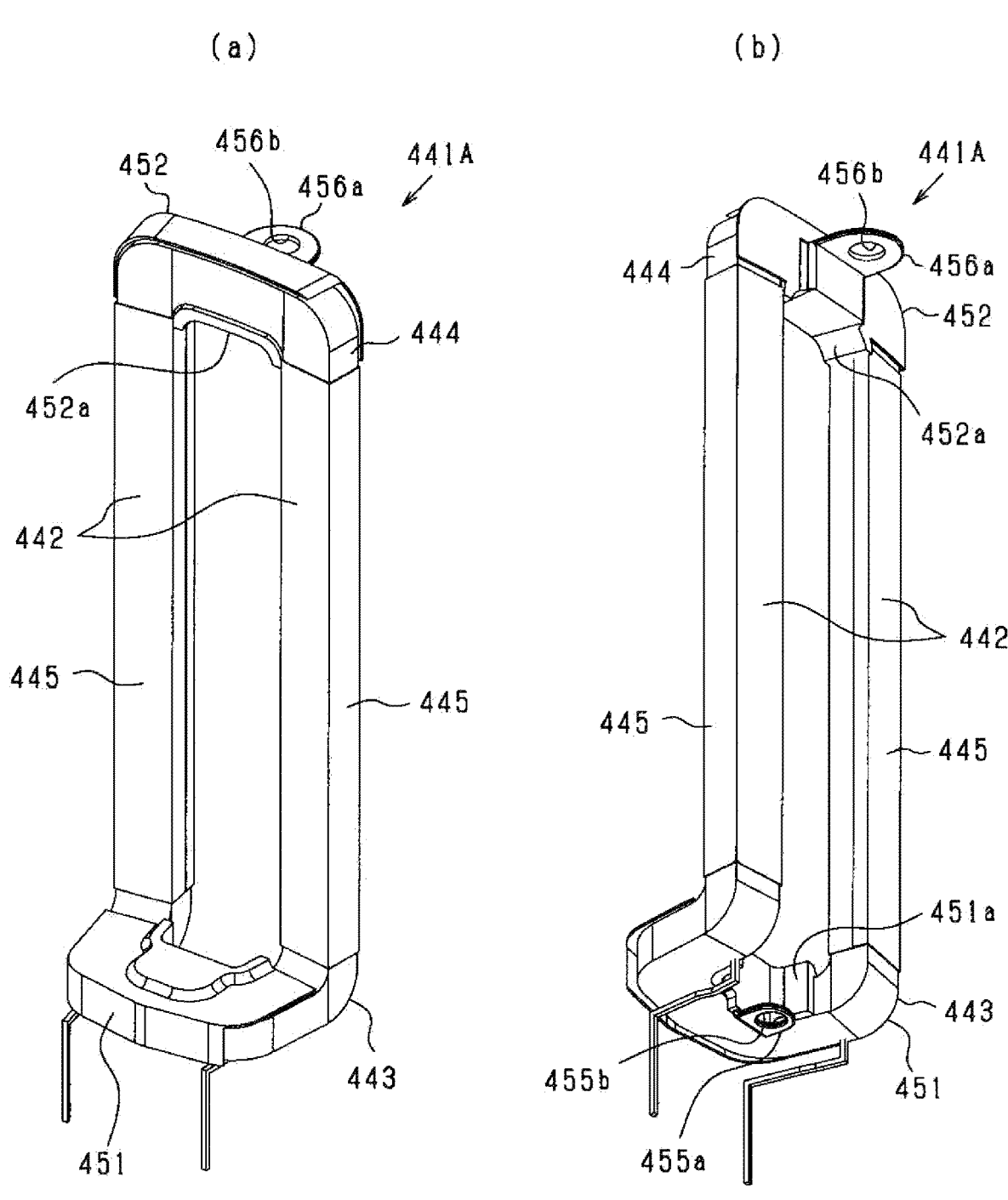
FIG. 51 is a perspective view illustrating a configuration of the winding segment.
Figure 52:
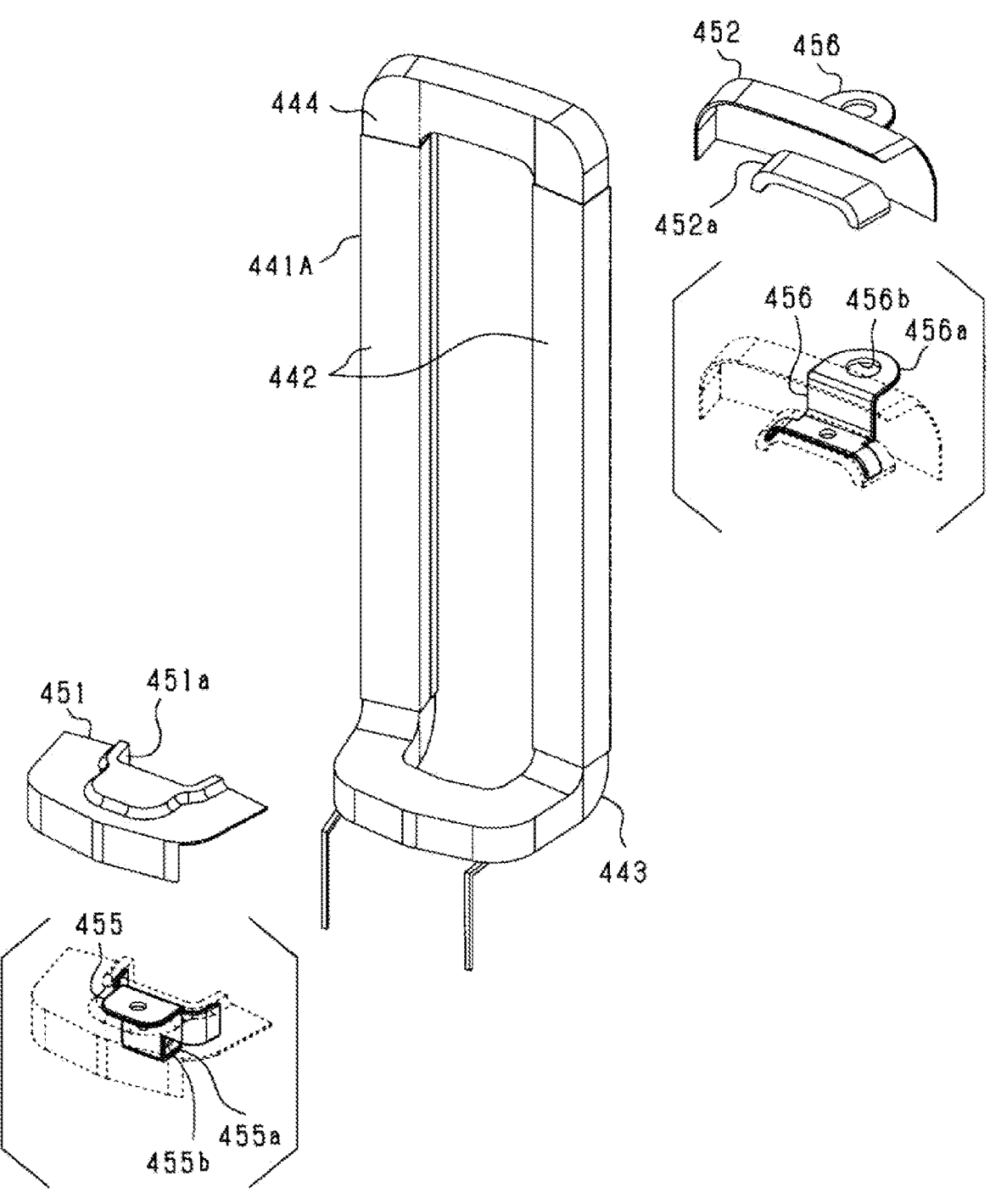
FIG. 52 is an exploded perspective view illustrating the insulating cover in the winding segment.
Figure 53:
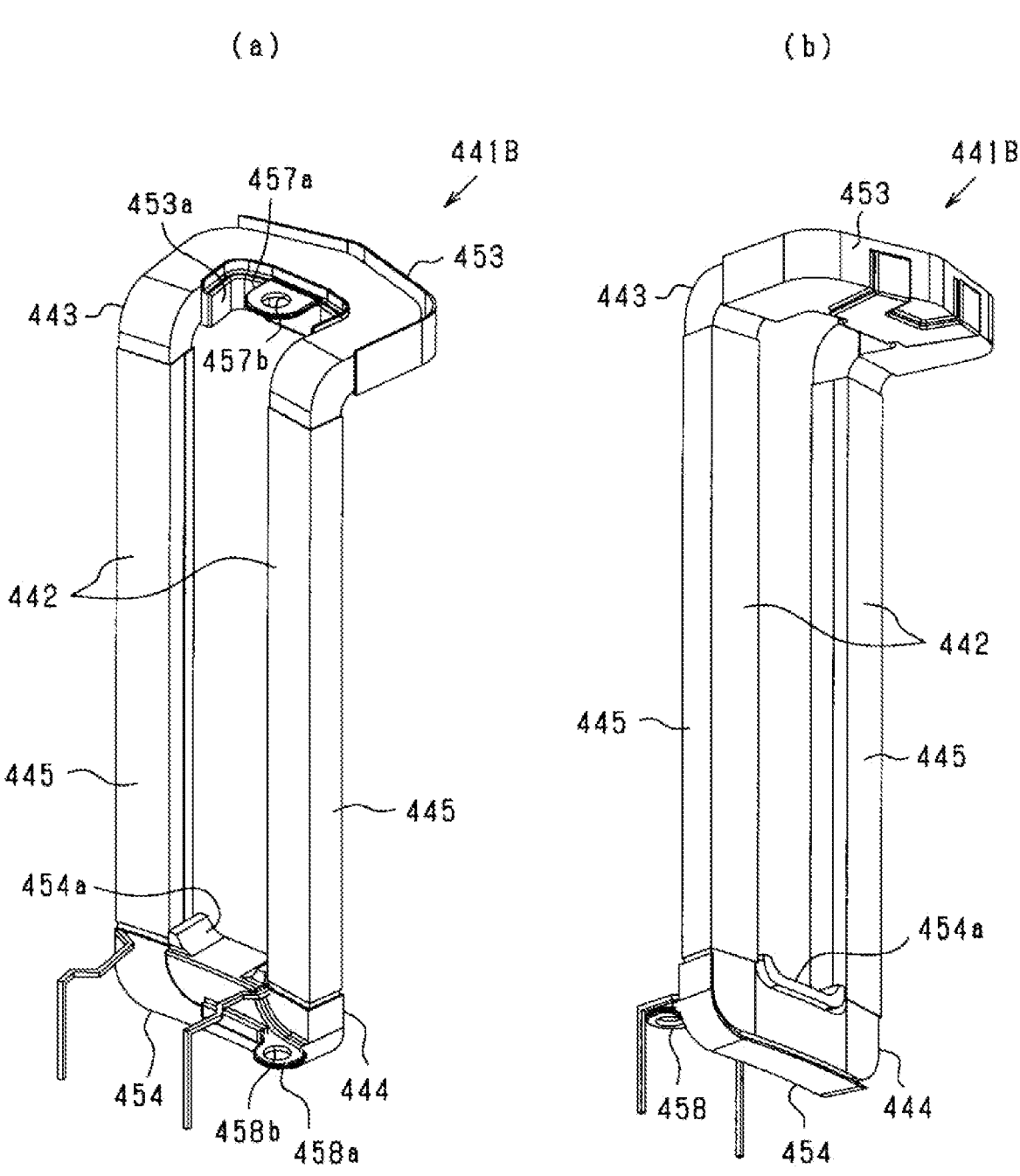
FIG. 53 is a perspective view illustrating a configuration of the winding segment.
Figure 54:
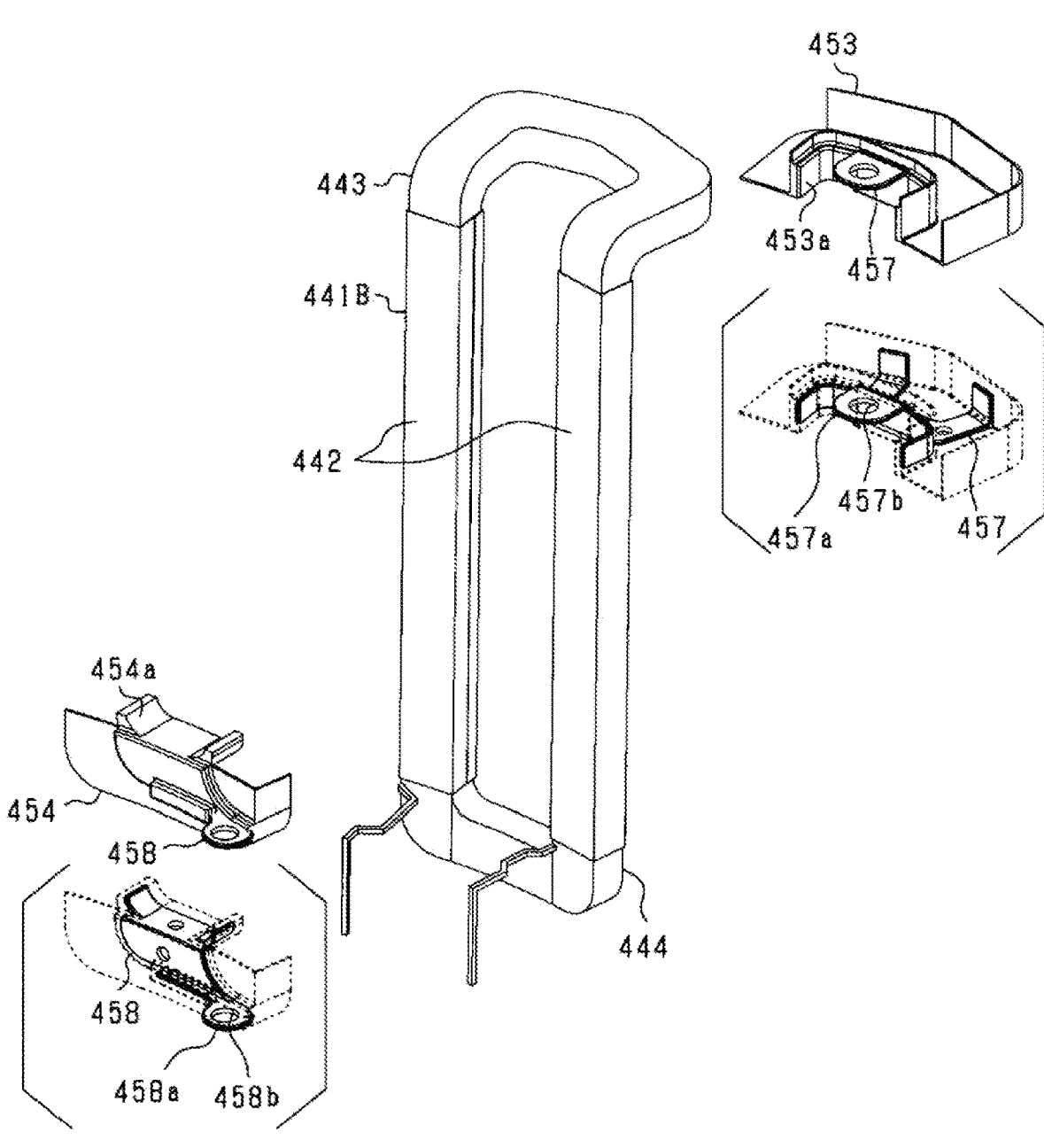
FIG. 54 is an exploded perspective view illustrating the insulating cover in the winding segment.

The configurations of the winding segments 441A and 441B will be described in detail. (a) and (b) of FIG. 51 are perspective views illustrating the configuration of the winding segment 441A. FIG. 52 is an exploded perspective view illustrating insulating covers 451 and 452 respectively attached to link portions 443 and 444 in the winding segment 441A in an exploded manner. (a) and (b) of FIG. 53 are perspective views illustrating the configuration of the winding segment 441B. FIG. 54 is an exploded perspective view illustrating insulating covers 453 and 454 respectively attached to the link portions 443 and 444 in the winding segment 441B in an exploded manner. (a) and (b) of FIG. 51 are perspective views of the winding segment 441A as viewed from the inner side and the outer side in the radial direction, respectively. Similarly, (a) and (b) of FIG. 53 are similarly perspective views of the winding segment 441B as viewed from the inner side and the outer side in the radial direction, respectively.

The winding segments 441A and 441B are each formed by multiply winding the conductive wire member. The winding segments 441A and 441B each include a pair of intermediate conductor portions 442 and a pair of the link portions 443 and 444. The pair of intermediate conductor portions 442 are provided to be in parallel to each other and have a linear shape. The pair of link portions 443 and 444 connect the pair of intermediate conductor portions 442 at both ends in the axial direction. The winding segments 441A and 441B are formed to have an annular shape by the pair of intermediate conductor portions 442 and the pair of link portions 443 and 444. The pair of intermediate conductor portions 442 are separated at a predetermined coil pitch. The intermediate conductor portions 442 of the winding segments 441 of the other phases can be disposed between the pair of intermediate conductor portions 442 in the circumferential direction. In the present embodiment, the pair of intermediate conductor portions 442 are separated at two coil pitches. One intermediate conductor portion 442 for each of the winding segments 441 of the other two phases is disposed between the pair of intermediate conductor portions 442.

In the winding segments 441A and 441B, each intermediate conductor portion 442 is covered with a sheet-like insulating jacket 445. The configuration of the insulating jacket 445 is same as or similar to that of the insulating jacket 157 of the winding segment 151 according to the first embodiment described above. Specifically, the insulating jacket 445 employs a film member having at least a length of a range of the intermediate conductor portion 442 to be covered with and insulated in the axial direction as an axial dimension. The insulating jacket 445 is provided by winding the film member around the intermediate conductor portion 442. The insulating jacket 445 is provided around the intermediate conductor portion 442 with the ends of the film member in the circumferential direction overlapping each other.

Each of the link portions 443 and 444 on both sides in the axial direction is provided as a portion corresponding to the coil end CE (see FIG. 50). One of the link portions 443 and 444 is bent in the radial direction, and the other of the link portions 443 and 444 is not bent in the radial direction. Thus, the winding segments 441A and 441B each have a substantially L shape when viewed from the side.

In the winding segments 441A and 441B, the bending directions of the link portion 443 in the radial direction are different. In the winding segment 441A, the link portion 443 is bent inward in the radial direction. In the winding segment 441B, the link portion 443 is bent outward in the radial direction. In this case, assuming that the winding segments 441A and 441B are disposed side by side in the circumferential direction, the shapes in plan view (planar shapes in the radial direction) of the link portion 443 in the winding segments 441A and 441B are preferably different from each other. Furthermore, the width in the circumferential direction is preferably smaller toward the extending end at the link portion 443 of the winding segment 441A, and the width in the circumferential direction is preferably wider toward the extending end at the link portion 443 of the winding segment 441B.

In each of the winding segments 441A and 441B, the intermediate conductor portion 442 is provided as a coil side conductor portion arranged one by one in the circumferential direction at the coil side CS. Each of the link portions 443 and 444 is provided as a coil end conductor portion connecting the intermediate conductor portions 442 of the same phase at two positions different in the circumferential direction at the coil end CE.

Similarly to the winding segment 151 described above, the winding segments 441A and 441B are each formed by multiply winding a conductive wire member such that the transverse section of a bunch of conductive wire members is quadrangular. The conductive wire member is arranged in a plurality of rows in the circumferential direction and arranged in a plurality of rows in the radial direction, so that the intermediate conductor portion 442 is formed to have a substantially rectangular transverse section (see FIG. 20).

Next, the insulating covers 451 to 454 attached to each of the winding segments 441A and 441B will be described. The insulating covers 451 to 454 are an insulating member provided to ensure insulation between the winding segments 441 at each of the link portions 443 and 444. The insulating covers 451 to 454 are each formed of an insulating material such as synthetic resin.

As illustrated in (a) and (b) of FIG. 51 and FIG. 52, in the winding segment 441A, the insulating cover 451 is attached to the link portion 443 on one end side in the axial direction, and the insulating cover 452 is attached to the link portion 444 on the other end side in the axial direction. A bracket 455 made of, for example, a metal plate is embedded in the insulating cover 451. The bracket 455 has a protrusion 455a protruding outward in the radial direction from the extending end of the link portion 443, and a through-hole 455b passing through the protrusion 455a in the axial direction (vertical direction in the drawing) is provided at the protrusion 455a. A bracket 456 made of, for example, a metal plate is embedded in the insulating cover 452. The bracket 456 has a protrusion 456a protruding outward in the radial direction from the extending end of the link portion 444, and a through-hole 456b passing through the protrusion 456a in the axial direction (vertical direction in the drawing) is provided in the protrusion 456a.

The insulating covers 451 and 452 respectively have engagement portions 451a and 452a that respectively engage with the inner side of the curved portion at the extending end of the link portions 443 and 444. Part of the brackets 455 and 456 is preferably integrated with the engagement portions 451a and 452a as a base material. The brackets 455 and 456 may be fixed to the outer surface of the insulating covers 451 and 452 by adhesion or the like in addition to being embedded in the insulating covers 451 and 452.

As illustrated in (a) and (b) of FIG. 53 and FIG. 54, in the winding segment 441B, the insulating cover 453 is attached to the link portion 443 on one end side in the axial direction, and the insulating cover 454 is attached to the link portion 444 on the other end side in the axial direction. A bracket 457 made of, for example, a metal plate is embedded in the insulating cover 453. The bracket 457 has a protrusion 457a protruding outward in the radial direction from the extend-ing end of the link portion 443, and a through-hole 457b passing through the protrusion 457a in the axial direction (vertical direction in the drawing) is provided at the protru-sion 457a. A bracket 458 made of, for example, a metal plate is embedded in the insulating cover 454. The bracket 458 has a protrusion 458a protruding outward in the radial direction from the extending end of the link portion 444, and a through-hole 458b passing through the protrusion 458a in the axial direction (vertical direction in the drawing) is provided at the protrusion 458a.

The insulating covers 453 and 454 respectively have engagement portions 453a and 454a that respectively engage with the inner side of the curved portion at the extending ends of the link portions 443 and 444. Part of the brackets 457 and 458 is preferably integrated with the engagement portions 453a and 454a as a base material. The brackets 457 and 458 may be fixed to the outer surface of the insulating covers 453 and 454 by adhesion or the like in addition to being embedded in the insulating covers 453 and 454.

Figure 55:
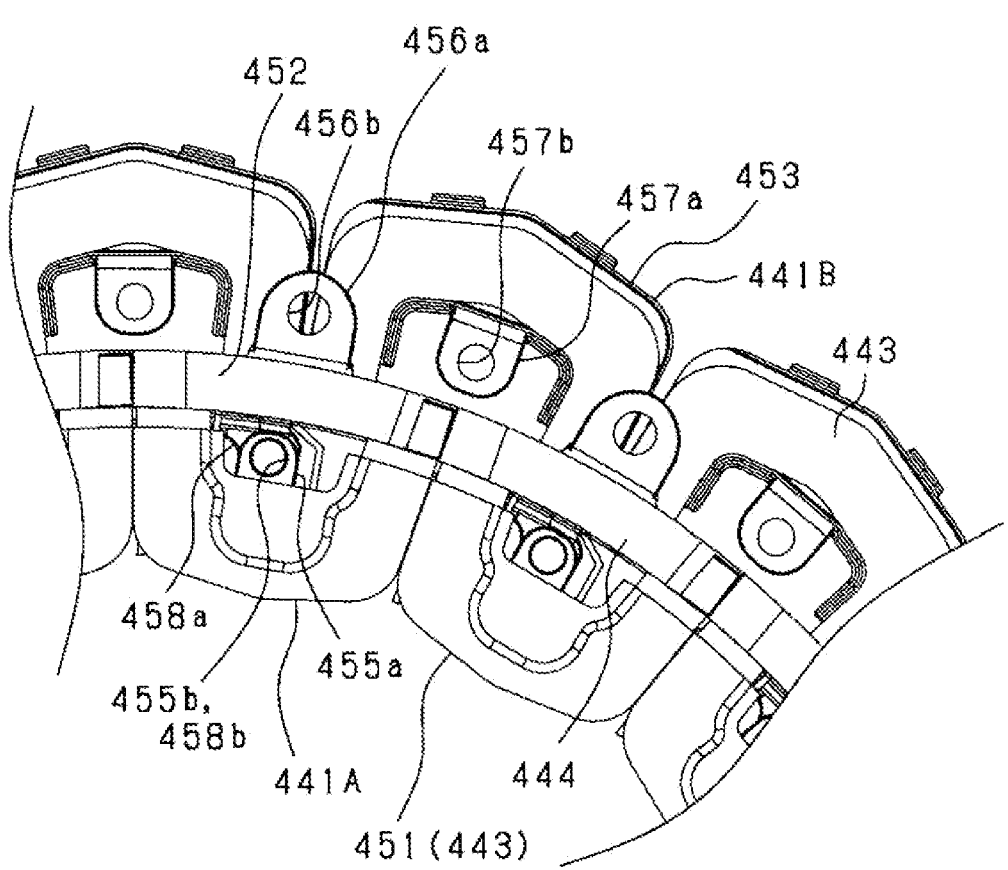
FIG. 55 is a plan view illustrating a state where the winding segments are disposed side by side in the circumferential direction.

FIG. 55 is a plan view illustrating a state where the winding segments 441A and 441B are disposed side by side in the circumferential direction. FIG. 55 is a plan view of the stator winding 431 illustrated in FIG. 48 as viewed from one side in the axial direction (upper side of the drawing).

In FIG. 55, the link portion 443 of the winding segment 441A extends inward in the radial direction, and the link portion 443 of the winding segment 441B extends outward in the radial direction. Further on the inner side of each of the winding segments 441A and 441B in the radial direction than the intermediate conductor portion 442, on one end side in the axial direction of the stator winding 431 (the back side of the paper surface of FIG. 55), the protrusion 455a of the bracket 455 provided on the insulating cover 451 of the winding segment 441A and the protrusion 458a of the bracket 458 provided on the insulating cover 454 of the winding segment 441B overlap each other in the axial direction. Furthermore, the positions of the through-holes 455b and 458b of the protrusions 455a and 458a match each other in plan view.

On the other hand, further on the outer side of each of the winding segments 441A and 441B in the radial direction than the intermediate conductor portion 442, on the other end side in the axial direction of the stator winding 431 (the front side of the paper surface of FIG. 55), the protrusion 456a of the bracket 456 provided on the insulating cover 452 of the winding segment 441A and the protrusion 457a of the bracket 457 provided on the insulating cover 453 of the winding segment 441B are alternately arranged at equal intervals in the circumferential direction. In this case, the through-holes 456b and 457b of the protrusions 456a and 457a have the same distance from the planar center of the stator 430 in the radial direction and are disposed at equal intervals in the circumferential direction.

As illustrated in FIGS. 48 and 49, the stator winding 431 is formed in an annular shape by the winding segments 441A and 441B, and the stator core 432 is assembled to the inner side thereof in the radial direction. The stator core 432 is formed as a core sheet stacked body in which core sheets made of a magnetic steel sheet, which is a magnetic member, are stacked in the axial direction. The stator core 432 has a cylindrical shape having a predetermined thickness in the radial direction. The inner peripheral surface and the outer peripheral surface of the stator core 432 has a curved surface shape without protrusions and recesses. The stator core 432 functions as a back yoke. The stator core 432 is formed by stacking a plurality of core sheets in the axial direction. The core sheet is punched into, for example, an annular plate shape. However, a stator core having a helical core structure may be used as the stator core 432.

The assembly of the stator winding 431 with respect to the stator core 432 may be performed by individually assem-bling the winding segments 441A and 441B with respect to the stator core 432, or may be performed by forming the annular stator winding 431 with the winding segments 441A and 441B and then assembling the stator winding 431 with respect to the stator core 432.

As illustrated in FIG. 49, a plurality of recesses 433 are formed at predetermined intervals in the circumferential direction on the end surface on one end side in the axial direction of the stator core 432. In a state where the stator winding 431 and the stator core 432 are integrated, the respective through-holes 455b and 458b of the brackets 455 and 458 in the insulating covers 451 and 454 and the recess 433 on the end surface of the stator core 432 in the axial direction are aligned further on the inner side of each of the winding segments 441A and 441B in the radial direction than the intermediate conductor portion 442. The winding segments 441A and 441B are fixed to the stator core 432 by assembling a joining member made of, for example, a metal fastening pin to the through-holes 455b and 458b and the recess 433.

Figure 56:
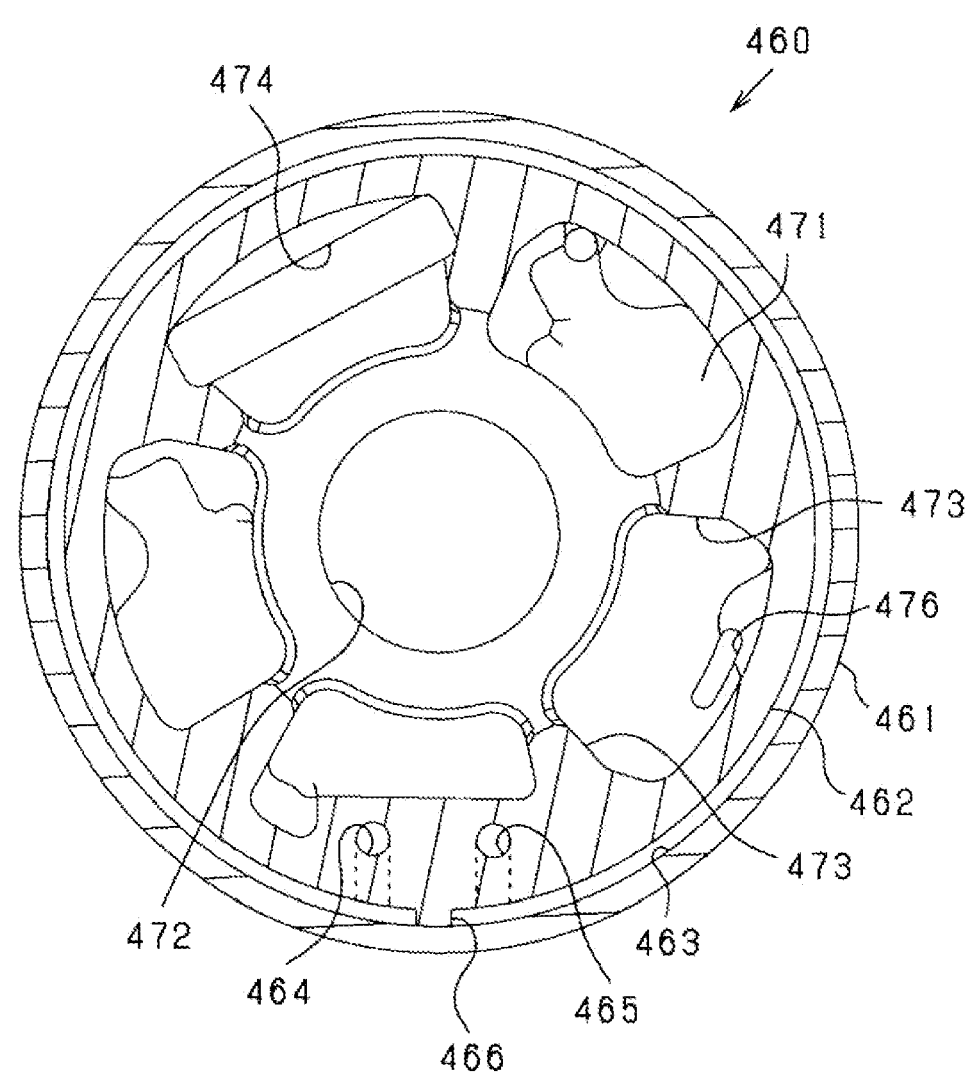
FIG. 56 is a transverse sectional view of the stator holder.

Next, a configuration of the stator holder 460 will be described. Here, the configuration of the stator holder 460 will be described with reference to FIGS. 50 and 56. FIG. 56 is a transverse sectional view of the stator holder 460 (a transverse sectional view at the same position as FIG. 45).

As illustrated in FIGS. 50 and 56, the stator holder 460 includes an outer cylinder member 461 and an inner cylinder member 462, both of which have a cylindrical shape. The outer cylinder member 461 is disposed on the outer side in the radial direction and the inner cylinder member 462 is disposed on the inner side in the radial direction, and they are integrally assembled to form the stator holder 460. Each of these members 461 and 462 includes, for example, metal such as aluminum or cast iron, or carbon fiber reinforced plastic (CFRP).

An inner diameter dimension of the cylindrical part of the outer cylinder member 461 is greater than an outer diameter dimension of the cylindrical part of the inner cylinder member 462. Therefore, in a state where the inner cylinder member 462 is assembled to the inner side of the outer cylinder member 461 in the radial direction, an annular gap is formed between these members 461 and 462. The gap space serves as a coolant path 463 through which a coolant such as cooling water flows. The coolant path 463 is provided to have an annular shape in the circumferential direction of the stator holder 460. The inner cylinder member 462 includes an inlet path 464 serving as an inlet of the coolant and an outlet path 465 serving as an outlet of the coolant. A partition 466 is provided between the inlet path 464 and the outlet path 465 in the coolant path 463. The inlet path 464 and the outlet path 465 communicate with the coolant path 463 on both sides with the partition 466 interposed therebetween, and are provided so as to extend in the axial direction. A coolant flowing in from the inlet path 464 to flow in the coolant path 463 in the circumferential direction, and then flow out from the outlet path 465.

One end of each of the inlet path 464 and the outlet path 465 is open to the end surface of the inner cylinder member 462 in the axial direction. On the end surface in the axial direction, an inlet pipe port 467 is provided in the opening of the inlet path 464, and an outlet pipe port 468 is provided in the opening of the outlet path 465 (see FIG. 42).

Although not illustrated, a circulation path for circulating the coolant is connected to the inlet pipe port 467 and the outlet pipe port 468. The circulation path includes, for example, an electric pump and a heat dissipation device such as a radiator. The coolant circulates through the circulation path and the coolant path 463 of the rotary electric machine 400 due to the driving of the pump.

The stator core 432 is assembled to the outer side of the stator holder 460 in the radial direction, more specifically, to the outer side of the outer cylinder member 461 in the radial direction. The stator core 432 is assembled with respect to the stator holder 460 (outer cylinder member 461) by, for example, adhesion. Alternatively, the stator core 432 may be fitted and fixed to the stator holder 460 with a predetermined interference by shrink-fitting or press-fitting.

The inner cylinder member 462 has a cylindrical shape and has an end plate portion 471 on one end side in the axial direction. A through-hole 472 penetrating in the axial direction is provided at the center of the end plate portion 471, and the stationary shaft 404 of the spindle 401 can be inserted into the through-hole 472.

A plurality of protrusions 473 are provided at predetermined intervals in the circumferential direction on the inner peripheral side of the inner cylinder member 462. Each of these protrusions 473 is provided so as to protrude inward in the radial direction in the hollow portion of the inner cylinder member 462, and is provided in a range from the end plate portion 471 to the intermediate position in the axial direction (see FIG. 50). The protrusion 473 functions as a reinforcing member of the inner cylinder member 462.

The end plate portion 471 of the inner cylinder member 462 includes an opening 474 passing therethrough in the axial direction at a position on the outer side of the through-hole 472 in the radial direction. The opening 474 is an insertion hole portion through which a power line 485 of each phase to be described later is inserted in the axial direction. The opening 474 includes a terminal block 475 (see FIG. 41), and an external wiring (not illustrated) is connected to the terminal block 475.

As illustrated in FIG. 56, the end plate portion 471 of the inner cylinder member 462 includes an insertion hole 476 passing therethrough in the axial direction at a position that is on the outer side of the through-hole 472 in the radial direction and has at least one protrusion 473 interposed between the opening 474 and the insertion hole 476 in the circumferential direction. The insertion hole 476 is a hole portion through which a resolver signal line 522 to be described later is inserted in the axial direction.

Next, the wiring module 480 will be described. The wiring module 480 is a winding connection member electrically connected to the winding segments 441A and 441B in the stator winding 431. Through the wiring module 480, the winding segments 441 of respective phases are connected in parallel or in series for each phase and the phase windings of respective phases are connected to a neutral point. As illustrated in FIG. 43, the wiring module 480 is provided on one end side among both ends of the stator 430 in the axial direction, specifically, on the end plate portion 414 side of the rotor carrier 411.

More specifically, the stator winding 431 includes the winding segment 441A (first winding segment) and the winding segment 441B (second winding segment). In the winding segment 441A, one end side in the axial direction is bent inward in the radial direction. In the winding segment 441B, the other end side in the axial direction is bent outward in the radial direction. The winding segments 441A and 441B are disposed side by side while partially overlapping each other in the circumferential direction with the bent side of the winding segment 441A and the non-bent side of the winding segment 441B disposed on the end plate portion 414 side of the rotor carrier 411. The wiring module 480 is provided on the end plate portion 414 side of the rotor carrier 411 among both ends of the stator winding 431 in the axial direction.

As illustrated in FIG. 47, the wiring module 480 includes an annular ring 481 having an annular shape, and a plurality of connection terminals 482 provided side by side in the circumferential direction along the annular ring 481. The annular ring 481 is formed to have an annular shape by using, for example, an insulating member such as resin. Wiring for each phase and wiring for a neutral point (both not illustrated) are embedded in the annular ring 481, and the connection terminal 482 is electrically connected to each wiring. The connection terminal 482 is provided for each winding segment 441 and is fixed in a direction extending in the axial direction.

In the wiring module 480, a bus bar 483 is connected to the wiring of each phase embedded in the annular ring 481 for each phase. The bus bars 483 are part of power wiring for U-phase power, V-phase power, and W-phase power, respectively, and are provided in a direction protruding inward in the radial direction.

In the stator winding 431, the link portions 444 that are not bent in the radial direction are disposed in an annular arrangement at the lower end in FIG. 47. The wiring module 480 is provided on the inner side of the link portion 444 in the radial direction. That is, the annular ring 481 of the wiring module 480 is formed to have a diameter smaller than that of the annular ring formed by the link portion 444 arranged in the circumferential direction. The annular ring 481 includes an attaching member 484 for attaching the wiring module 480 to the stator holder 460. The attaching member 484 includes, for example, a metal plate, and has a plurality of attaching portions at predetermined intervals in the circumferential direction.

The power line 485 that supplies power to the stator winding 431 for each phase is connected to each bus bar 483 of the wiring module 480. The power lines 485 are disposed side by side in the circumferential direction and are disposed to extend in the axial direction. Preferably, the conductor itself of the power line 485 is a rigid body such as a metal bus bar, or the conductor of the power line 485 is inserted through a tube that is a rigid body such as a synthetic resin. With this configuration, even if vibration occurs in the rotary electric machine 400, the power line 485 can be made less susceptible to the influence of the vibration. The power line 485 can also include a flexible harness. In this case, the disconnection can be prevented by absorbing the vibration in the rotary electric machine 400.

Preferably, the power line 485 further has a shield layer on the outer periphery. The shield layer can prevent a magnetic field from being generated outside the shield layer. In addition, the outer coated layer of the power line 485 is preferably a fluorine film. In this case, assuming that the temperature of the power line 485 rises, and the heat resistance can be improved.

Next, the coil end cover 490 will be described.

As illustrated in FIG. 47, the coil end cover 490 has an annular shape, and is provided at a coil end portion on one end side in the axial direction of the stator 430. In other words, the coil end cover 490 is provided at a coil end portion on a side where the link portion 443 is bent outward in the radial direction among the coil end portions at both ends in the axial direction of the stator 430. The coil end portion of the stator winding 431 is covered in the axial direction with the coil end cover 490. The coil end cover 490 defines the positioning of the winding segments 441A and 441B on one end side in the axial direction.

The coil end cover 490 includes a plurality of through-holes 491 at equal intervals in the circumferential direction. The plurality of through-holes 491 alternately correspond to the through-hole 456b of the bracket 456 in the insulating cover 452 of the winding segment 441A and the through-hole 457b of the bracket 457 in the insulating cover 453 of the winding segment 441B. In this case, while the coil end cover 490 is mounted to one end side of the stator 430 in the axial direction, the respective through-holes 491 on the coil end cover 490 side are aligned with the through-holes 456b and 457b on the insulating covers 452 and 453 side. A joining member including, for example, a metal fastening pin is assembled to each through-hole 491, whereby the coil end cover 490 is fixed to the stator 430. In such a state, one end side of each of the winding segments 441A and 441B in the axial direction is fixed by the coil end cover 490.

The coil end cover 490 includes a plurality of attachment holes 492 for attaching the coil end cover 490 to the stator holder 460. Assuming a state where the coil end cover 490 is attached to the stator winding 431, the plurality of through-holes 491 arranged in the circumferential direction are disposed further on the outer side in the radial direction than the link portion 444 extending in the axial direction without being bent in the radial direction in the stator winding 431 (i.e., the position of the intermediate conductor portion 442). The plurality of attachment holes 492 similarly arranged in the circumferential direction are disposed further on the inner side in the radial direction than the link portion 444 of the stator winding 431.

In the stator unit 420, the stator winding 431 including the plurality of winding segments 441A and 441B and the stator core 432 are integrated. At this time, on one end side in the axial direction (the lower end side in FIG. 47), the winding segments 441A and 441B are fixed to the stator core 432 using the brackets 455 and 458 of the insulating covers 451 and 454. Furthermore, the stator holder 460 is assembled to the stator 430 including the stator windings 431 and the stator core 432 from one side in the axial direction, and the coil end cover 490 is attached to the stator holder 460. At this time, a fixing tool such as a fastening pin or a screw is inserted into the attachment hole 492 of the coil end cover 490, and the coil end cover 490 is fixed to the stator holder 460. A fixing tool such as a fastening pin or a screw is inserted into the through-hole 491 of the coil end cover 490, and the coil end cover 490 is fixed to the stator winding 431 (each of the winding segments 441A and 441B).

On the opposite side of the coil end cover 490 in the axial direction, the wiring module 480 is attached to the stator holder 460 by the attaching member 484. In this state, in the hollow portion of the stator holder 460 (inner cylinder member 462), the power line 485 of each phase is provided to extend from one end side to the other end side of the stator unit 420 in the axial direction. Each of the power lines 485 is connected to the external terminal 501 provided at the end plate portion 471 of the inner cylinder member 462.

Each power line 485 is preferably clamped with respect to the inner cylinder member 462 (stator holder 460). Specifically, as illustrated in FIG. 50, a clamp member 495 made of anti-vibration rubber is provided in the opening 474 of the inner cylinder member 462, and the power line 485 provided passing through the opening 474 is clamped by the clamp member 495. In this case, each power line 485 is clamped by the inner cylinder member 462, so that the earthquake resistance of each power line 485 can be improved. In particular, the vibration resistance can be further improved by using the anti-vibration rubber as the clamp member 495. The clamping position of the power line 485 in the inner cylinder member 462 may be a position other than the opening 474.

Figure 57:
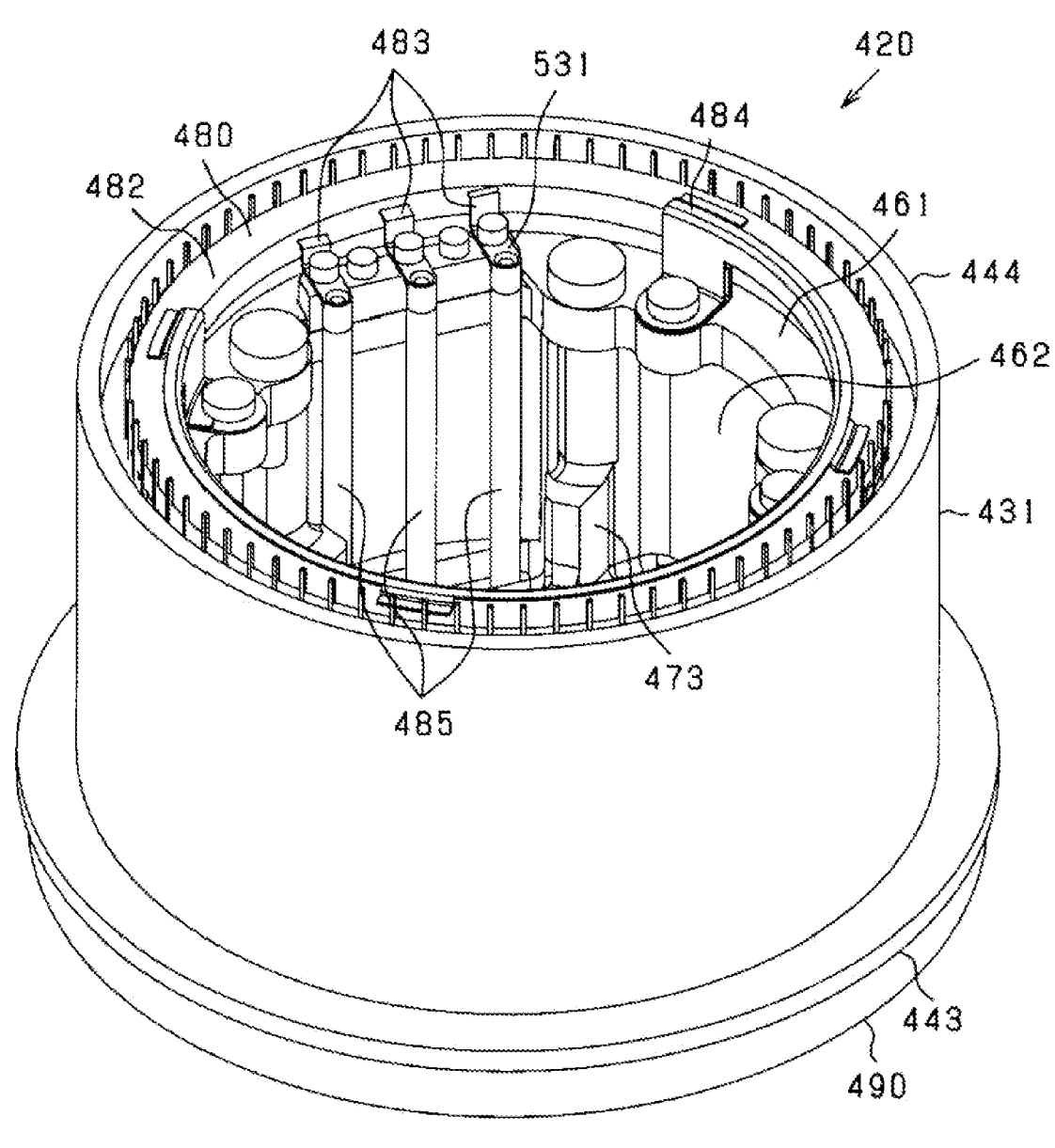
FIG. 57 is a perspective view of the stator unit as viewed from the side of a wiring module.

FIG. 57 is a perspective view of the stator unit 420 as viewed from the wiring module 480 side (i.e., the opposite side of the coil end cover 490). In FIG. 57, for convenience, specific illustration of each winding segment 441 in the stator winding 431 is omitted, and the stator winding 431 is illustrated as an integrated cylindrical body.

As illustrated in FIG. 57, in one coil end portion of the stator 430, the wiring module 480 is disposed on the inner side of the stator winding 431 in the radial direction (specifically, on the inner side in the radial direction of each link portion 444 arranged in the circumferential direction). In this case, the upper side of FIG. 57 is the hub 402 side in the axial direction of the rotary electric machine 400, that is, the wheel side. The wiring module 480 is disposed on the hub 402 side in the axial direction, that is, the wheel side. In this configuration, the wiring module 480 is disposed on the inner side of the stator winding 431 in the radial direction at the coil end portion (on the inner side of each link portion 444 in the radial direction). Accordingly, the wiring module 480 does not protrude outward in the radial direction, and the stator unit 420 can be downsized.

In the stator winding 431 according to the present embodiment, the link portion 443 is bent inward in the radial direction at the coil end portion on the hub 402 side. The link portion 443 is bent outward in the radial direction at the coil end on the opposite side of the hub. The wiring module 480 is disposed on the hub 402 side (the side where the link portion 443 is bent inward in the radial direction). In this case, assuming a configuration in which the wiring module 480 is disposed on the opposite side of the hub, the wiring module 480 and the coil end cover 490 are provided so as to protrude toward the outer side of the link portion 444 in the radial direction. Thus, there is a concern that the protrusion extending outward in the radial direction becomes large. However, according to the configuration according to the present embodiment, such inconvenience is eliminated.

A terminal block 531 is provided on an end surface of the stator holder 460 in the axial direction (more specifically, an end surface of the outer cylinder member 461 in the axial direction). The bus bar 483 of the wiring module 480 and the power line 485 are connected via the terminal block 531. Specifically, the terminal portion of the bus bar 483 and the terminal portion of the power line 485 overlap each other, and the bus bar 483 and the power line 485 are fixed to the terminal block 531 by using a fixing tool such as a screw in the overlapping state. In this case, each power line 485 can be securely fixed. In other words, when the bus bar 483 and the power line 485 are simply connected to each other, there is a concern about disconnection at the connection portion due to vibration generated in the rotary electric machine 400. However, since the bus bar 483 and the power line 485 are connected to each other at the terminal block 531 of the stator holder 460 (inner cylinder member 462), disconnection of the connection portion due to vibration can be suppressed.

The portion where the bus bar 483 and the power line 485 are connected preferably includes a rotation prevention mechanism for preventing relative rotation of the bus bar 483 and the power line 485. In this way, occurrence of unintended positional shift of the power line 485 with respect to the bus bar 483 can be prevented, and thus assemblability and insulation property of the power line 485 can be improved.

The bus bar 483 has a bent structure, and an intermediate portion thereof is bent in a cranked shape. In this way, vibration in the terminal block 531 and the annular ring 481 can be suitably absorbed.

Figure 58:
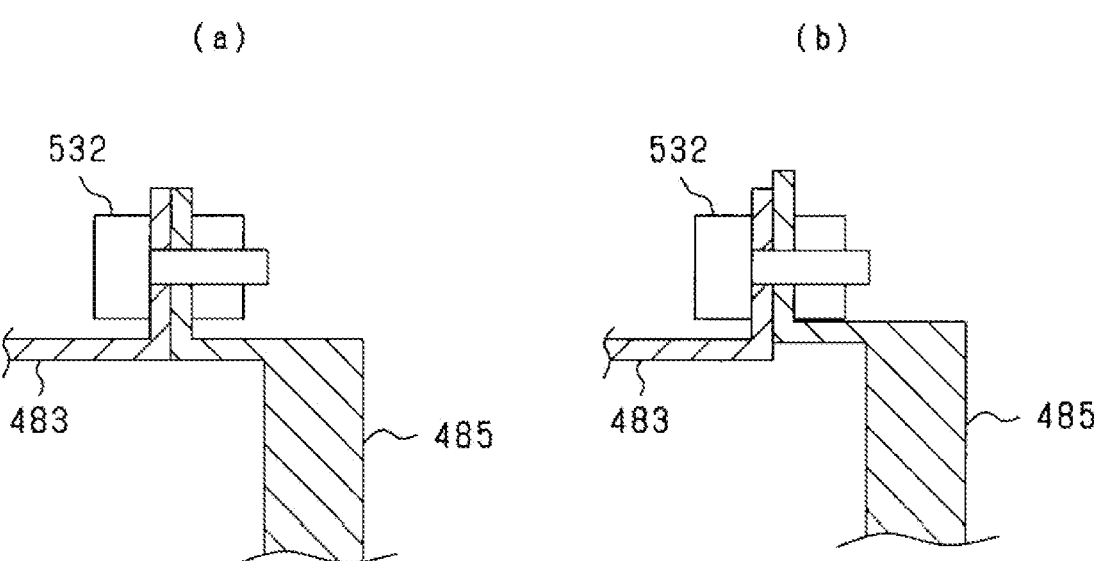
FIG. 58 is a view illustrating a structure for connecting a terminal portion of a bus bar and a terminal portion of a power line.

The configuration in (a) of FIG. 58 may be used as a configuration for connecting a terminal portion of the bus bar 483 and a terminal portion of the power line 485. In (a) of FIG. 58, the terminal portion of the bus bar 483 and the terminal portion of the power line 485 are bent in an L shape, the terminals extending in the axial direction (vertical direction in the drawing) are overlapped with each other, and the terminals are fastened to each other by a fastener such as a bolt and a nut using holes provided in the terminals. In this case, as illustrated in (b) of FIG. 58, even if the position of the hole of the terminal portion varies in any one of the bus bar 483 and the power line 485, the positional shift of the power line 485 occurs only in the axial direction. Thus, the positional shift of the power line 485 in the radial direction and the circumferential direction can be prevented.

When the stator 430 and the stator holder 460 are assembled, the stator holder 460 and the stator core 432 may be assembled in advance, and the stator winding 431 may be assembled to the integrated object of the stator holder 460 and the stator core 432 (i.e., assembly of the winding segments 441A, 441B).

Figure 59:
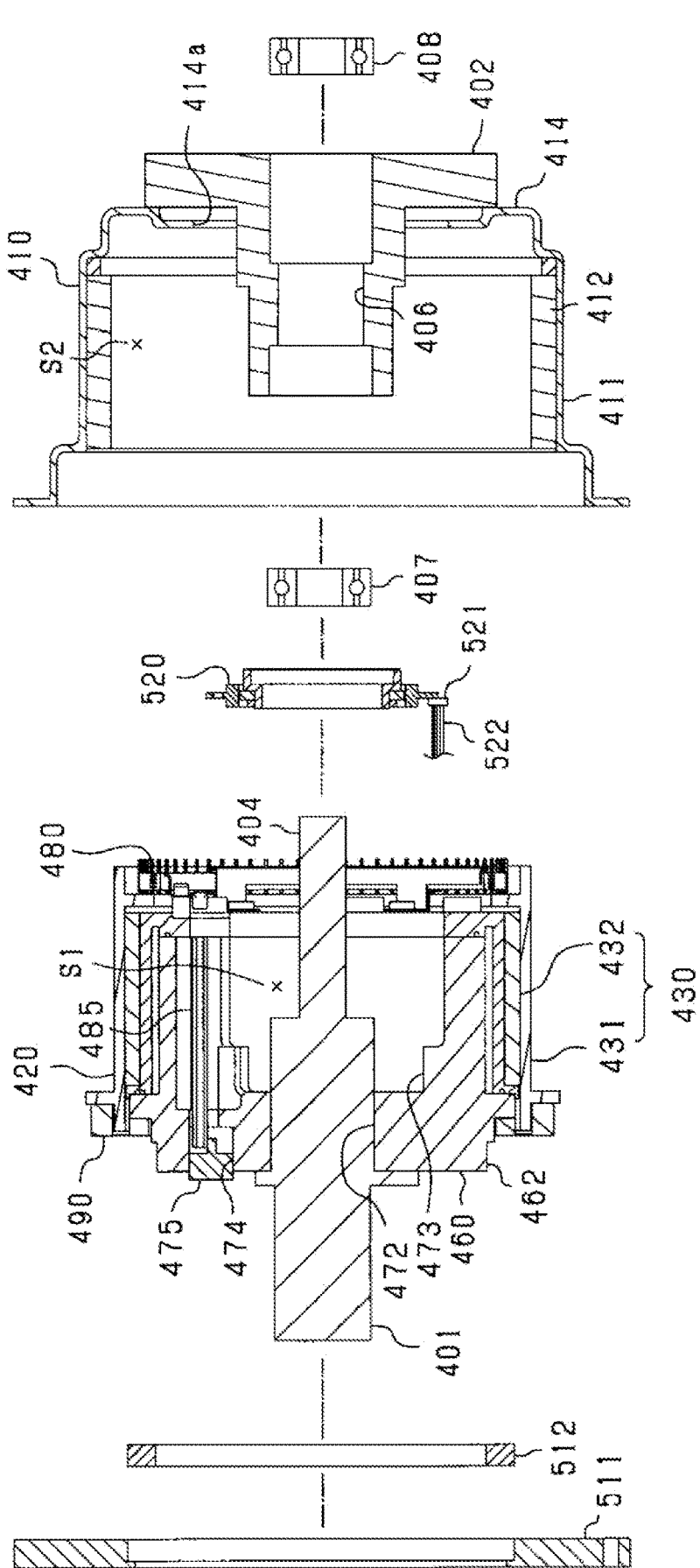
FIG. 59 is an exploded sectional view illustrating the rotary electric machine divided into the stationary portion and a rotary portion.

Next, the overall configuration of the rotary electric machine 400 including the rotor 410 and the stator unit 420 described above will be described with reference to FIGS. 43 and 59. FIG. 59 is an exploded sectional view of the rotary electric machine 400 in a state where the spindle 401 and the stator unit 420 are integrated as a stationary object and the hub 402 and the rotor 410 are integrated as a rotary object.

The spindle 401 is assembled to the stator unit 420 while being inserted through the through-hole 472 of the stator holder 460. Specifically, the stationary shaft 404 of the spindle 401 is inserted through the through-hole 472 of the stator holder 460. In this state, the spindle 401 is fixed to the end plate portion 471 of the inner cylinder member 462 by using a fixing tool such as a bolt. On the other hand, the hub 402 is fixed to the rotor 410. Specifically, the hub 402 is inserted through a through-hole 414a of the rotor carrier 411, and in this state, the hub 402 is fixed to the end plate portion 414 by using a fixing tool such as a bolt.

While the stationary shaft 404 of the spindle 401 is inserted through the insertion hole 406 of the hub 402, the stator unit 420 and the rotor 410 are respectively disposed at positions on the inner side and the outer side in the radial direction with respect to each other. Here, as illustrated in FIG. 59, an annular space S1 is formed around the stationary shaft 404 of the spindle 401 in an integrated object of the spindle 401 and the stator unit 420. An annular space S2 is formed around the hub 402 in an integrated object of the hub 402 and the rotor 410. The hub 402 enters the annular space S1 and the stator unit 420 enters the annular space S2, whereby the integrated object of the spindle 401 and the stator unit 420, and the integrated object of the hub 402 and the rotor 410 are assembled to each other.

The bearings 407 and 408 are assembled between the stationary shaft 404 of the spindle 401 and the hub 402, and the hub 402 is rotatably supported by the bearings 407 and 408. That is, the hub 402 and the rotor 410 are rotatably supported with respect to the spindle 401 and the stator unit 420 by using the bearings 407 and 408. In the bearings 407 and 408, the inner race is assembled to the stationary shaft 404 side, and the outer race is assembled to the hub 402 side.

While the integrated object of the spindle 401 and the stator unit 420, and the integrated object of the hub 402 and the rotor 410 are assembled to each other, a rotor cover 511 is fixed to the open end side of the rotor 410, that is, the opposite side of the hub 402 in the axial direction (the opposite side of the end plate portion 414 of the rotor carrier 411). The rotor cover 511 has an annular plate shape. The rotor cover 511 is fixed to the rotor carrier 411 by using a fixing tool such as a bolt, with a bearing 512 interposed between the rotor cover 511 and the inner cylinder member 462.

While the integrated object of the spindle 401 and the stator unit 420, and the integrated object of the hub 402 and the rotor 410 are assembled to each other, an annular closed space SA closed in the axial direction and the radial direction is formed on the inner peripheral side of the stator unit 420. A resolver 520 as a rotation sensor is provided in the closed space SA. The resolver 520 has an annular shape, and includes a resolver stator fixed to the inner cylinder member 462 of the stator unit 420 on the stationary object side, and a resolver rotor fixed to the hub 402 on the rotary object side. The resolver rotor is disposed on the inner side of the resolver stator in the radial direction so as to face the resolver stator.

In the present embodiment, as described above, the plurality of protrusions 473 is provided at predetermined intervals in the circumferential direction on the inner peripheral side of the inner cylinder member 462 in the stator holder 460 (see FIG. 56). The resolver 520 (resolver stator) is attached to the end surface in the axial direction of the protrusion 473 of the inner cylinder member 462.

As illustrated in FIG. 44, the resolver 520 includes a terminal 521 in part of the resolver 520 in the circumferential direction, and the resolver signal line 522 is connected to the terminal 521. As illustrated in FIGS. 42 and 43, the resolver signal line 522 is guided to the outside of the rotary electric machine (the end of the rotary electric machine 400 in the axial direction) through the insertion hole 476 provided in the end plate portion 471 of the inner cylinder member 462. The insertion hole 476 is preferably sealed with a sealing member such as a grommet. A signal line terminal connected to the resolver signal line 522 may be provided on the end surface of inner cylinder member 462 in the axial direction.

In the rotary electric machine 400 according to the present embodiment, the power line 485 of each phase and the resolver signal line 522 are provided in the closed space SA on the inner side of the stator unit 420 in the radial direction so as to extend in the axial direction. A blocking portion that shields an electromagnetic field generated by the power line 485 is provided between the power line 485 and the resolver signal line 522. The configuration will be specifically described below.

In the present embodiment, the protrusion 473 is provided on the inner peripheral side of the inner cylinder member 462 as a fixing portion for fixing the resolver 520, and the protrusion 473 is a "blocking portion". Specifically, as illustrated in FIG. 43, the protrusion 473 is provided to extend in the axial direction in a range from one end of the inner cylinder member 462 in the axial direction to the intermediate position in the axial direction. The resolver 520 is fixed to the end surface of the protrusion 473 in the axial direction, and the resolver signal line 522 is provided on the opposite side of the hub in the axial direction along the protrusion 473. In other words, on the inner peripheral side of the inner cylinder member 462 (the hollow portion of the stator holder 460), the protrusion 473 is provided not over the entire range in the axial direction of the inner cylinder member 462 but over a range (partial range) up to the intermediate position where the resolver 520 is provided. The resolver signal line 522 is provided while extending in the axial direction along the protrusion 473 and being inserted through the insertion hole 476 (see FIG. 56).

The power line 485 is provided on the inner peripheral side of the inner cylinder member 462 so as to extend from one end side to the other end side in the axial direction. As illustrated in FIG. 45, two protrusions 473 are provided between the power line 485 and the resolver signal line 522.

The spindle 401 as a shaft body is disposed on the inner peripheral side of the inner cylinder member 462, and the protrusion 473 is formed to protrude toward the stationary shaft 404 of the spindle 401. Therefore, on the inner peripheral side of the inner cylinder member 462, the protrusions 473 are provided on both sides of the resolver signal line 522 in the circumferential direction, and the stationary shaft 404 of the spindle 401 is provided on the inner side of the resolver signal line 522 in the radial direction. In this case, the protrusion 473 and the spindle 401 (more specifically, the stationary shaft 404) form a "blocking portion".

On the inner peripheral side of the inner cylinder member 462, the protrusion 473 is provided only in a range from one end in the axial direction to the intermediate position in the axial direction of the inner cylinder member 462. In a range in which the protrusion 473 is not provided in the axial direction, that is, in a range from the intermediate position in the axial direction to the other end in the axial direction, the extending end of the hub 402, which is a rotary object, is received. In this case, on the inner peripheral side of the inner cylinder member 462, the extending end of the hub 402 is received in a region where the protrusion 473 is not provided, and the hub 402 is rotatably supported by the bearings 407 and 408.

According to the present embodiment described in detail above, the following excellent effects can be obtained.

In a rotary electric machine 400, when the power line 485 connected to the stator winding 431 and the resolver signal line 522 are provided so that both lines extend in the axial direction, there is a concern that noise may be superimposed on a signal of the resolver 520 due to an electromagnetic field generated by the power line 485 and detection accuracy of the resolver 520 may be affected. In this respect, in the above configuration, since the blocking portion that blocks the electromagnetic field generated by the power line 485 is interposed between the power line 485 and the resolver signal line 522, the influence of the electromagnetic field on the resolver 520 is suppressed. As a result, the rotation detection by the resolver 520 can be appropriately performed.

The protrusion 473 protruding inward in the radial direction is provided in the hollow portion of the stator holder 460 and the protrusion 473 is allowed to serve as a fixing portion of the resolver 520. With this arrangement, the resolver 520 can be suitably disposed at a desired position in the axial direction in the hollow portion of the stator holder 460. In addition, since the protrusion 473 of the stator holder 460 is used as the blocking portion, the blocking portion need not be provided for the purpose of blocking the electromagnetic field, and the configuration can be simplified.

In the hollow portion of the stator holder 460, the resolver signal line 522 is provided in the axial direction along the protrusion 473 in the range from the one end in the axial direction to the intermediate position in the axial direction of stator holder 460. In this case, in the hollow portion of the stator holder 460, the protrusion 473 is provided not over the entire range in the axial direction but over a partial range up to the intermediate position where the resolver 520 is provided. Therefore, a space for receiving the components or objects other than the resolver 520 in the axial direction while enabling installation of the resolver 520 and noise suppression of the resolver signal line 522 by the protrusion 473. Therefore, a configuration in which, for example, the extending end of the hub 402 or the like is received in the hollow portion of the stator holder 460 can be suitably implemented.

In the hollow portion of the stator holder 460, part of the hub 402 is received in a region where the protrusion 473 is not provided (region on the wheel side in the axial direction). Accordingly, the hub 402 can be supported by the bearing in the hollow portion of the stator holder 460. As a result, the axial length can be shortened, and the rotary electric machine 400 can be downsized.

In the stator winding 431, the plurality of winding segments 441 are arranged such that one bent sides in the axial direction are alternately disposed in the axial direction, whereby each winding segment 441 can be suitably disposed while preventing interference between the winding segments 441. In this case, in the configuration in which the wiring module 480 is provided on the end plate portion 414 side of the rotor carrier 411 among both ends of the stator winding 431 in the axial direction and the power line 485 is connected to the wiring module 480, the power line 485 is provided in the hollow portion of the stator holder 460 so as to extend from one end side to the other end side of the stator 430 in the axial direction.

In the configuration in which the power line 485 is provided in the hollow portion of the stator holder 460 so as to extend from one end side to the other end side in the axial direction of the stator 430, there is a greater concern that an electromagnetic field due to the power line 485 may affect the resolver signal line 522 in the hollow portion thereof. In this respect, since the protrusion 473 is provided between the power line 485 and the resolver signal line 522, the influence of the electromagnetic field on the resolver signal line 522 can be suitably suppressed.

In the hollow portion of the stator holder 460, the cylindrical part of the stator holder 460 and the stationary shaft 404 of the spindle 401 face each other on the inner side and the outer side in the radial direction across a space, and a protrusion 473 is interposed between the cylindrical portion and the stationary shaft 404. In this case, in the hollow portion of the stator holder 460, the protrusion 473 and the stationary shaft 404 of the spindle 401 each serve as a blocking portion, and the electromagnetic field of the power line 485 with respect to the resolver signal line 522 is blocked by the protrusion 473 and the stationary shaft 404. As a result, a more appropriate configuration in blocking the electromagnetic field of the power line 485 can be implemented.

Modification of Second Embodiment

Figure 60:
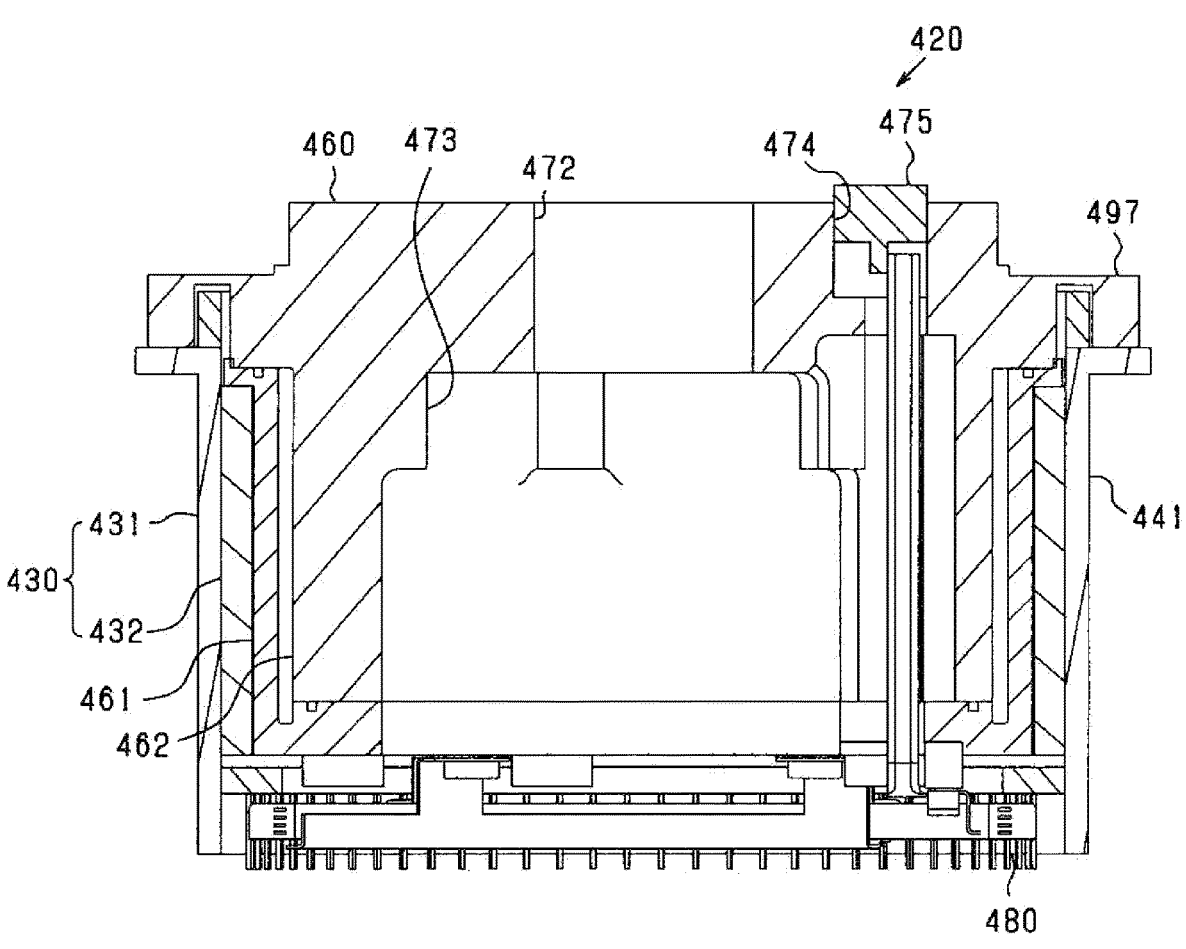
FIG. 60 is a longitudinal sectional view illustrating a configuration of the stator unit.

In the above configuration, as illustrated in FIG. 47, the stator holder 460 and the coil end cover 490 are provided separately in the stator unit 420, and the coil end cover 490 is fixed to the stator holder 460 by a fixing tool such as a fastening pin or a screw. However, this configuration may be changed. Specifically, as illustrated in FIG. 60, a coil end cover 497 is provided integrally with the end plate portion 471 of the stator holder 460. In this case, the coil end cover 497 is formed in a flange shape in the stator holder 460 so as to extend outward in the radial direction, and the coil end portion (link portion 443) of each winding segment 441 is fixed by the coil end cover 497.

Third Embodiment

Figure 61:
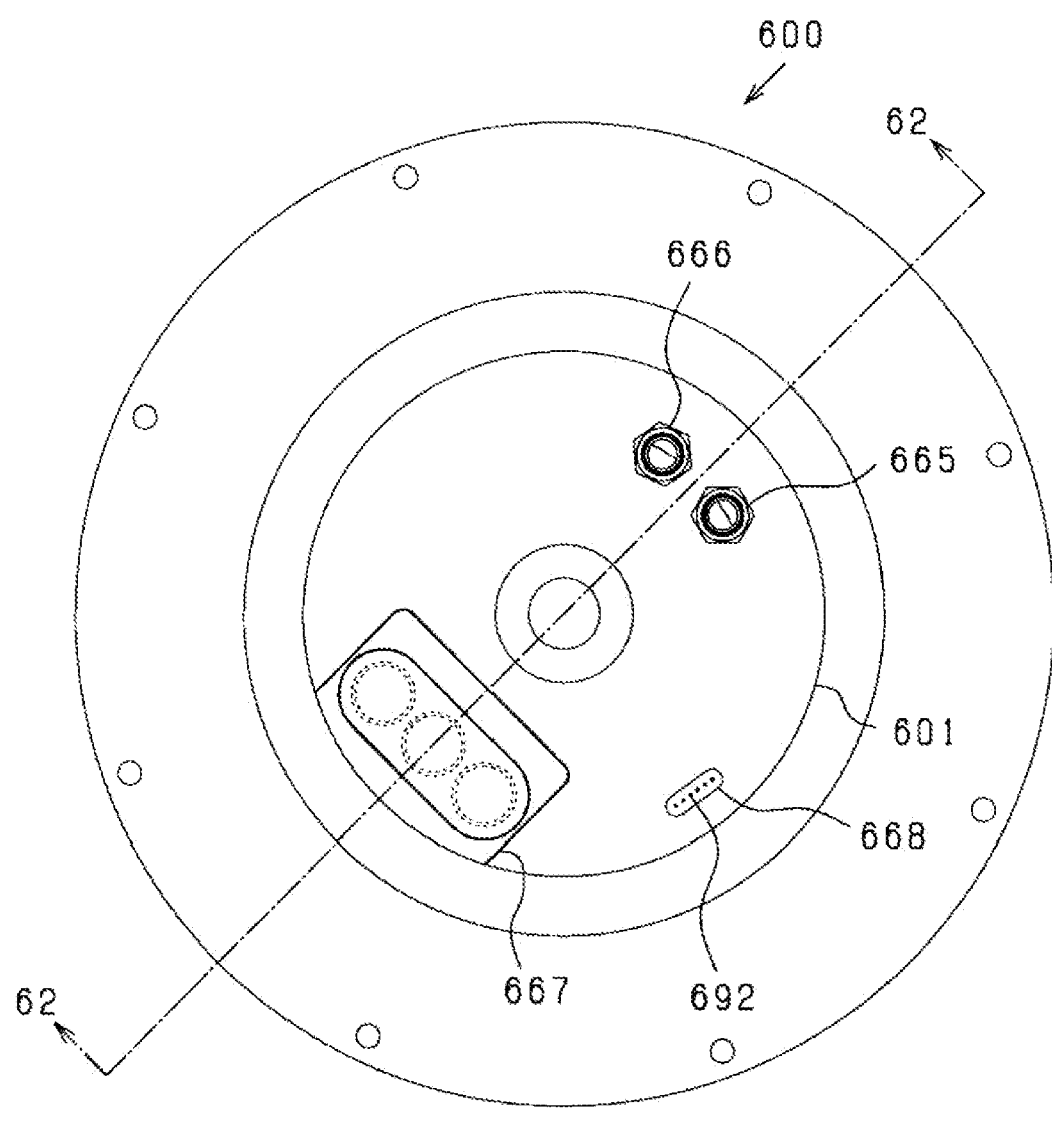
FIG. 61 is a plan view illustrating a rotary electric machine according to a third embodiment.
Figure 62:
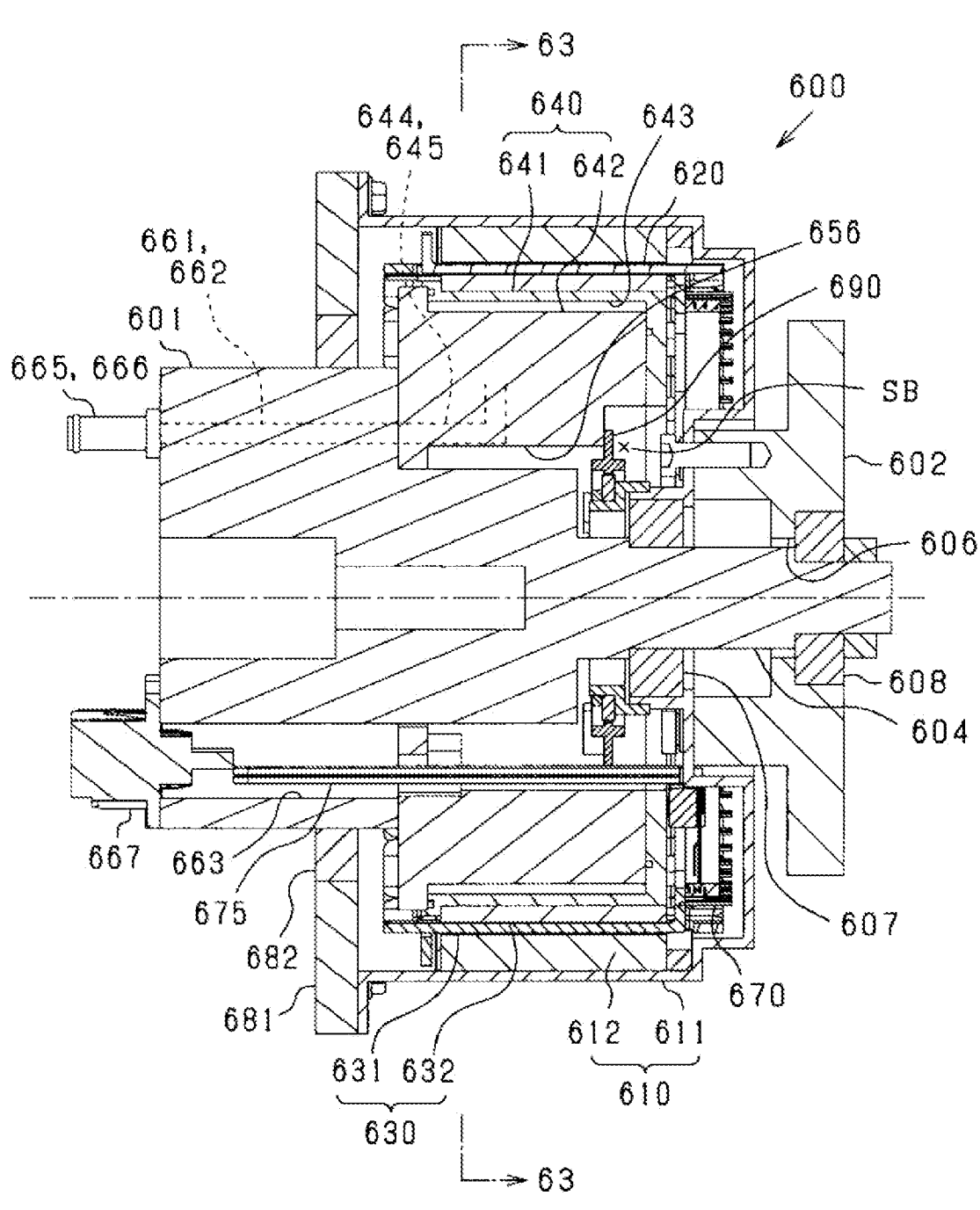
FIG. 62 is a longitudinal sectional view of the rotary electric machine.
Figure 63:
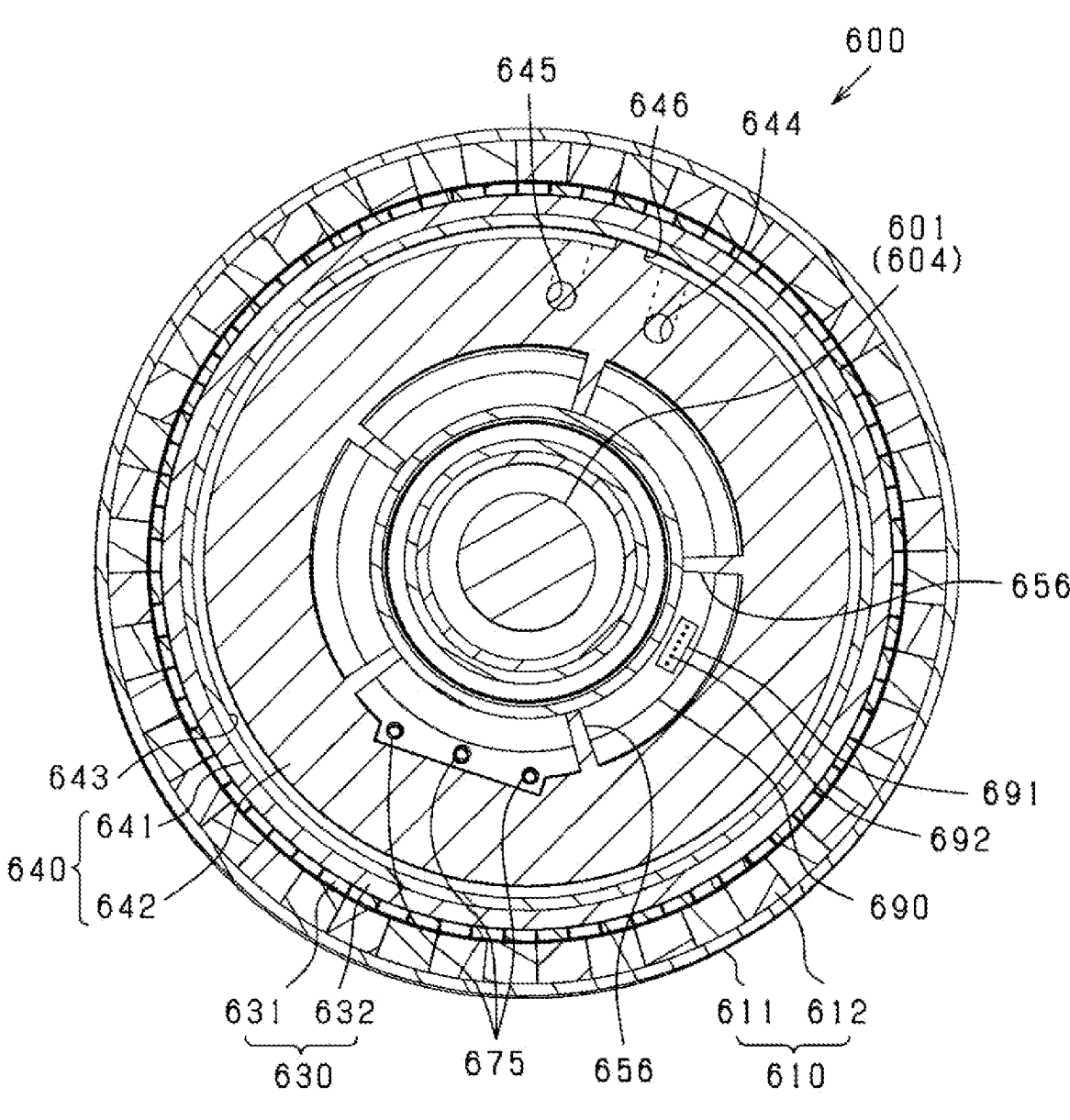
FIG. 63 is a transverse sectional view of the rotary electric machine.
Figure 64:
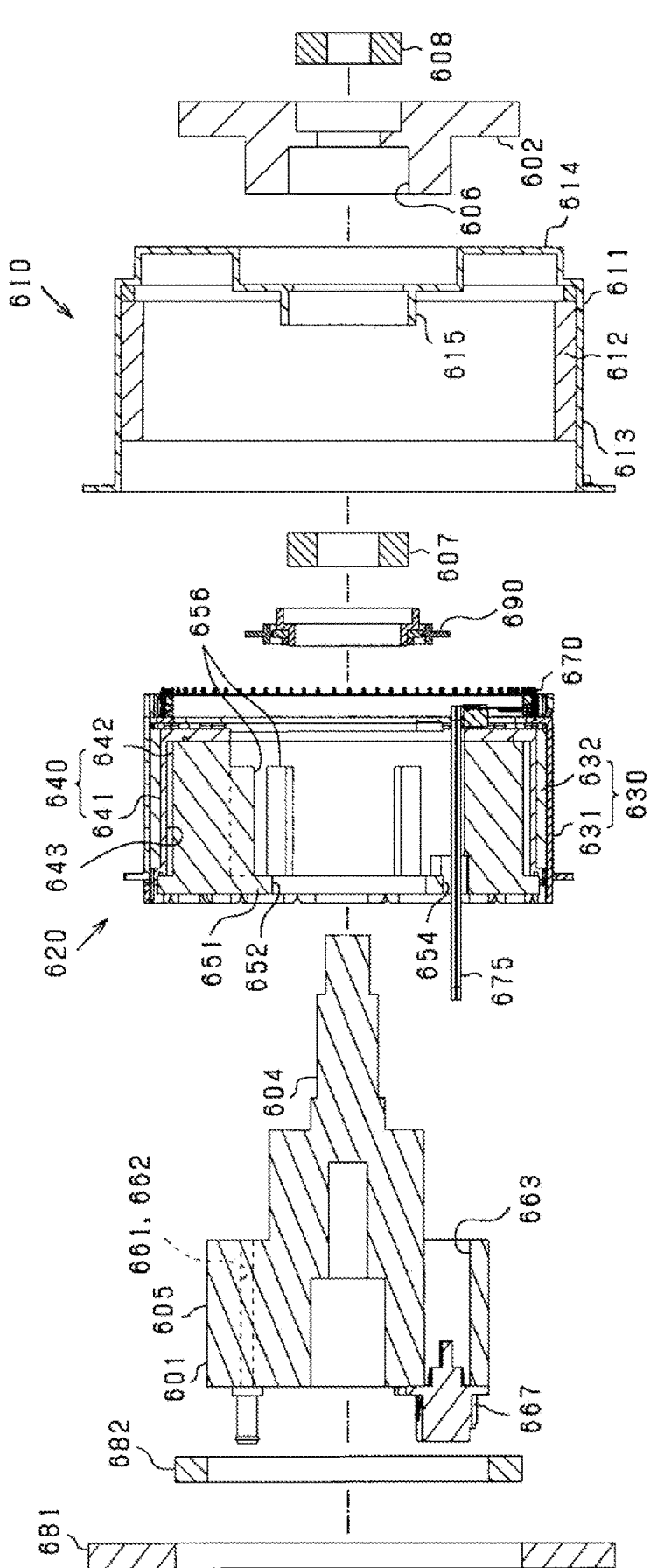
FIG. 64 is an exploded sectional view of the rotary electric machine.
Figure 65:
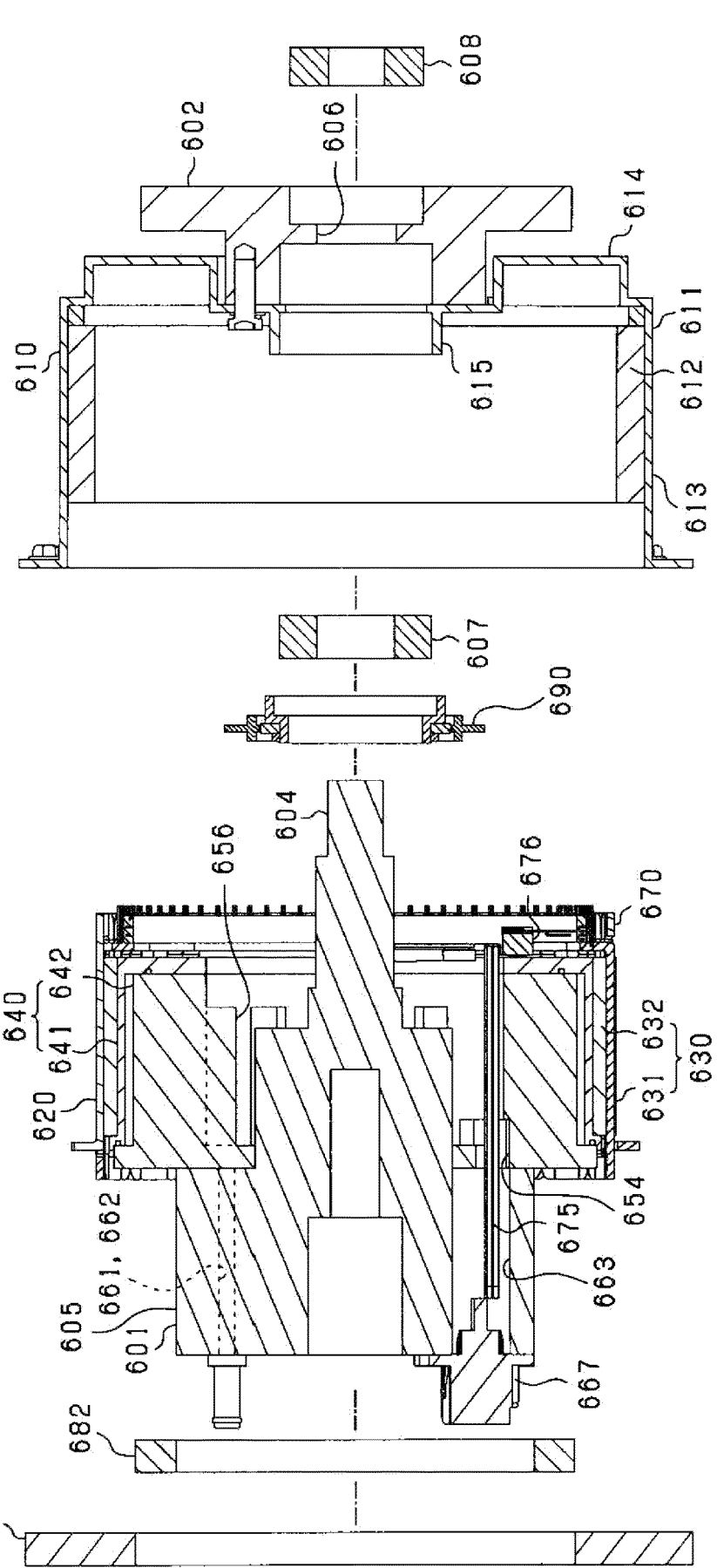
FIG. 65 is an exploded sectional view illustrating the rotary electric machine divided into the stationary portion and a rotary portion.

Next, a rotary electric machine 600 according to a third embodiment will be described. FIG. 61 is a plan view of the rotary electric machine 600 according to the present embodiment. FIG. 62 is a longitudinal sectional view of the rotary electric machine 600 (a sectional view taken along line 62-62 in FIG. 61). FIG. 63 is a transverse sectional view of the rotary electric machine 600 (a sectional view taken along line 63-63 in FIG. 62). FIG. 64 is an exploded sectional view of the rotary electric machine 600. FIG. 65 is an exploded sectional view illustrating the rotary electric machine 600 divided into the stationary portion and a rotary portion.

The rotary electric machine 600 is an outer-rotor type surface permanent magnetic rotary electric machine. In the broad classification, the rotary electric machine 600 includes a rotary electric machine body including a rotor 610 and a stator unit 620 including a stator 630. The rotary electric machine 600 has a configuration in which a spindle 601 fixed to a vehicle body (not illustrated) and a hub 602 fixed to a wheel (not illustrated) are integrated with the rotary electric machine body. The spindle 601 and the hub 602 are required to have high strength, and are made of, for example, a steel material.

The spindle 601 includes a stationary shaft 604 and a diameter-expanded portion 605. The stationary shaft 604 has a columnar shape and is inserted through a hollow portion of the stator unit 620. The diameter-expanded portion 605 has a diameter expanded from that of the stationary shaft 604. The stationary shaft 604 preferably includes a large diameter portion and a small diameter portion as illustrated in the drawing. The hub 602 includes an insertion hole 606 through which the stationary shaft 604 is inserted. The hub 602 is rotatably supported by bearings 607 and 608 while the stationary shaft 604 is inserted through the insertion hole 606 of the hub 602. The hub 602 is rotatably supported by the bearings 607 and 608 at two positions in the axial direction. In the present embodiment, one of the pair of bearings 607 and 608 supports a rotor carrier 611 integrally and rotatably fixed to the hub 602.

In the rotary electric machine 600, a direction in which the axis serving as the rotation center extends (left-right direction in FIG. 62) is defined as the axial direction. The rotary electric machine 600 is attached to the vehicle such that the axial direction is directed along the horizontal direction or the substantially horizontal direction. When the wheels have a camber angle, the axial direction of the rotary electric machine 600 is preferably directed along the substantially horizontal direction after applying inclination corresponding to the camber angle.

In the rotary electric machine 600, the rotor 610 and the stator 630 are disposed to face each other in the radial direction with an air gap interposed therebetween. The stator unit 620 is fixed to the spindle 601, and the rotor 610 is fixed to the hub 602 (see FIG. 65). Therefore, the hub 602 and the rotor 610 are rotatable with respect to the spindle 601 and the stator unit 620.

As illustrated in FIG. 64, the rotor 610 includes a substantially cylindrical rotor carrier 611 and an annular magnet unit 612 fixed to the rotor carrier 611. The rotor carrier 611 includes a cylindrical portion 613, an end plate portion 614, and a boss 615. The cylindrical portion 613 has a cylindrical shape. The end plate portion 614 is provided on one end in the axial direction of the cylindrical portion 613. The boss 615 has a cylindrical shape and is provided at a center of the end plate portion 614. The magnet unit 612 is fixed to the inner side of the cylindrical portion 613 in the radial direction to have an annular shape. The bearing 607 is assembled to the boss 615. The configurations of the rotor carrier 611 and the magnet unit 612 are substantially the same as those of the rotor carrier 411 and the magnet unit 412 described in the second embodiment, respectively. Thus, detailed description thereof is omitted here.

The stator unit 620 includes an annular tubular stator 630, a stator holder 640 that holds the stator 630, a wiring module 670 attached to one end side in the axial direction. The stator 630 includes a stator winding 631 and a stator core 632. The configuration of the stator 630 is also substantially the same as that of the stator 430 described in the second embodiment. The stator winding 631 has three-phase windings, and the phase winding of each phase includes the plurality of winding segments. Since the configurations of the winding segment and the insulating cover can also use the above-described configurations, the description thereof is omitted.

Figure 66:
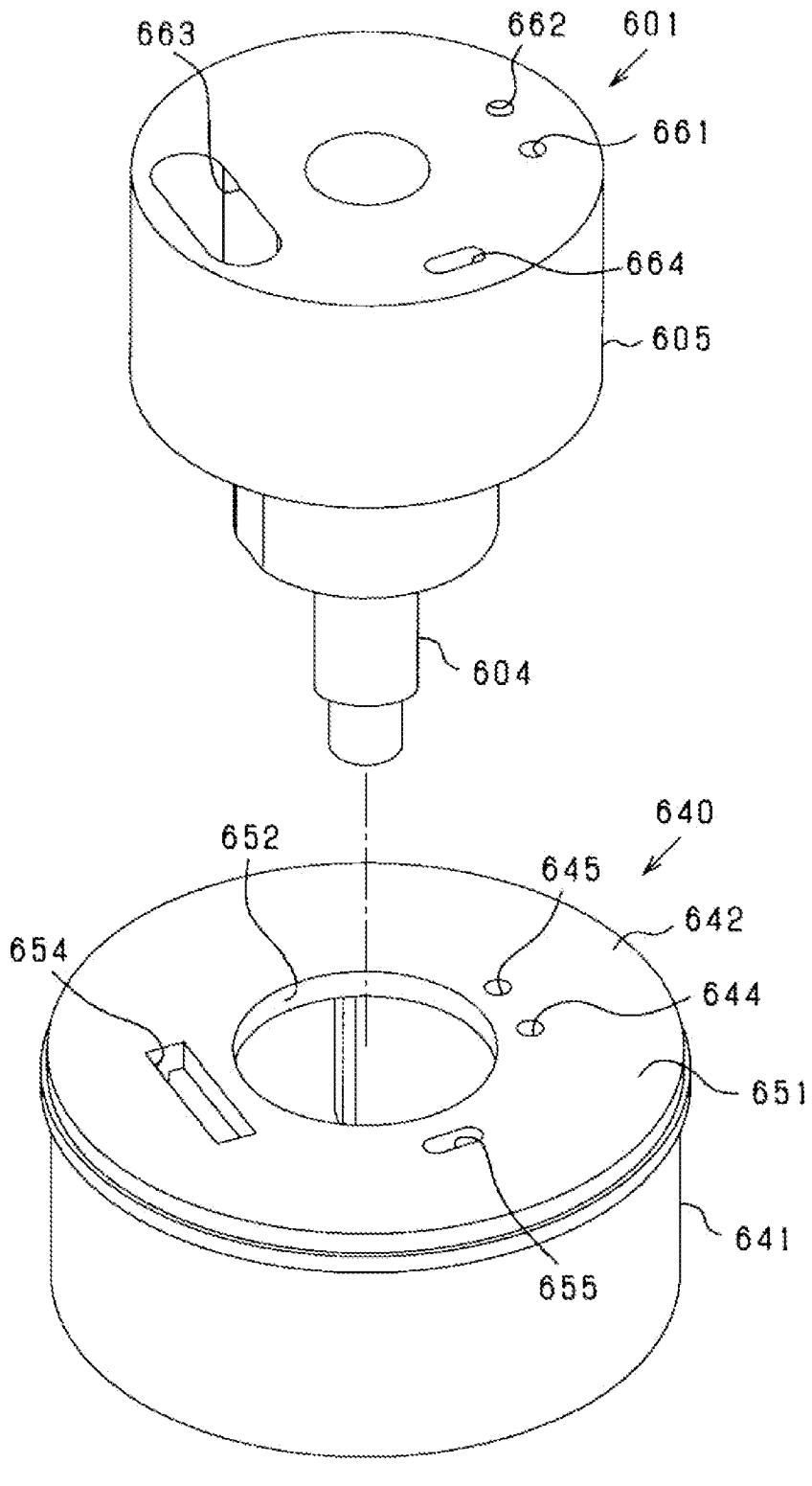
FIG. 66 is an exploded perspective view illustrating a configuration of a spindle and the stator holder.
Figure 67:
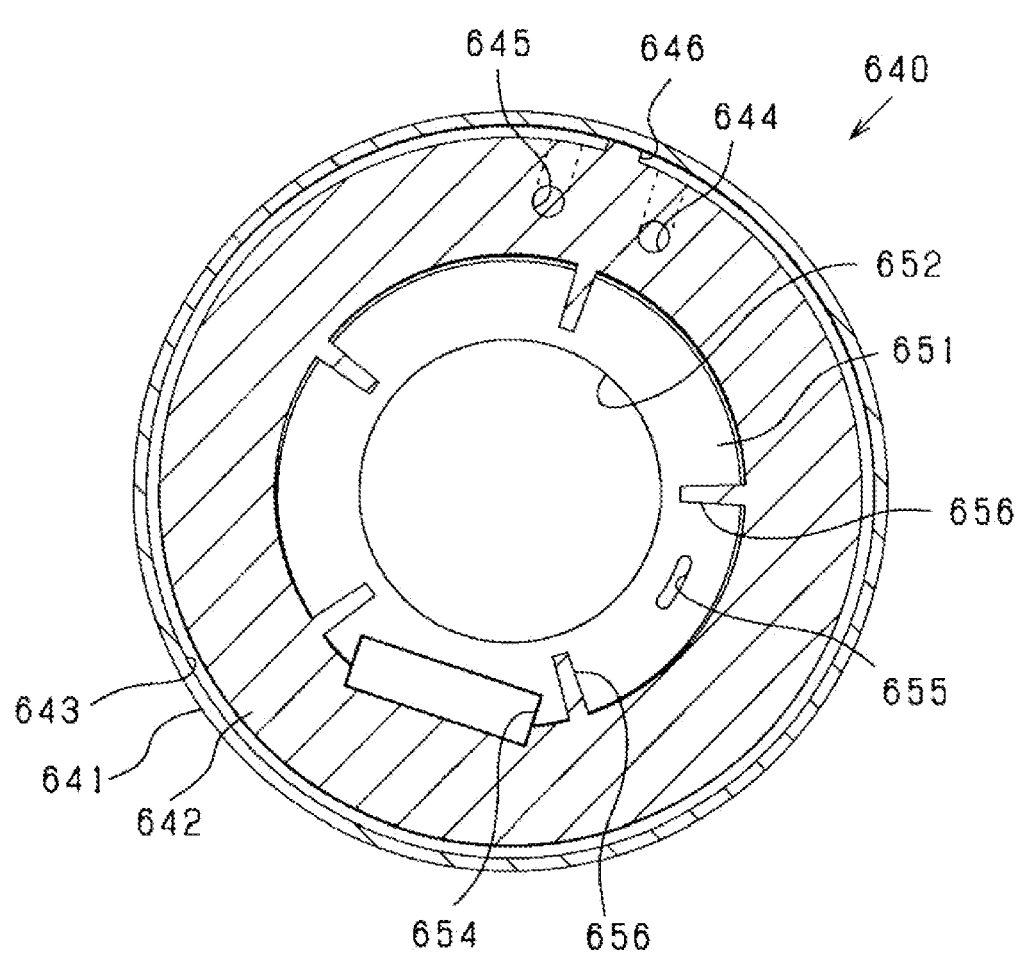
FIG. 67 is a transverse sectional view of the stator holder.

Next, configurations of the stator holder 640 and the spindle 601 will be described with reference to FIGS. 66 and 67. FIG. 66 is an exploded perspective view illustrating a configuration of the spindle 601 and the stator holder 640. FIG. 67 is a transverse sectional view of the stator holder 640.

The stator holder 640 includes an outer cylinder member 641 and an inner cylinder member 642, both of which have a cylindrical shape. The outer cylinder member 641 is disposed on the outer side in the radial direction and the inner cylinder member 642 is disposed on the inner side in the radial direction, and they are integrally assembled to form the stator holder 640. Each of these members 641 and 642 includes, for example, metal such as aluminum or cast iron, or carbon fiber reinforced plastic (CFRP). An annular coolant path 643 is formed between the outer cylinder member 641 and the inner cylinder member 642. The coolant path 643 is provided to have an annular shape in the circumferential direction of the stator holder 640.

The inner cylinder member 642 includes an inlet path 644 serving as an inlet of the coolant and an outlet path 645 serving as an outlet of the coolant. A partition 646 is provided between the inlet path 644 and the outlet path 645 in the coolant path 643. The inlet path 644 and the outlet path 645 communicate with the coolant path 643 on both sides with the partition 646 interposed therebetween, and are provided so as to extend in the axial direction. A coolant flowing in from the inlet path 644 to flow in the coolant path 643 in the circumferential direction, and then flow out from the outlet path 645.

The stator core 632 is assembled to the outer side of the stator holder 640 in the radial direction, more specifically, to the outer side of the outer cylinder member 641 in the radial direction by adhesion, press-fitting, or the like (see FIG. 62).

The inner cylinder member 642 has a hollow shape and has an end plate portion 651 on one end side in the axial direction. A through-hole 652 passing through the end plate portion 651 in the axial direction is provided at the center of the end plate portion 651. The stationary shaft 604 of the spindle 601 can be inserted through the through-hole 652 of the inner cylinder member 642. The spindle 601 is fixed to the inner cylinder member 642 while the stationary shaft 604 is inserted through the through-hole 652.

The end plate portion 651 of the inner cylinder member 642 includes an opening 654 and an insertion hole 655. The opening 654 passes through the end plate portion 651 in the axial direction at a position on the outer side of the through-hole 652 in the radial direction. The insertion hole 655 passes through the end plate portion 651 in the axial direction in the same manner. The opening 654 is an insertion hole portion through which the power line 675 of each phase to be described later is inserted. The insertion hole 655 is a hole portion through which a resolver signal line 692 to be described later is inserted in the axial direction.

In the diameter-expanded portion 605 of the spindle 601, communication paths 661 and 662, an insertion hole 663, and an insertion hole 664 are formed. The communication paths 661 and 662 respectively communicate with the inlet path 644 and the outlet path 645 of the inner cylinder member 642. The insertion hole 663 communicates with the opening 654 of the inner cylinder member 642. The insertion hole 664 communicates with the insertion hole 655 of the inner cylinder member 642. Each of the communication paths 661 and 662 and the insertion holes 663 and 664 is provided so as to extend in the axial direction from the end surface in the axial direction on the stationary shaft 604 side (a side of the hollow portion of the stator holder 640) and to pass through the diameter-expanded portion 605. The communication paths 661 and 662 each correspond to a "shaft body coolant passage". The insertion hole 663 corresponds to a "first insertion hole (power line insertion hole)", and the insertion hole 664 corresponds to a "second insertion hole".

In the spindle 601, the communication paths 661 and 662 and the insertion hole 663 are provided at positions 180° away from each other in the circumferential direction. In this case, the center position between the communication path 661 and the communication path 662 and the center position of the insertion hole 663 in the circumferential direction are preferably on the opposite side by 180° with respect to the axial center position. The communication paths 661 and 662 and the insertion hole 663 are preferably provided at positions 90° or more away from each other in the circumferential direction. That is, the communication paths 661 and 662 and the insertion hole 663 are preferably provided away from each other by any angle of 90° to 180° in the circumferential direction.

As illustrated in FIGS. 61 and 62, an inlet pipe port 665 and an outlet pipe port 666 are provided in the communication paths 661 and 662 of the spindle 601, respectively. A terminal block 667 for a power line is provided in the insertion hole 663, and a terminal block 668 for a resolver signal line is provided in the insertion hole 664.

Although not illustrated, a circulation path for circulating the coolant is connected to the inlet pipe port 665 and the outlet pipe port 666. The circulation path includes, for example, an electric pump and a heat dissipation device such as a radiator. The coolant circulates through the circulation path and the coolant path 643 of the rotary electric machine 600 due to the driving of the pump.

As illustrated in FIG. 67, a plurality of protrusions 656 are provided at predetermined intervals in the circumferential direction on the inner peripheral side of the inner cylinder member 642. Each of these protrusions 656 is provided so as to protrude inward in the radial direction in the hollow portion of the inner cylinder member 642, and is provided in a range from the end plate portion 651 to the intermediate position in the axial direction (see FIG. 62). In the inner cylinder member 642, the protrusions 656 are provided at a position where at least one protrusion 656 is interposed between the opening 654 and the insertion hole 655 in the circumferential direction. The protrusion 656 functions as a reinforcing member of the inner cylinder member 642.

As illustrated in FIG. 62, the wiring module 670 is provided on one end side of the stator 630 in the axial direction (i.e., on the end plate portion 614 side of the rotor carrier 611).

Figure 68:
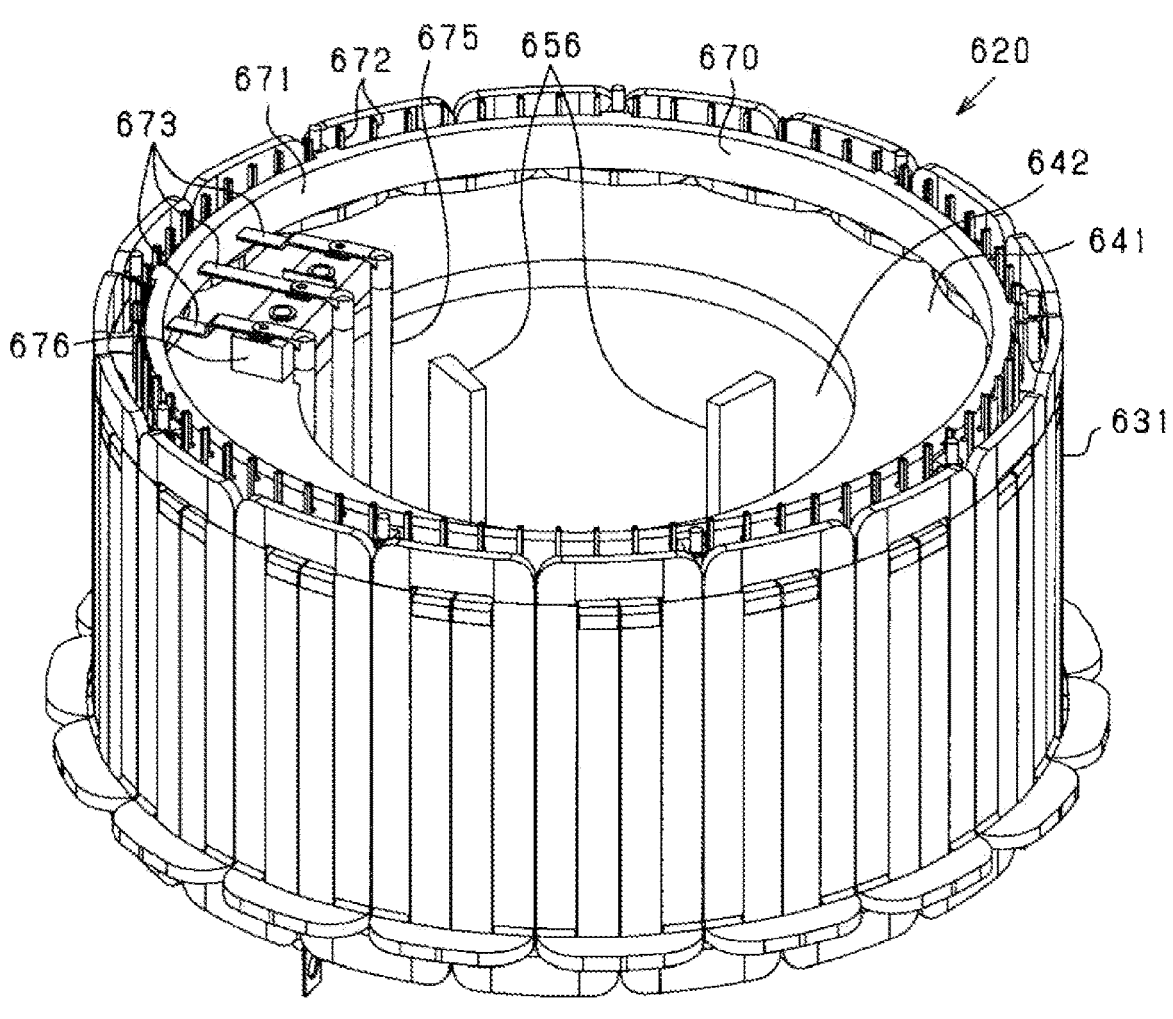
FIG. 68 is a perspective view of a stator unit.

FIG. 68 is a perspective view of the stator unit 620 as viewed from the side of the wiring module 670. The configuration of the wiring module 670 is substantially the same as or similar to that of the wiring module 480 described above. The wiring module 670 includes an annular ring 671 having an annular shape, a plurality of connection terminals 672 provided side by side in the circumferential direction along the annular ring 671, and a bus bar 673 for each phase. A power line 675 is connected to each bus bar 673 of the wiring module 670 for each phase. The power lines 675 are disposed side by side in the circumferential direction and are disposed to extend in the axial direction. The configuration of the power line 675 is preferably the same as that of the power line 485 described above.

A terminal block 676 is provided on an end surface of the stator holder 640 in the axial direction (more specifically, an end surface of the outer cylinder member 641 in the axial direction). The bus bar 673 of the wiring module 670 and the power line 675 are connected via the terminal block 676. The specific configuration is the same as or similar to the configuration illustrated in FIG. 57 described above in the second embodiment.

Each power line 675 is preferably clamped with respect to at least any of the inner cylinder member 642 (stator holder 640) and the spindle 601. Specifically, as illustrated in FIGS. 65 and 66, a clamp member made of anti-vibration rubber is provided in the opening 654 of the inner cylinder member 642 or the insertion hole 663 of the spindle 601, and the power line 675 is clamped by the clamp member.

As illustrated in FIG. 65, the spindle 601 and the stator unit 620 are integrated as a stationary object, and the hub 602 and the rotor 610 are integrated as a rotary object. The stationary object and the rotary object are assembled to be relatively rotatable to each other via the bearings 607 and 608. While the integrated object of the spindle 601 and the stator unit 620, and the integrated object of the hub 602 and the rotor 610 are assembled to each other, a rotor cover 681 is fixed to the open end side of the rotor 610, that is, the opposite side of the hub 602 in the axial direction (the opposite side of the end plate portion 414 of the rotor carrier 611). The rotor cover 681 has an annular plate shape. The rotor cover 681 is fixed to the rotor carrier 611 by using a fixing tool such as a bolt, with a bearing 682 interposed between the rotor cover 681 and the spindle 601.

As illustrated FIG. 62, while the integrated object of the spindle 601 and the stator unit 620, and the integrated object of the hub 602 and the rotor 610 are assembled to each other, an annular closed space SB closed in the axial direction and the radial direction is formed on the inner peripheral side of the stator unit 620. A resolver 690 as a rotation sensor is provided in the closed space SB. The resolver 690 has an annular shape, and includes a resolver stator fixed to the inner cylinder member 642 of the stator unit 620 on the stationary object side, and a resolver rotor fixed to the rotor carrier 611 on the rotary object side. The resolver rotor is disposed on the inner side of the resolver stator in the radial direction so as to face the resolver stator.

In the present embodiment, as described above, the plurality of protrusions 656 are provided at predetermined intervals in the circumferential direction on the inner peripheral side of the inner cylinder member 642 in the stator holder 640 (see FIG. 67). The resolver 690 (resolver stator) is attached to the end surface in the axial direction of the protrusion 656 of the inner cylinder member 642. A position of the resolver 690 in the axial direction in the rotary electric machine 600 is an intermediate position between the hub 602 and the rotor cover 681.

As illustrated in FIG. 63, the resolver 690 includes a terminal 691 in part of the resolver 690 in the circumferential direction, and the resolver signal line 692 is connected to the terminal 691. As described above, the inner cylinder member 642 includes the insertion hole 655, and the spindle 601 includes the insertion hole 664 (see FIG. 66). The resolver signal line 692 is guided to the terminal block 668 at the end of the rotary electric machine 600 in the axial direction via these insertion holes 655 and 664.

In the rotary electric machine 600 according to the present embodiment, the power line 675 of each phase and the resolver signal line 692 are provided in the closed space SB on the inner side of the stator unit 620 in the radial direction so as to extend in the axial direction. A blocking portion that blocks an electromagnetic field generated by the power line 675 is provided between the power line 675 and the resolver signal line 692. The configuration will be specifically described below.

In the present embodiment, the protrusion 656 is provided on the inner peripheral side of the inner cylinder member 642 as a fixing portion for fixing the resolver 690, and the protrusion 656 serves as a "blocking portion". Specifically, as illustrated in FIG. 62, the protrusion 656 is provided to extend in the axial direction in a range from one end of the inner cylinder member 642 in the axial direction to the intermediate position in the axial direction. The resolver 690 is fixed to the end surface of the protrusion 656 in the axial direction, and the resolver signal line 692 is provided on the opposite side of the hub in the axial direction along the protrusion 656. In other words, on the inner peripheral side of the inner cylinder member 642 (the hollow portion of the stator holder 640), the protrusion 656 is provided not over the entire range in the axial direction of the inner cylinder member 642 but over a range (partial range) up to the intermediate position where the resolver 690 is provided. The resolver signal line 692 is provided while extending in the axial direction along the protrusion 656 and being inserted through the insertion holes 655 and 664 (see FIG. 66).

The power line 675 is provided on the inner peripheral side of the inner cylinder member 642 so as to extend from one end side to the other end side in the axial direction. As illustrated in FIG. 63, one protrusion 656 are provided between the power line 675 and the resolver signal line 692.

The spindle 601 as a shaft body is disposed on the inner peripheral side of the inner cylinder member 642, and the protrusion 656 is formed to protrude toward the stationary shaft 604 of the spindle 601. Therefore, on the inner peripheral side of the inner cylinder member 642, the protrusions 656 are provided on both sides of the resolver signal line 692 in the circumferential direction, and the stationary shaft 604 of the spindle 601 is provided on the inner side of the resolver signal line 692 in the radial direction. In this case, the protrusion 656 and the spindle 601 (more specifically, the stationary shaft 604) form a "blocking portion".

The power line 675 and the resolver signal line 692 are guided from the hollow portion of the stator holder 640 to the end surface of the spindle 601 in the axial direction respectively through the insertion holes 663 and 664 provided in the diameter-expanded portion 605 of the spindle 601. Accordingly, in the rotary electric machine 600, the electromagnetic field generated by the power line 675 does not affect the resolver signal line 692 even at a position other than the hollow portion of the stator holder 640. In the present embodiment, the spindle 601 includes a steel material which is a magnetic material. The power line 675 and the resolver signal line 692 are respectively inserted through two insertion holes 663 and 664 provided in the magnetic member.

On the inner peripheral side of the inner cylinder member 642, the protrusion 656 is provided only in a range from one end in the axial direction to the intermediate position in the axial direction of the inner cylinder member 642. In a range in which the protrusion 656 is not provided in the axial direction, that is, in a range from the intermediate position in the axial direction to the other end in the axial direction, the boss 615 of the rotor carrier 611, which is a rotary object, is received. In this case, on the inner peripheral side of the inner cylinder member 642, the boss 615 of the rotor carrier 611 is received in a region where the protrusion 656 is not provided, and the bearing 607 is assembled to the boss 615.

Next, supplemental description for the coolant path 643 of the stator holder 640 will be made.

Figure 69:
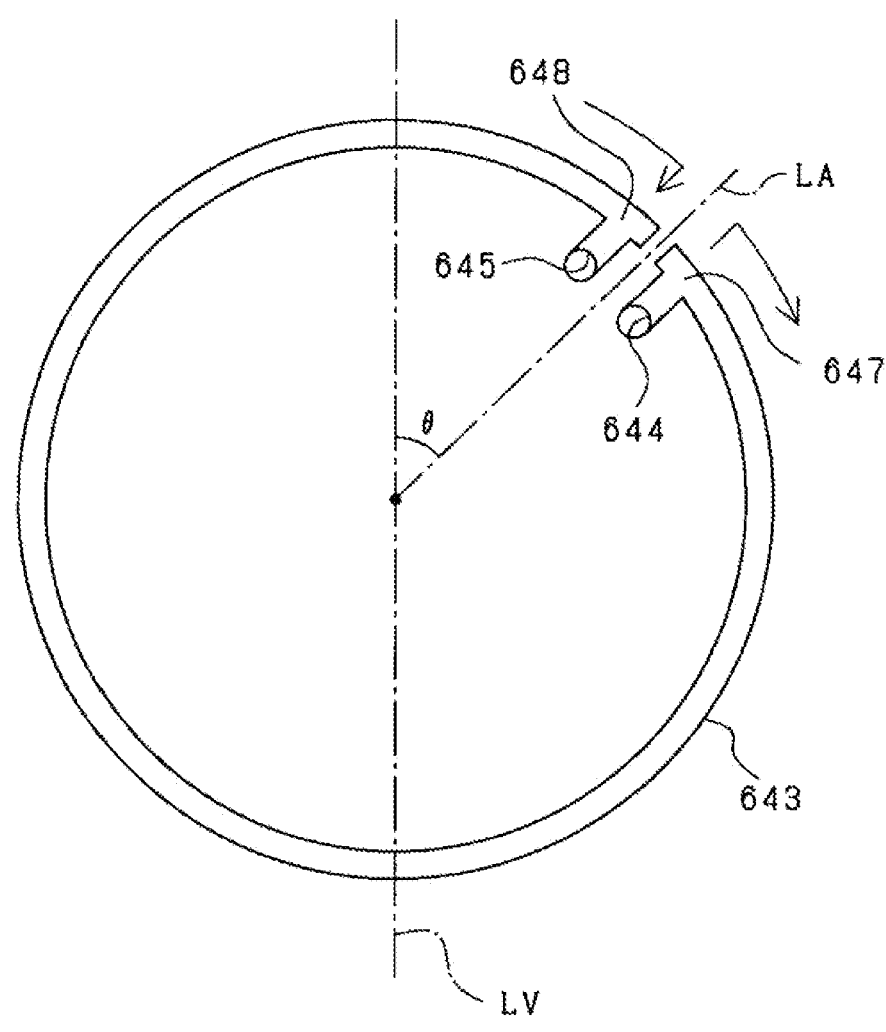
FIG. 69 is a view illustrating a coolant path in the stator holder.

FIG. 69 is a schematic view illustrating the coolant path 643 in the stator holder 640. FIG. 69 illustrates the coolant path 643, the inlet path 644, and the outlet path 645. In FIG. 69, a vertical direction in a use state of the rotary electric machine 600 is illustrated as a vertical direction in the drawing. A straight upward direction in the drawing is a vertically upward direction (top direction), and a straight downward direction in the drawing is a gravity direction. The coolant path 643 is disposed such that the coolant flows along an upright circle in the vertical direction. In FIG. 69, the direction of circulation of the coolant is a clockwise direction. In this case, a vertical line LV passing through the axial center of the rotary electric machine 600 and extending in the vertical direction is assumed as a reference. The coolant flows downward in the vertical direction on the right side of the vertical line LV, and the coolant flows upward in the vertical direction on the left side of the vertical line LV.

More specifically, the stator holder 640 includes the inlet path 644 and the outlet path 645 provided at positions where both form an angle θ in the clockwise direction with respect to the vertically upper direction. In the coolant path 643, a path inlet 647 communicating with the inlet path 644 and a path outlet 648 communicating with the outlet path 645 are provided at a position where both form the angle θ in the same or similar manner as the paths 644 and 645.

Here, the axial center of the rotary electric machine 600 and the intermediate position between the path inlet 647 and the path outlet 648 are connected by a straight line LA. In this case, the angle θ formed by the vertical line LV and the straight line LA indicates the position in the circumferential direction of the path inlet 647 and the path outlet 648 in the coolant path 643. In the illustrated configuration, the path inlet 647 and the path outlet 648 are provided at positions shifted from each other in the circumferential direction. However, the mutual positional relationship between the path inlet 647 and the path outlet 648 can be appropriately changed such that the positions are at the same position in the circumferential direction. That is, the mutual positional relationship between the path inlet 647 and the path outlet 648 is freely set as long as the following conditions are satisfied. That is, the coolant flows in a predetermined direction of the circumferential direction in the coolant path 643, and the path inlet 647 and the path outlet 648 are provided at positions close to each other in the circumferential direction.

In the present embodiment, in the coolant path 643, the path inlet 647 and the path outlet 648 are provided at positions where the angle with respect to the vertically upward direction is 45° (θ=45°) or near 45°. When the coolant flows in the circumferential direction through the coolant path 643, the coolant flows downward in the vertical direction from the path inlet 647 and flows downward in the vertical direction with respect to the path outlet 648. In the coolant path 643, the degree of retention of air bubbles inside the coolant path 643 (i.e., the amount of air remaining in the coolant path 643) varies depending on the positions in the circumferential direction of a path inlet 647 and a path outlet 648 and the direction of flow of the coolant in the vertical direction (up or down) at the path inlet 647 and the path outlet 648 (direction of circulation). Accordingly, the coolant filling rate in the coolant path 643 varies. In this regard, according to the configuration of the present embodiment, retention of air bubbles in the coolant path 643 can be reduced.

The following is an explanation for advantages of providing the path inlet 647 and the path outlet 648 of the coolant path 643 at positions where the angle with respect to the vertically upward direction is 45° or near 45°.

When the coolant flows through the coolant path 643 in an annular route, the coolant flows through the inside of the coolant path 643 at a predetermined flow rate generated by pressure-feeding the coolant with an external pump. In this case, when air bubbles (air) are mixed in the coolant, the air bubbles may be retained due to buoyancy generated in the air bubbles in the coolant path 643. That is, when the coolant is allowed to flow through the coolant path 643 formed in an annular shape in the vertically upright direction, the following situation can be considered. The influence of the buoyancy of the air bubbles on the flow rate of the coolant is maximized at a place where the direction in which the force of gravity acts (i.e., straight downward in the vertical direction) matches the direction of coolant flow, and accordingly, the air bubbles are retained in the coolant path 643.

Figure 70:
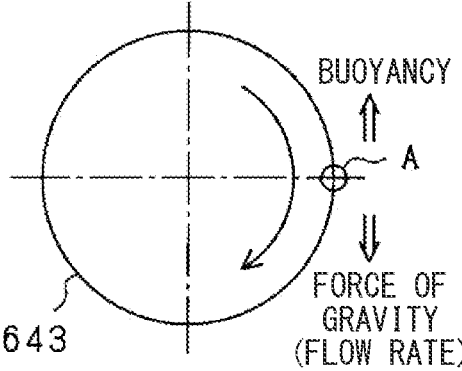
FIG. 70 is a set of views illustrating analysis results of a coolant filling rate in a coolant path.
Figure 70:
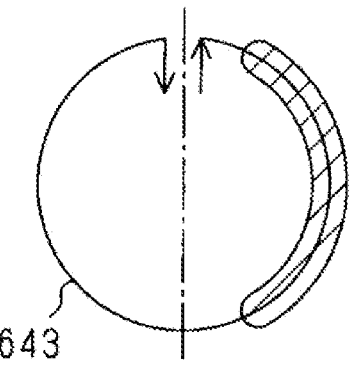
Figure 70:
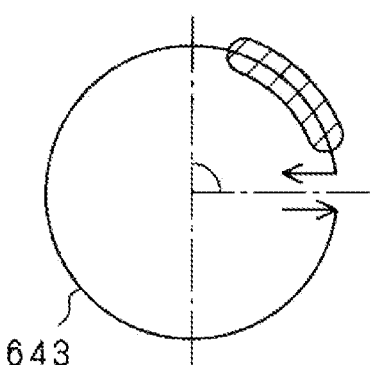
Figure 70:
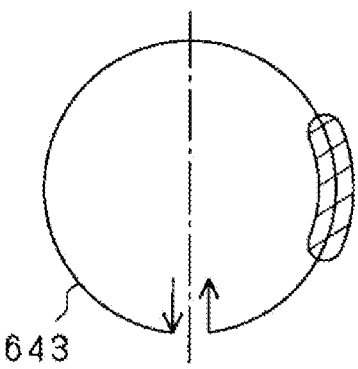
Figure 70:
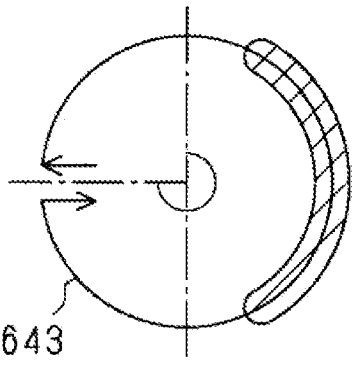
Figure 70:
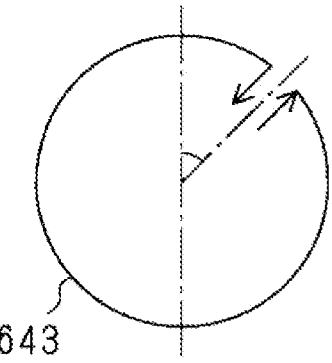

Specifically, as illustrated in (a) of FIG. 70, when the coolant flows in the annular coolant path 643 in the clockwise direction, the direction of the force of gravity matches the direction of flow of coolant at a position A forming 90° on the right side with respect to the vertical line LV. At this time, the direction of the buoyancy acting on the air bubbles in the coolant path 643 is diametrically opposite (exact opposite) to the direction of coolant flow. Thus, the migration of the air bubbles with respect to the direction of the coolant flow is inhibited. Accordingly, air bubbles are likely to remain near the position A in the coolant path 643.

(b) to (f) of FIG. 70 are views illustrating results of analyzing the relationship between the angle θ in the circumferential direction and the coolant filling rate by changing the positions in the circumferential direction of the path inlet 647 and the path outlet 648 in the coolant path 643, that is, the angle θ. In (b) to (f) of FIG. 70, areas in which air bubbles are likely to remain in the coolant path 643 are hatched for providing analysis results of the coolant filling rate.

(b) of FIG. 70 illustrates an analysis result in the case of θ=0°;

(c) of FIG. 70 illustrates an analysis result in the case of θ=90°;

(d) of FIG. 70 illustrates an analysis result in the case of θ=180°;

(e) of FIG. 70 illustrates an analysis result in the case of θ=270°; and (f) of FIG. 70 illustrates an analysis result in the case of θ=45°.

In the coolant path 643, an area in which air bubbles are generally likely to be retained is a section in which the coolant flows downward in the vertical direction (right half section in the drawing) among the entire section of the coolant path 643 (i.e., the section from the path inlet 647 to the path outlet 648). In (b) to (e) of FIG. 70, air bubbles are retained in the coolant path 643 due to air remaining near the position A illustrated in (a) of FIG. 70.

However, when the coolant flows into the coolant path 643 from the path inlet 647, the flow of the coolant is not constant and is disturbed immediately after the coolant flows into the coolant path 643. In this case, in FIG. 70(*f*), in a state where the flow of the coolant is disturbed, the coolant passes through at or near the position A (a region where the direction of the force of gravity and the direction of coolant flow match each other). For this reason, the air is less likely to remain. Therefore, in the configuration of FIG. 70(*f*), that is, the configuration in which the path inlet 647 and the path outlet 648 are provided at positions where the angle with respect to the vertically upward direction is 45° or near 45°, the retention of the air bubbles at or near the position A is less likely to occur.

Figure 71:
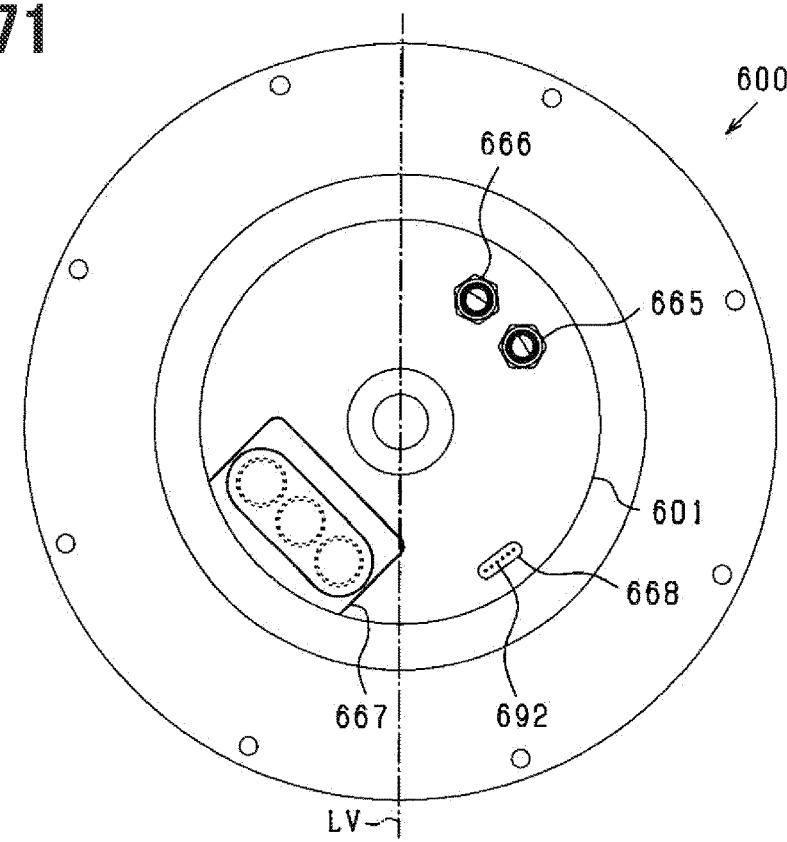
FIG. 71 is a plan view of the rotary electric machine.

Further, in the rotary electric machine 600, as illustrated in FIG. 71, the pipe ports 665 and 666 and the terminal block 667 for a power line are provided on an end surface on one end side of the spindle 601 in the axial direction, that is, on an end surface opposite to the stationary shaft 604 in the axial direction. The pipe ports 665 and 666 and the terminal block 667 are respectively and separately provided on both sides with the vertical line LV passing through the axial center of the rotary electric machine 600 and extending in the vertical direction interposed therebetween.

That is, as described above, in the configuration in which the path inlet 647 and the path outlet 648 of the coolant path 643 are provided at positions where the angle with respect to the vertically upward direction is 45° or near 45°, the inlet pipe port 665 and the outlet pipe port 666 are similarly provided at positions where the angle with respect to the vertically upward direction is 45° or near 45°. Therefore, if the coolant leaks at the inlet pipe port 665 or the outlet pipe port 666, there is a concern that the leaking coolant may flow downward and the terminal block 667 may be exposed to the coolant. In this regard, the pipe ports 665 and 666 and the terminal block 667 are respectively and separately disposed on both sides with the vertical line LV interposed therebetween. Accordingly, if the coolant leaks, the terminal block 667 is prevented from being exposed to the coolant.

Hereinafter, effects obtained by the third embodiment will be described. Some configurations of the rotary electric machine 600 of the present embodiment are in common with those of the rotary electric machine 400 of the second embodiment, and the same or similar effect can be obtained by those configurations. The description thereof will be optionally omitted.

In the hollow portion of the stator holder 640, the protrusion 656 protruding inward in the radial direction is interposed between the power line 675 and the resolver signal line 692 and serves as the "blocking portion". With this configuration, even if the electromagnetic field is generated by power line 675, the influence of the electromagnetic field on the resolver 690 can be suppressed.

In addition, two insertion holes 663 and 664 each extending in the axial direction from a side of the hollow portion of the stator holder 640 are provided in the diameter-expanded portion 605 of the spindle 601. The power line 675 and the resolver signal line 692 are individually inserted through the insertion holes 663 and 664. As a result, the influence of the electromagnetic field can be suitably suppressed even in a range where the resolver signal line 692 extends from the hollow portion of the stator holder 640 to the outside of the rotary electric machine (e.g., an external terminal or the like).

Since the spindle 601 includes a magnetic material and the power line 675 and the resolver signal line 692 are individually inserted through the insertion holes 663 and 664 formed in the spindle 601, the noise reduction effect can be improved.

In the spindle 601, the communication paths 661 and 662 (shaft body coolant passage) extending in the axial direction and the insertion hole 663 (power line insertion hole) extending in the axial direction are provided in the diameter-expanded portion 605. In this configuration, there is a concern over a decrease in strength of the spindle 601 due to the hollowing stemming from the provision of the communication paths 661 and 662 and the insertion hole 663. In this respect, since the communication paths 661 and 662 are provided at positions 90° or more away from the insertion hole 663 in the circumferential direction, a decrease in strength of the spindle 601 can be suppressed.

The rotary electric machine 600 is used in a direction in which the axial direction is directed along a horizontal direction or a substantially horizontal direction. The coolant path 643 provided along the circumferential direction of the stator holder 640 is disposed such that a coolant flows along an upright circle in the vertical direction. In this case, the path inlet 647 and the path outlet 648 of the coolant path 643 are each provided at positions where the angle with respect to the vertically upward direction is 45° or near 45°, and the flow of the coolant in the circumferential direction at the path inlet 647 and the path outlet 648 is directed to downward in the vertical direction. In this way, the retention of air bubbles in the coolant path 643 can be reduced. As a result, the coolant is allowed to uniformly flow through the entire region of the coolant path 643, and thus the cooling performance of the rotary electric machine 600 can be improved.

The terminal block 667 for a power line and the pipe ports 665 and 666 are respectively and separately provided on both sides with the vertical line LV passing through the axial center of the rotary electric machine 600 and extending in the vertical direction interposed therebetween. With this configuration, even if the coolant leaks, the terminal block 667 can be prevented from being exposed to the coolant.

Modifications of Third Embodiment

Figure 72:
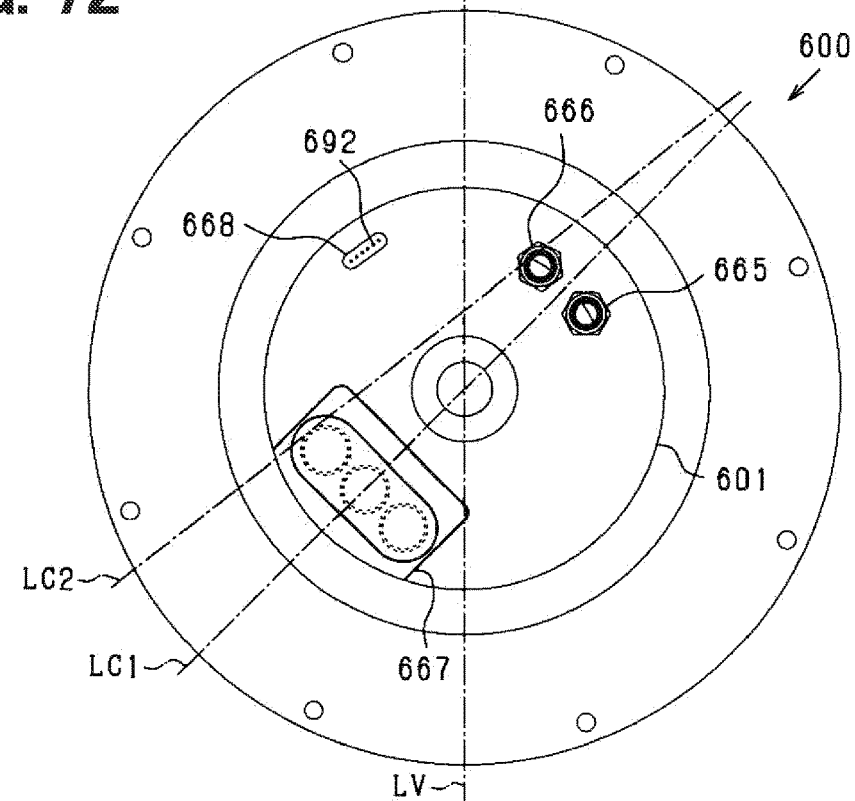
FIG. 72 is a plan view of the rotary electric machine.

As illustrated in FIG. 72, in some cases, the pipe ports 665 and 666, the terminal block 677 for a power line, and the terminal block 668 for a signal line are provided on the end surface on one end side of the spindle 601 in the axial direction, that is, on the end surface in the axial direction on the opposite side of the stationary shaft 604. In these cases, the terminal block 668 for a signal line is preferably positioned upward in the vertical direction from the straight line connecting the pipe ports 665 and 666 and the terminal block 667 for a power line. Specifically, the terminal block 668 for a signal line is preferably positioned upward in the vertical direction from a straight line LC1 connecting a center point between the pipe ports 665 and 666 and a center point in the longitudinal direction of the terminal block 677. Alternatively, in the communication paths 661 and 662 and the insertion hole 663 (see FIG. 66) provided in the spindle 601, the terminal block 668 for a signal line is preferably positioned upward in the vertical direction from a straight line LC2 connecting the uppermost position in the communication paths 661 and 662 in the vertical direction and the uppermost position of the insertion hole 663. In this case, even if the coolant leaks from the pipe port 665 or 666, the signal line terminal portion can be prevented from being exposed to the coolant.

Figure 73:
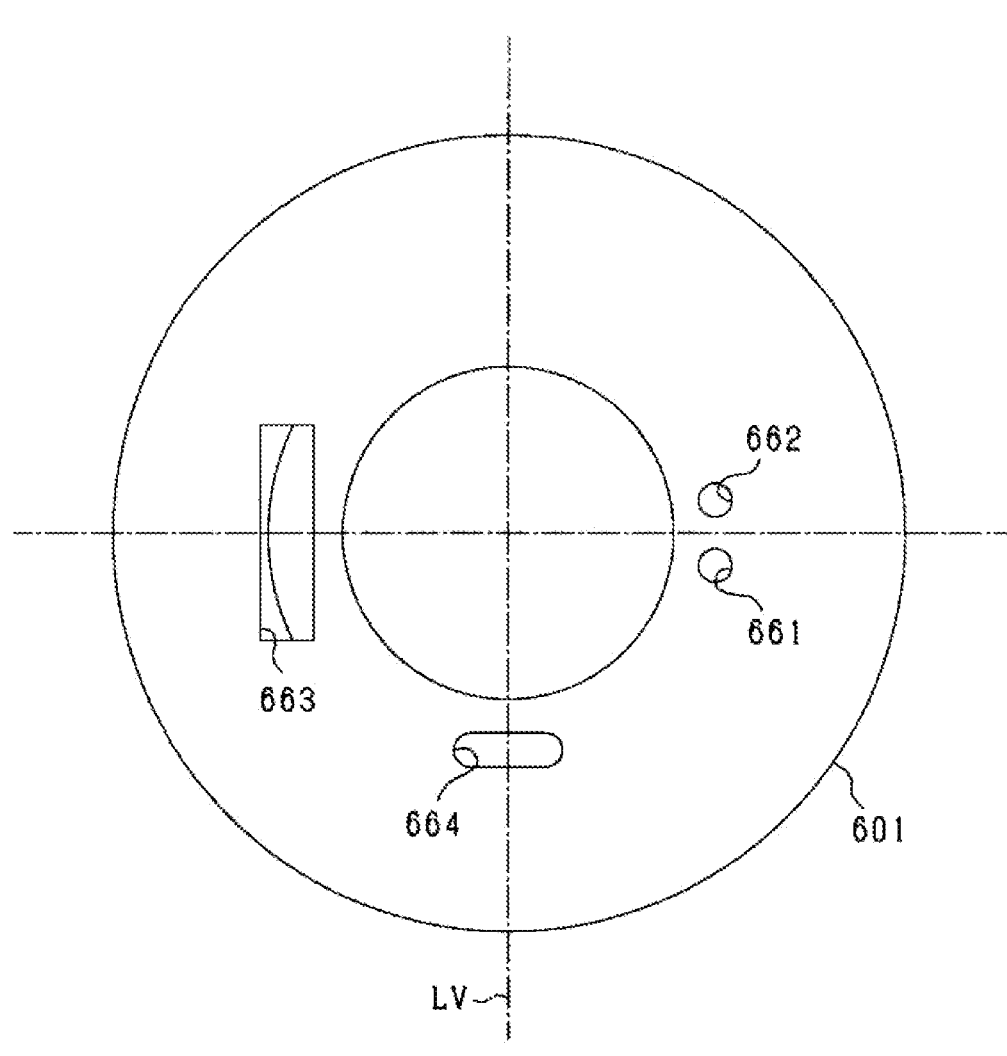
FIG. 73 is a view illustrating an end surface of the spindle in the axial direction.

As illustrated in FIG. 73, in the end surface on one end side in the axial direction of the spindle 601, that is, in the end surface in the axial direction on the opposite side of the stationary shaft 604, the position of the insertion hole 663 for the power line 675 (position where the power line 675 is drawn out) is preferably at 90° or near 90° with respect to the vertically upward direction (direction of the force of gravity). As a result, rigidity can be maintained in the spindle 601 having the insertion hole 663 as a hollow portion.

Figure 74:
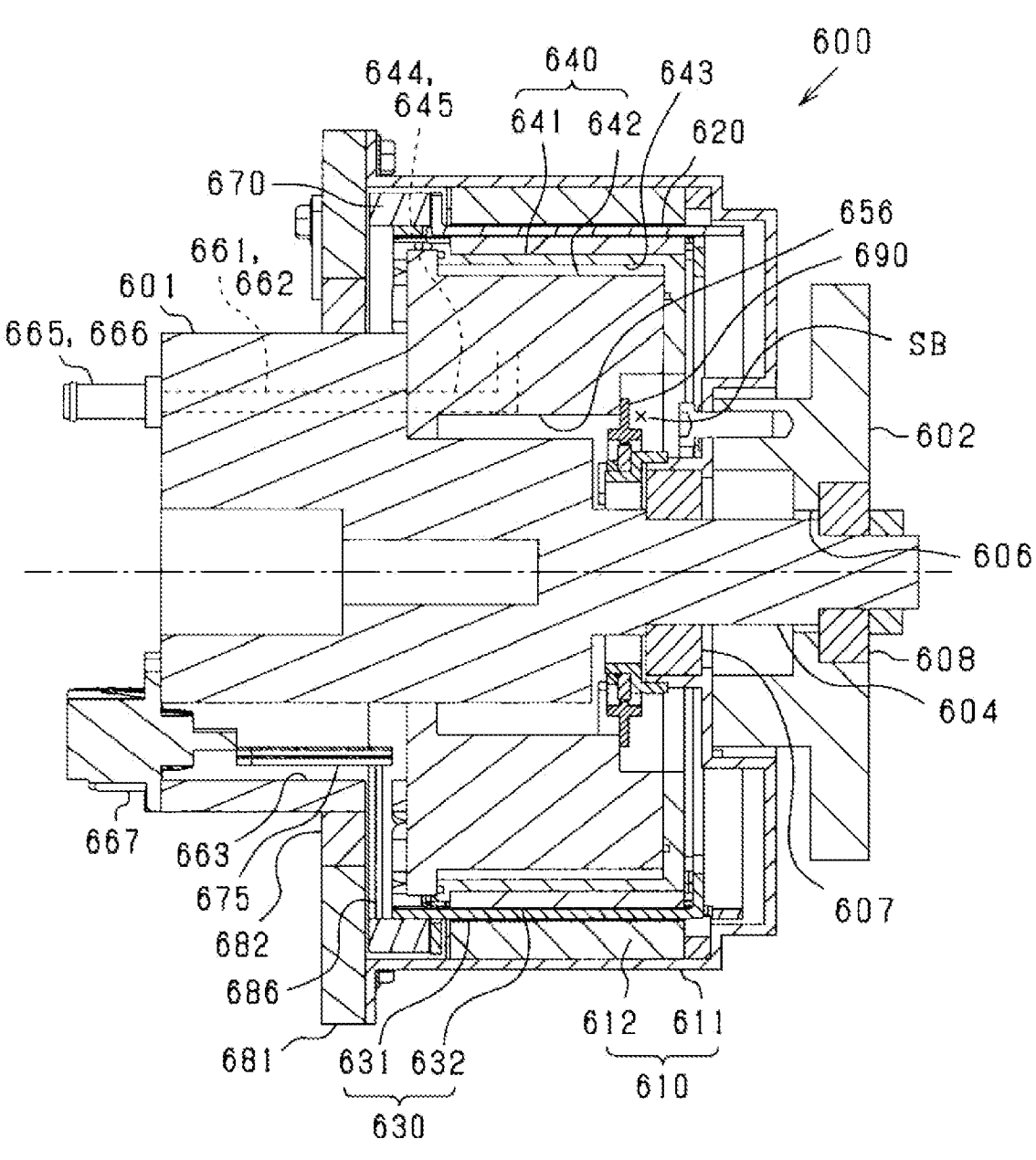
FIG. 74 is a longitudinal sectional view of the rotary electric machine.

In the rotary electric machine 600 having the above-described configuration, the wiring module 670 is provided on the hub 602 side, that is, on the wheel side, among both ends of the stator 630 in the axial direction (see FIG. 62). However, this configuration may be changed, and the wiring module 670 may be provided on the opposite side of the hub 602, that is, on the opposite side of the wheel (vehicle body side), among both ends of the stator 630 in the axial direction. The configuration is illustrated in FIG. 74. In the rotary electric machine 600 illustrated in FIG. 74, the wiring module 670 is provided at the coil end portion on the opposite side of the hub of the stator 630. The wiring module 670 is connected to the power line 675 via a lead line 686 extending in the radial direction from the wiring module 670.

As described in FIG. 66, the spindle 601 includes the insertion holes 663 and 664 each extending in the axial direction. The power line 675 is inserted through the insertion hole 663, and the resolver signal line 692 is inserted through the insertion hole 664. In this case, the power line 675 and the resolver signal line 692 are provided with the spindle 601 being passed through. A portion between the insertion holes 663 and 664 in the spindle 601 is a "blocking portion". With this configuration, the resolver signal line 692 is suitably prevented from being affected by the electromagnetic field due to the power line 675.

In addition, in the configuration of FIG. 74, since the wiring module 670 is provided on the opposite side of the wheel (vehicle body side), the length of the power line 675 can be shortened. In this way, the earthquake resistance of the power line can be improved, and the high efficiency can be achieved by reducing the resistance.

Figure 75:
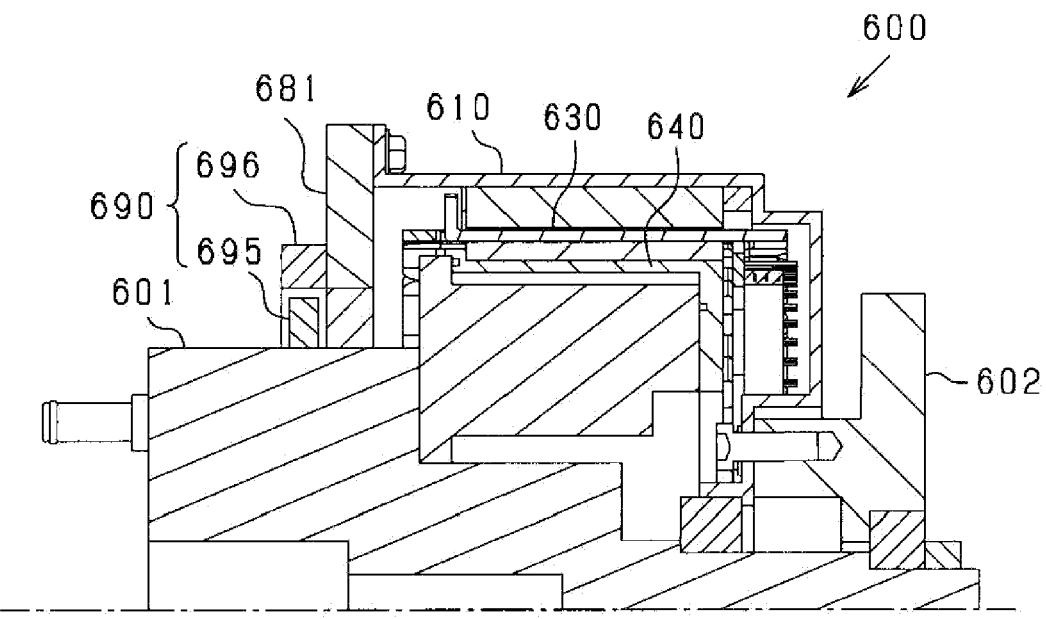
FIG. 75 is a longitudinal sectional view of the rotary electric machine.

As illustrated in FIG. 75, the resolver 690 may be provided at the end on the vehicle body side among both ends of the rotary electric machine 600 in the axial direction. Specifically, a resolver stator 695 is fixed to the base end portion of the spindle 601 on the vehicle body side, and a resolver rotor 696 is fixed to the rotor cover 681. With this configuration, the resolver 690 can be adjusted from the outside, and the initial angle and the like can suitably be mechanically adjusted.

Figure 76:
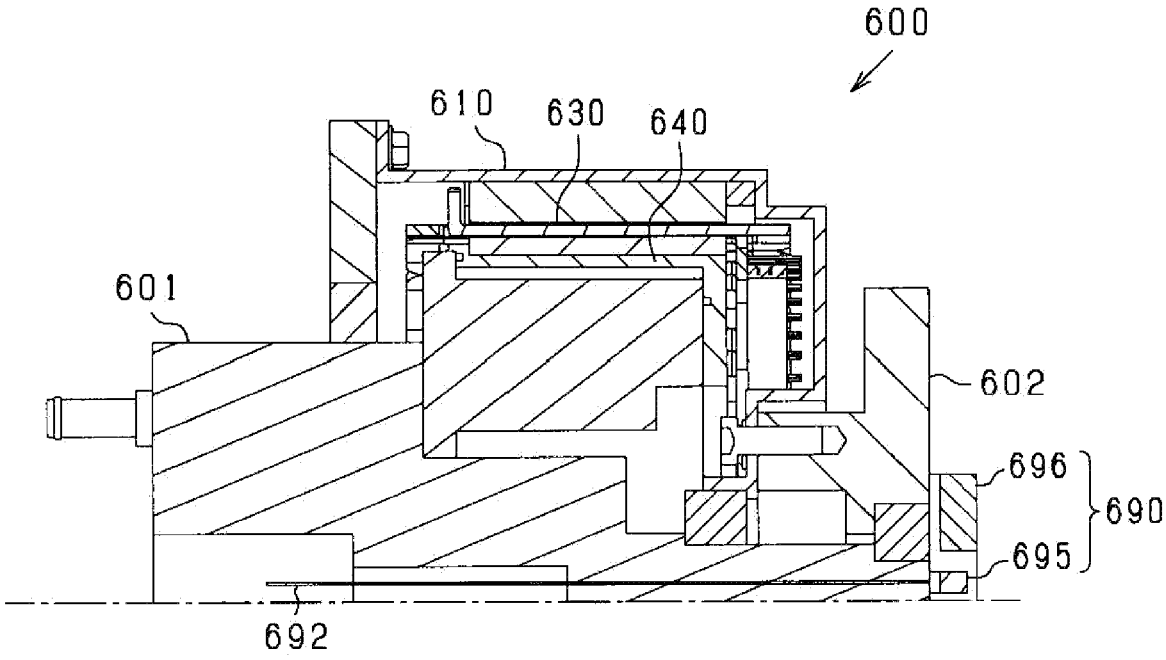
FIG. 76 is a longitudinal sectional view of the rotary electric machine.

As illustrated in FIG. 76, the resolver 690 may be provided at the end on the hub 602 side (wheel side) among both ends of the rotary electric machine 600 in the axial direction. Specifically, the resolver stator 695 is fixed to the extending end of the spindle 601, and the resolver rotor 696 is fixed to the hub 602. Further, the resolver signal line 692 is provided so as to pass through the spindle 601 and extend in the axial direction. In this case, noise in the resolver signal line 692 can be reduced. The spindle 601 desirably includes a material having a large noise attenuation effect. Since the spindle 601 has the smallest outer diameter at the extending end, the outer diameter of the resolver 690 can be reduced, and the resolver 690 can be downsized.

OTHER MODIFICATIONS

Also in the rotary electric machine 400 according to the second embodiment, similarly to the rotary electric machine 600, a path inlet communicating with the inlet path 464 and a path outlet communicating with the outlet path 465 in the coolant path 463 may be provided at positions where the angle with respect to the vertically upward direction is 45° or near 45°. Accordingly, in the coolant path 463, the coolant may flow in the circumferential direction and downward in the vertical direction from the path inlet, and the coolant may flow in the circumferential direction and downward in the vertical direction with respect to the path outlet.

In the second and third embodiments, the rotary electric machines 400 and 600 each have an outer rotor structure. However, the structure may be changed, and a rotary electric machine having an inner rotor structure may be adopted. In the rotary electric machine having the inner rotor structure, the stator is provided on the outer side in the radial direction, and the rotor is provided on the inner side in the radial direction. Also in such a configuration, as described above, a blocking portion that blocks an electromagnetic field generated by the power line 485 may be interposed between the power line 485 and the resolver signal line 522, for example.

The rotary electric machines 400 and 600 may be used for an application other than a motor for traveling of a vehicle. The rotary electric machines 400 and 600 may be rotary electric machines widely used for moving bodies including aircraft, or a rotary electric machine used for electric equipment for industrial or domestic applications.

The disclosure in this specification is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be implemented by various different combinations. The present disclosure may include additional configuration that can be added to the above-described embodiments. The present disclosure also includes modifications which include partial components/elements of the above-described embodiments. The present disclosure also includes replacement or combination of components and/or elements between one embodiment and another. The technical scope disclosed in the present disclosure is not limited to the above-described embodiments. It should be understood that part of disclosed technical scope is indicated by recitation of claims, and includes every modification within the equivalent meaning and the recitation of the scope of claims.

What is claimed is:

1. A rotary electric machine comprising:
   a rotor including a plurality of magnetic poles;
   a stator including a stator winding that is multi-phase;
   a stator holder in a cylindrical shape and assembled inside the stator in a radial direction;
   a power line configured to supply power to the stator winding; and
   a rotation sensor configured to detect a rotational position of the rotor, wherein
   the stator and the rotor face each other in the radial direction,
   the power line and a signal line, which extends from the rotation sensor, extend in an axial direction,
   a blocking portion is interposed between the power line and the signal line and configured to block an electromagnetic field generated by the power line,
   the rotary electric machine is an outer-rotor type rotary electric machine including the rotor outside the stator in the radial direction,
   the stator holder includes a hollow portion and a protrusion in the hollow portion,
   the protrusion is provided as a fixing portion and protrudes inward in the radial direction for fixing the rotation sensor, and
   the protrusion is the blocking portion.

2. The rotary electric machine according to claim 1, wherein
   the protrusion is provided in the hollow portion of the stator holder,
   the protrusion extends in the axial direction in a range from one end of the stator holder in the axial direction to an intermediate position of the stator holder in the axial direction,
   the rotation sensor is fixed to an end surface of the protrusion in the axial direction, and
   the signal line extends in the axial direction along the protrusion.

3. The rotary electric machine according to claim 2, wherein
   the protrusion is provided in the hollow portion of the stator holder in the range from the one end of the stator holder in the axial direction to the intermediate position of the stator holder in the axial direction, and
   a part of a rotary object including the rotor is received in a range from the intermediate position of the stator holder in the axial direction to an other end of the stator holder in the axial direction.

4. The rotary electric machine according to claim 1, wherein
   in the hollow portion of the stator holder, the power line is connected to the stator winding of each phase on one end side of the stator in the axial direction, and extends from the one end side of the stator to an other end side of the stator in the axial direction, and the protrusion is provided between the power line and the signal line.

5. The rotary electric machine according to claim 1, wherein the rotor includes a rotor carrier including an end plate portion on one end side in the axial direction and having an opening on an other end side in the axial direction of the rotor carrier, the stator is inserted inside the rotor carrier in the radial direction from the other end side of the rotor carrier having the opening, the stator winding includes a plurality of winding segments for each multi-phase winding, each of the winding segments includes a pair of intermediate conductor portions and link portions at both ends of the pair of intermediate conductor portions in the axial direction, the pair of intermediate conductor portions and the link portions are in an annular arrangement, the winding segments include a first winding segment and a second winding segment, one end side of the stator winding of the first winding segment in the axial direction is bent inward in the radial direction, an other end side of the stator winding of the second winding segment in the axial direction is bent outward in the radial direction, the first winding segment and the second winding segment are provided side by side and partially overlap each other in a circumferential direction, a bent side of the first winding segment and a non-bent side of the second winding segment are on a side of the end plate portion of the rotor carrier, a wiring module is provided on the side of the end plate portion of the rotor carrier among both ends of the stator winding in the axial direction and electrically connected to each of the winding segments, the power line is connected to the wiring module, in the hollow portion of the stator holder, the power line extends from one end side of the stator to an other end side of the stator in the axial direction, and the protrusion is provided between the power line and the signal line.

6. The rotary electric machine according to claim 1, wherein a shaft body is provided in the hollow portion of the stator holder to pivotally support a rotary object including the rotor, the protrusion protrudes toward the shaft body in the stator holder, and in the hollow portion of the stator holder, the protrusion and the shaft body are the blocking portion.

7. The rotary electric machine according to claim 6, wherein the shaft body includes a stationary shaft inserted through the hollow portion of the stator holder and a diameter-expanded portion larger in diameter than the stationary shaft, the diameter-expanded portion includes a first insertion hole and a second insertion hole, both the first insertion hole and the second insertion hole extend from an end surface of the diameter-expanded portion in the axial direction that is on a side of the hollow portion of the stator holder to pass through the diameter-expanded portion in the axial direction, the power line is inserted through the first insertion hole, and the signal line is inserted through the second insertion hole.

8. The rotary electric machine according to claim 7, wherein the shaft body is formed of a magnetic material.

9. The rotary electric machine according to claim 6, wherein the stator holder includes a coolant path extending in an annular shape in a circumferential direction to circulate a coolant in the circumferential direction, an inlet path, as an inlet of the coolant to the coolant path, extending in the axial direction, and an outlet path, as an outlet of the coolant from the coolant path, extending in the axial direction, the shaft body includes a stationary shaft inserted through the hollow portion of the stator holder and a diameter-expanded portion larger in diameter than the stationary shaft, the diameter-expanded portion has two shaft body coolant passages extending in the axial direction and respectively communicating with the inlet path and the outlet path, the diameter-expanded portion includes a power line insertion hole extending in the axial direction and through which the power line is inserted, and the two shaft body coolant passages are provided at positions 90° or more away from the power line insertion hole in the circumferential direction.

10. The rotary electric machine according to claim 1, wherein the rotary electric machine is to be used in a direction where the axial direction is directed along a horizontal direction or a substantially horizontal direction, the stator holder includes a coolant path extending in an annular shape in a circumferential direction to circulate a coolant in the circumferential direction, an inlet path, as an inlet of the coolant to the coolant path, extending in the axial direction, and an outlet path, as an outlet of the coolant from the coolant path, extending in the axial direction, in the coolant path, a path inlet, which communicates with the inlet path, and a path outlet, which communicates with the outlet path, are provided at positions where an angle with respect to a vertically upward direction is 45° or near 45°, and the coolant path is configured to cause the coolant to flow from the path inlet in the circumferential direction downward in a vertical direction and to flow to the path outlet in the circumferential direction downward in the vertical direction.

11. The rotary electric machine according to claim 10, wherein a stationary object including the stator holder has an end surface on one end side in the axial direction, the end surface is provided with a power line terminal portion connected to the power line and pipe ports respectively communicating with the inlet path and the outlet path, the power line terminal portion and the pipe ports are respectively and separately provided on both sides of a vertical line interposed between the power line terminal portion and the pipe ports, and the vertical line passes through an axial center of the rotary electric machine and extends in the vertical direction.

12. The rotary electric machine according to claim 1, further comprising:

a shaft body provided in a hollow portion of the stator holder and pivotally supports a rotary object including the rotor, wherein the shaft body includes a first insertion hole and a second insertion hole both extending in the axial direction, the power line is inserted through the first insertion hole, the signal line is inserted through the second insertion hole, and a portion of the shaft body between the first insertion hole and the second insertion hole is the blocking portion.

* * * * *